United States Patent
Yan et al.

(10) Patent No.: US 10,209,859 B2
(45) Date of Patent: Feb. 19, 2019

(54) METHOD AND SYSTEM FOR CROSS-PLATFORM SEARCHING OF MULTIPLE INFORMATION SOURCES AND DEVICES

(71) Applicant: Findo, Inc., Wilmington, DE (US)

(72) Inventors: David Yan, Portola Valley, CA (US); Konstantin Anisimovich, Moscow (RU)

(73) Assignee: Findo, Inc., Wilmington, DE (US)

( * ) Notice: Subject to any disclaimer, the term of this patent is extended or adjusted under 35 U.S.C. 154(b) by 349 days.

(21) Appl. No.: 14/579,500

(22) Filed: Dec. 22, 2014

(65) Prior Publication Data
US 2015/0186538 A1 Jul. 2, 2015

Related U.S. Application Data

(60) Provisional application No. 61/922,597, filed on Dec. 31, 2013.

(51) Int. Cl.
*G06F 17/30* (2006.01)
*G06F 3/0481* (2013.01)
(Continued)

(52) U.S. Cl.
CPC ...... *G06F 3/04817* (2013.01); *G06F 3/04842* (2013.01); *G06F 17/211* (2013.01); *G06F 17/22* (2013.01); *G06F 17/301* (2013.01); *G06F 17/30017* (2013.01); *G06F 17/3053* (2013.01); *G06F 17/30112* (2013.01); *G06F 17/30115* (2013.01); *G06F 17/30126* (2013.01); *G06F 17/30253* (2013.01); *G06F 17/30268* (2013.01); *G06F 17/30327* (2013.01); *G06F 17/30554* (2013.01); *G06F 17/30598* (2013.01);
(Continued)

(58) Field of Classification Search
USPC .......................................................... 707/722
See application file for complete search history.

(56) References Cited

U.S. PATENT DOCUMENTS 5,598,557 A 1/1997 Doner et al.
5,956,400 A 9/1999 Chaum et al.
(Continued)

OTHER PUBLICATIONS

Ghosh et al., "C-FaRM: A Collaborative and Context Aware Framework for Requirement Management", IEEE 2011, pp. 29-30.
(Continued)

*Primary Examiner* — Cam Linh T Nguyen
(74) *Attorney, Agent, or Firm* — Lowenstein Sandler LLP

(57) ABSTRACT

An illustrative method according to a set of instructions stored on a memory of a computing device includes receiving, by a processor of the computing device, a search input. The method further includes searching, by the processor, a plurality of electronic storage locations for electronic files related to the search input. The method further includes determining, by the processor, the presence of an electronic file on a first electronic storage location of the plurality of electronic storage locations that is related to the search input. The method further includes displaying, by the processor, on a graphical user interface (GUI), representative information of the electronic file. The representative information includes descriptive information relating to the electronic file.

20 Claims, 24 Drawing Sheets

(51) Int. Cl.
  *G06F 17/21* (2006.01)
  *G06F 17/22* (2006.01)
  *G06F 3/0484* (2013.01)
  *G10L 15/18* (2013.01)
  *G06Q 10/10* (2012.01)

(52) U.S. Cl.
  CPC .. *G06F 17/30867* (2013.01); *G06F 17/30997* (2013.01); *G10L 15/1815* (2013.01); *G06Q 10/107* (2013.01)

(56) References Cited

U.S. PATENT DOCUMENTS

| | | | |
|---|---|---|---|
| 6,101,515 | A | 8/2000 | Wical et al. |
| 6,654,783 | B1 | 11/2003 | Hubbard |
| 6,889,209 | B1 | 5/2005 | Rabin et al. |
| 6,976,053 | B1 | 12/2005 | Tripp et al. |
| 7,216,304 | B1 | 5/2007 | Gourdol et al. |
| 7,516,218 | B2 | 4/2009 | Besson |
| 7,565,347 | B2 | 7/2009 | Broder |
| 8,037,018 | B2 | 10/2011 | Waldo et al. |
| 8,122,028 | B2 | 2/2012 | Newbold |
| 8,161,240 | B2 | 4/2012 | Wang |
| 8,224,029 | B2 | 7/2012 | Saptharishi et al. |
| 8,332,333 | B2 | 12/2012 | Agarwal |
| 8,359,300 | B1* | 1/2013 | Shin .............. G06F 17/3087 707/640 |
| 8,363,806 | B2 | 1/2013 | Bookstaff |
| 8,433,687 | B1 | 4/2013 | Pydi |
| 8,499,048 | B2 | 7/2013 | Malik et al. |
| 8,539,359 | B2 | 9/2013 | Rapaport et al. |
| 8,566,370 | B2 | 10/2013 | Jin et al. |
| 8,738,611 | B1 | 5/2014 | Zarmer et al. |
| 8,819,425 | B2 | 8/2014 | Rangsikitpho et al. |
| 8,842,818 | B2 | 9/2014 | Alperin et al. |
| 8,868,677 | B2 | 10/2014 | Molaro et al. |
| 8,930,825 | B2 | 1/2015 | Brugler et al. |
| 8,938,449 | B1 | 1/2015 | Duerig |
| 8,984,074 | B2 | 3/2015 | Monaco |
| 9,002,867 | B1 | 4/2015 | Adams et al. |
| 9,043,413 | B2 | 5/2015 | Kraft et al. |
| 9,100,245 | B1 | 8/2015 | Andrews et al. |
| 9,177,060 | B1 | 11/2015 | Bennett et al. |
| 9,185,067 | B1 | 11/2015 | Isaacs et al. |
| 9,195,679 | B1 | 11/2015 | Svendsen |
| 9,218,629 | B2 | 12/2015 | Hartzler |
| 9,262,517 | B2 | 2/2016 | Feng et al. |
| 9,292,552 | B2 | 3/2016 | Amgren et al. |
| 9,304,657 | B2 | 4/2016 | Yan et al. |
| 9,330,183 | B2 | 5/2016 | Woss et al. |
| 9,405,771 | B2 | 8/2016 | Balakrishnan et al. |
| 9,454,601 | B2 | 9/2016 | Oral |
| 9,465,521 | B1 | 10/2016 | Giordano et al. |
| 9,547,844 | B2 | 1/2017 | Cypes et al. |
| 9,552,442 | B2 | 1/2017 | Hill et al. |
| 9,596,308 | B2 | 3/2017 | Brezina et al. |
| 9,652,536 | B1 | 5/2017 | Stasior et al. |
| 9,747,342 | B2 | 8/2017 | Hirate |
| 2002/0024443 | A1 | 2/2002 | Hawkins et al. |
| 2002/0083439 | A1 | 6/2002 | Eldering |
| 2002/0184317 | A1* | 12/2002 | Thankachan ........ G06Q 10/107 709/206 |
| 2003/0171926 | A1 | 9/2003 | Suresh et al. |
| 2003/0187821 | A1 | 10/2003 | Cotton et al. |
| 2004/0133564 | A1 | 7/2004 | Gross et al. |
| 2004/0225658 | A1 | 11/2004 | Horber |
| 2005/0027702 | A1 | 2/2005 | Jensen et al. |
| 2005/0038866 | A1 | 2/2005 | Noguchi |
| 2005/0096124 | A1 | 5/2005 | Stronach |
| 2005/0160369 | A1 | 7/2005 | Balabanovic |
| 2005/0165796 | A1 | 7/2005 | Moore |
| 2005/0187795 | A1 | 8/2005 | Russell |
| 2005/0235012 | A1 | 10/2005 | Harry et al. |
| 2005/0289127 | A1* | 12/2005 | Giampaolo ........... G06F 17/301 |
| 2006/0004739 | A1* | 1/2006 | Anthony ........... G06F 17/30587 |
| 2006/0010231 | A1 | 1/2006 | Spector |
| 2006/0093190 | A1 | 5/2006 | Cheng et al. |
| 2006/0156246 | A1 | 7/2006 | Williams et al. |
| 2006/0200460 | A1 | 9/2006 | Meyerzon |
| 2006/0235933 | A1 | 10/2006 | Baluja et al. |
| 2007/0013967 | A1 | 1/2007 | Ebaugh et al. |
| 2007/0016553 | A1 | 1/2007 | Dumais et al. |
| 2007/0088690 | A1 | 4/2007 | Wiggen et al. |
| 2007/0112874 | A1* | 5/2007 | Carol ............... G06F 17/30067 |
| 2007/0136340 | A1 | 6/2007 | Radulovich |
| 2007/0156843 | A1 | 7/2007 | Sagen et al. |
| 2007/0203891 | A1 | 8/2007 | Solaro et al. |
| 2007/0208717 | A1 | 9/2007 | Matsui |
| 2007/0209022 | A1 | 9/2007 | Gourdol et al. |
| 2007/0220614 | A1 | 9/2007 | Ellis et al. |
| 2007/0240050 | A1 | 10/2007 | Quinn-Jacobs |
| 2007/0250585 | A1 | 10/2007 | Ly et al. |
| 2008/0016052 | A1 | 1/2008 | Frieden |
| 2008/0077594 | A1 | 3/2008 | Ota |
| 2008/0086453 | A1 | 4/2008 | Fabian |
| 2008/0104024 | A1 | 5/2008 | Kumar et al. |
| 2008/0172380 | A1* | 7/2008 | Czyz ................... G06F 17/3069 |
| 2008/0195584 | A1 | 8/2008 | Nath et al. |
| 2008/0228719 | A1* | 9/2008 | Abhyanker ....... G06F 17/30528 |
| 2008/0313570 | A1 | 12/2008 | Shamma et al. |
| 2009/0031244 | A1 | 1/2009 | Brezina |
| 2009/0055742 | A1 | 2/2009 | Nordhagen |
| 2009/0094220 | A1 | 4/2009 | Becker |
| 2009/0103901 | A1 | 4/2009 | Endo et al. |
| 2009/0132498 | A1 | 5/2009 | Inose |
| 2009/0157729 | A1 | 6/2009 | Herlocker et al. |
| 2009/0157948 | A1 | 6/2009 | Trichina et al. |
| 2009/0164533 | A1 | 6/2009 | Hubbard |
| 2009/0172733 | A1 | 7/2009 | Gibbon et al. |
| 2009/0187537 | A1* | 7/2009 | Yachin ............. G06F 17/30864 |
| 2009/0216806 | A1 | 8/2009 | Feurstein |
| 2009/0217352 | A1* | 8/2009 | Shen ................. G06F 17/30038 726/3 |
| 2009/0222738 | A1 | 9/2009 | Drieschner |
| 2009/0222755 | A1 | 9/2009 | Drieschner |
| 2009/0228233 | A1 | 9/2009 | Anderson et al. |
| 2009/0228471 | A1 | 9/2009 | Dawson et al. |
| 2010/0064341 | A1 | 3/2010 | Aldera |
| 2010/0088382 | A1 | 4/2010 | Lee |
| 2010/0107119 | A1* | 4/2010 | Libert ............... G06F 17/30126 715/810 |
| 2010/0161503 | A1 | 6/2010 | Foster |
| 2010/0185986 | A1 | 7/2010 | Quintanilla et al. |
| 2010/0211663 | A1 | 8/2010 | Barboy et al. |
| 2010/0235165 | A1 | 9/2010 | Todhunter et al. |
| 2011/0022982 | A1 | 1/2011 | Takaoka et al. |
| 2011/0066658 | A1 | 3/2011 | Rhoads et al. |
| 2011/0078149 | A1 | 3/2011 | Falkenburg et al. |
| 2011/0119616 | A1 | 5/2011 | Suzuki |
| 2011/0178962 | A1 | 7/2011 | Sood |
| 2011/0179108 | A1 | 7/2011 | Sorenson et al. |
| 2011/0196521 | A1 | 8/2011 | Jaim et al. |
| 2011/0258188 | A1 | 10/2011 | AbdAlmageed et al. |
| 2011/0289121 | A1 | 11/2011 | Pirkner |
| 2012/0005282 | A1 | 1/2012 | Steinbok et al. |
| 2012/0158686 | A1 | 6/2012 | Hua et al. |
| 2012/0203733 | A1 | 8/2012 | Zhang |
| 2012/0215786 | A1 | 8/2012 | Abbott et al. |
| 2012/0233122 | A1 | 9/2012 | Briet et al. |
| 2012/0246742 | A1 | 9/2012 | Tresanti |
| 2012/0271790 | A1 | 10/2012 | Lappas et al. |
| 2012/0278512 | A1 | 11/2012 | Alatorre et al. |
| 2013/0005487 | A1 | 1/2013 | Frazzini et al. |
| 2013/0036454 | A1 | 2/2013 | Purvis et al. |
| 2013/0046761 | A1 | 2/2013 | Soderberg et al. |
| 2013/0054638 | A1 | 2/2013 | Kim |
| 2013/0055099 | A1 | 2/2013 | Yao et al. |
| 2013/0095801 | A1 | 4/2013 | Kermoian et al. |
| 2013/0108631 | A1 | 5/2013 | Parussini et al. |
| 2013/0110768 | A1 | 5/2013 | Sakamoto |
| 2013/0110816 | A1 | 5/2013 | Khan et al. |
| 2013/0139191 | A1 | 5/2013 | Ren |
| 2013/0159306 | A1 | 6/2013 | Janssen, Jr. et al. |
| 2013/0179910 | A1 | 7/2013 | Hio |

(56) References Cited

U.S. PATENT DOCUMENTS

| | | |
|---|---|---|
| 2013/0191414 A1 | 7/2013 | Srivastava et al. |
| 2013/0198361 A1 | 8/2013 | Matsuzaki et al. |
| 2013/0218912 A1* | 8/2013 | Howard ............ G06F 17/30657 707/754 |
| 2013/0254184 A1 | 9/2013 | Ellsworth et al. |
| 2013/0254718 A2 | 9/2013 | Kermoian et al. |
| 2013/0325462 A1 | 12/2013 | Somekh et al. |
| 2013/0325769 A1 | 12/2013 | Downs et al. |
| 2013/0346068 A1 | 12/2013 | Solem et al. |
| 2014/0040862 A1* | 2/2014 | Webster .................... G06F 8/61 717/121 |
| 2014/0222802 A1 | 8/2014 | Yan et al. |
| 2014/0282926 A1 | 9/2014 | Torgersrud |
| 2014/0325516 A1 | 10/2014 | Ventroux |
| 2014/0344248 A1 | 11/2014 | Stoop et al. |
| 2014/0354680 A1 | 12/2014 | Eriksson et al. |
| 2014/0365351 A1 | 12/2014 | Carlberg et al. |
| 2014/0372467 A1 | 12/2014 | Locker et al. |
| 2014/0379631 A1 | 12/2014 | Sebastian et al. |
| 2015/0026187 A1 | 1/2015 | Ballou et al. |
| 2015/0046463 A1 | 2/2015 | Mohan |
| 2015/0066941 A1 | 3/2015 | Martin |
| 2015/0149416 A1 | 5/2015 | Dhavale et al. |
| 2015/0186366 A1 | 7/2015 | Yan et al. |
| 2015/0186369 A1 | 7/2015 | Yan et al. |
| 2015/0186381 A1 | 7/2015 | Yan et al. |
| 2015/0186395 A1 | 7/2015 | Yan et al. |
| 2015/0186398 A1 | 7/2015 | Yan et al. |
| 2015/0186420 A1 | 7/2015 | Yan et al. |
| 2015/0186478 A1 | 7/2015 | Yan et al. |
| 2015/0187353 A1 | 7/2015 | Yan et al. |
| 2015/0304447 A1 | 10/2015 | Karp et al. |
| 2016/0096112 A1 | 4/2016 | Sharma et al. |
| 2016/0212208 A1 | 7/2016 | Kulkarni et al. |
| 2016/0226996 A1 | 8/2016 | Shabtai et al. |
| 2016/0283061 A1 | 9/2016 | Dipersia |
| 2017/0063747 A1 | 3/2017 | Chung et al. |

OTHER PUBLICATIONS

Murray et al., "One Module to Many Submissions: Generating Global Marketing Authorization Applications", Drug Information Journal, vol. 34, pp. 779-792, 2000.

Prager et al., Question Answering using Constraint Satisfaction: QA-by-Dossier-wirh-Constraints, ACM 2004, pp. 1-8. (Year: 2004).

* cited by examiner

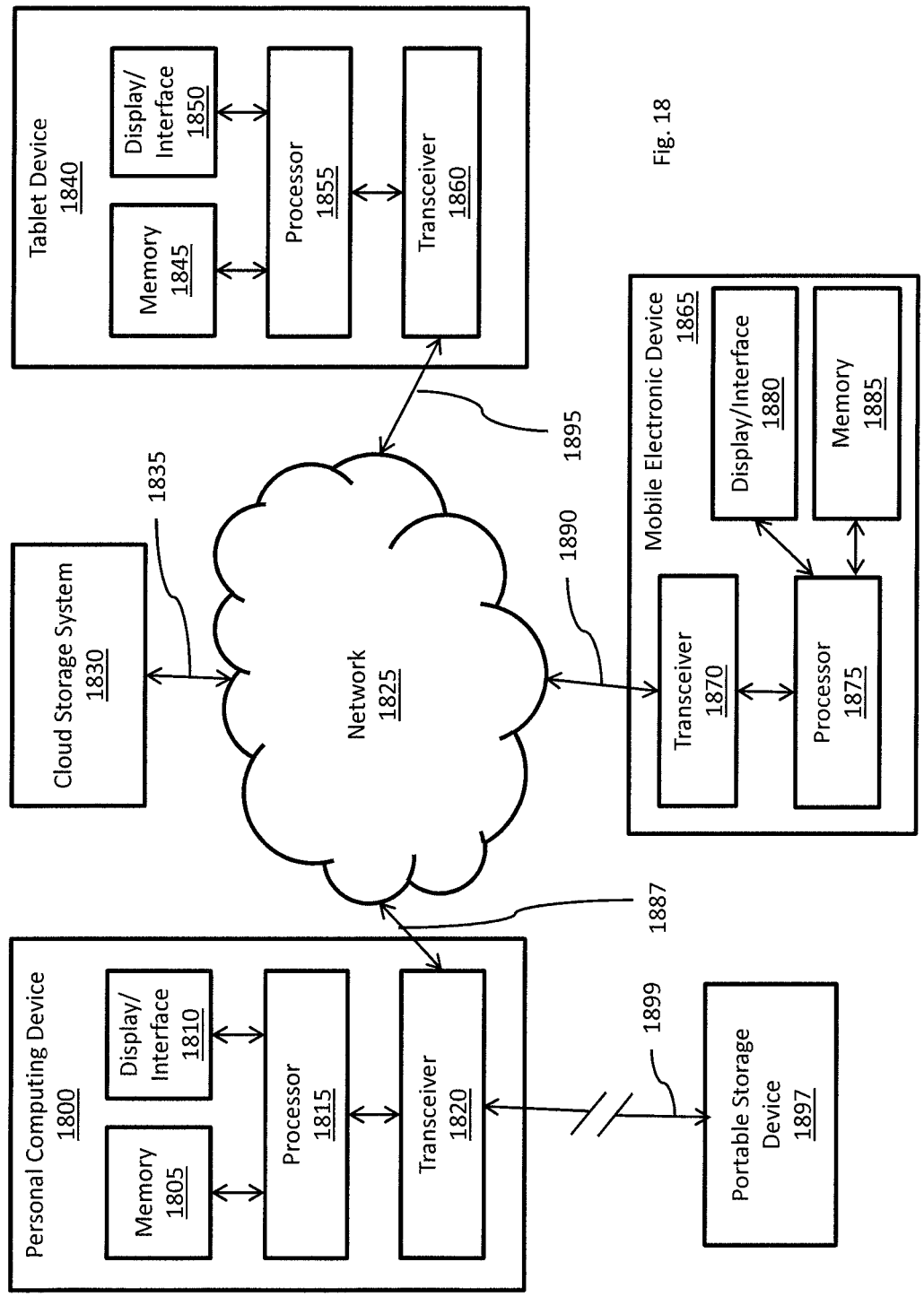

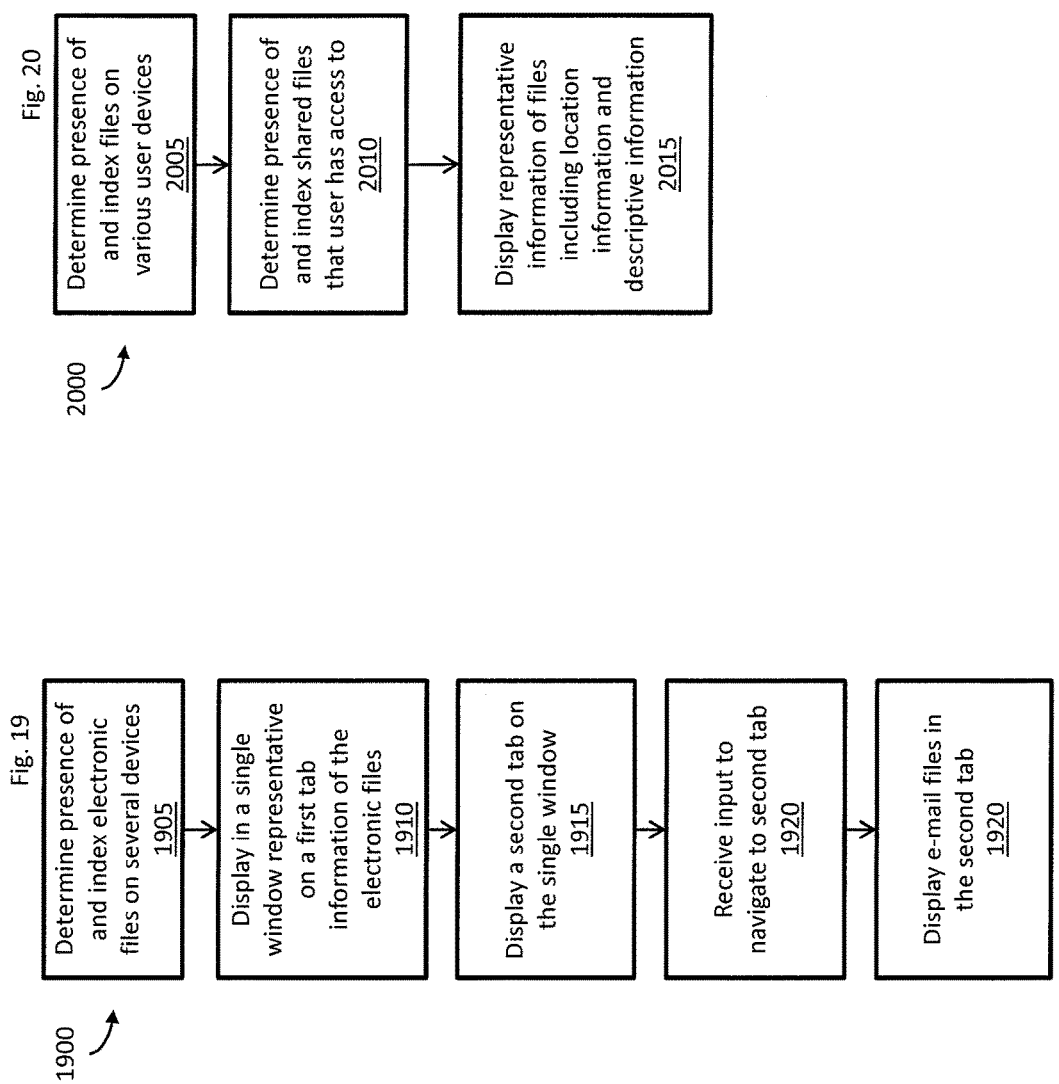

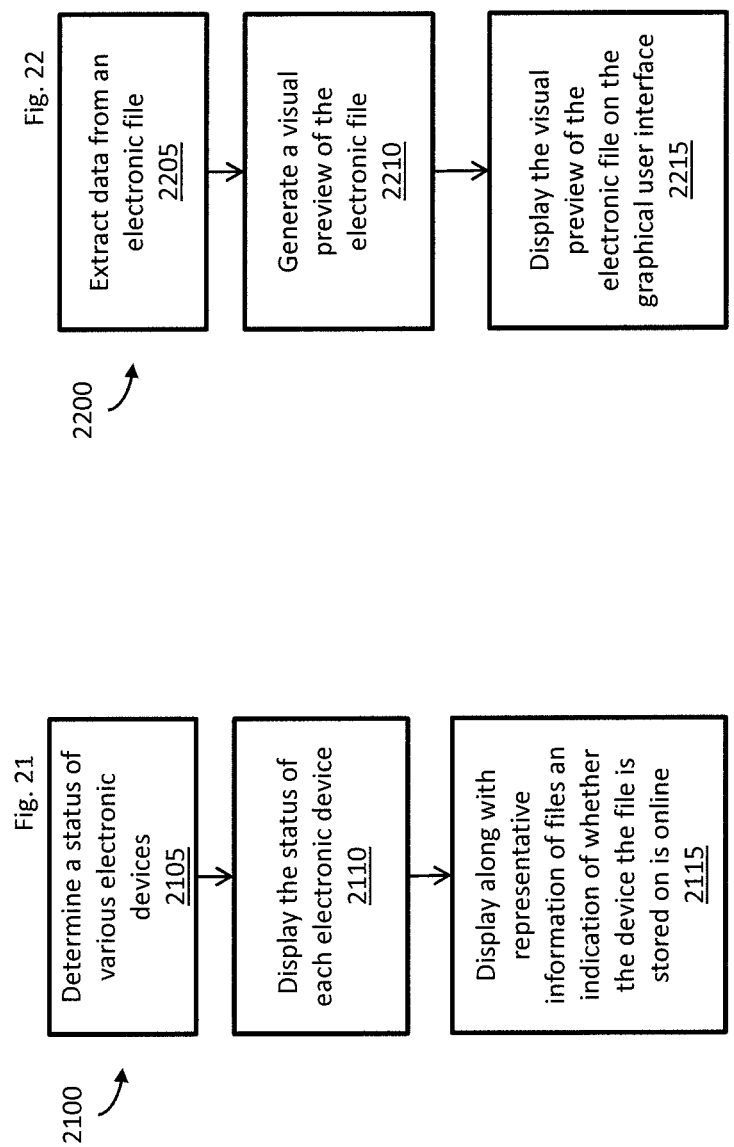

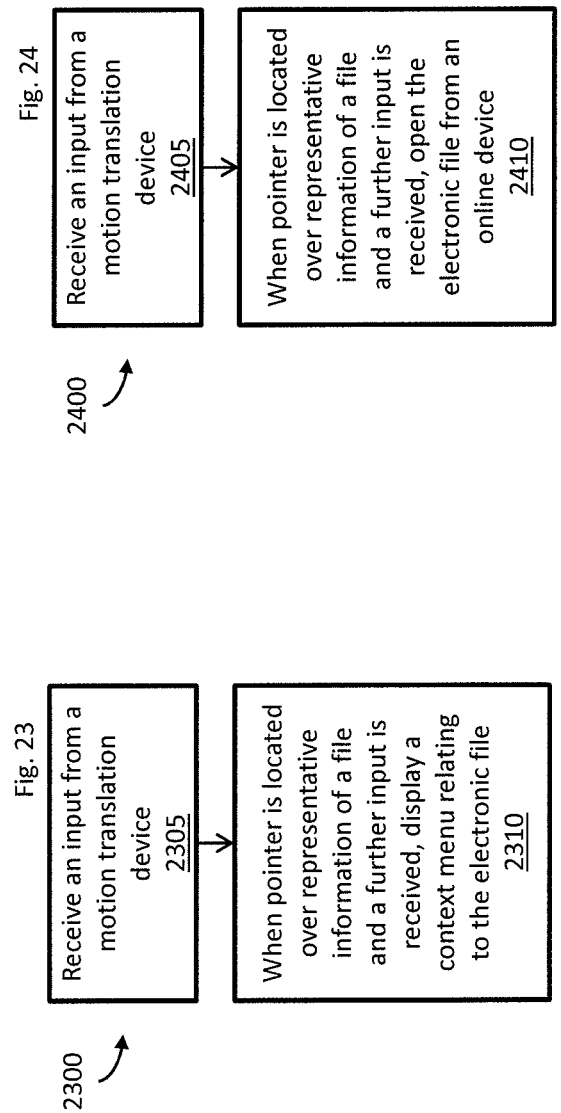

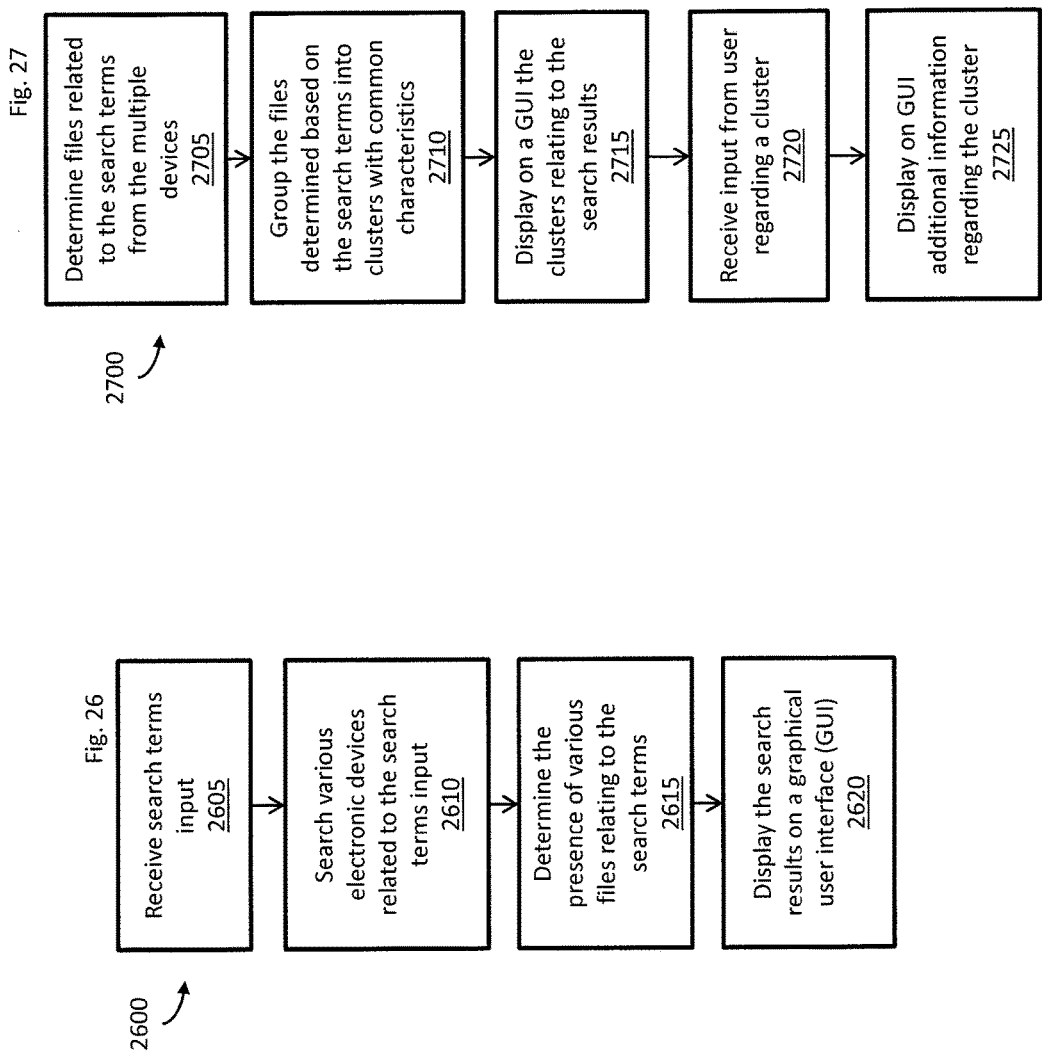

METHOD AND SYSTEM FOR CROSS-PLATFORM SEARCHING OF MULTIPLE INFORMATION SOURCES AND DEVICES

CROSS-REFERENCE TO RELATED PATENT APPLICATION

This non-provisional application claims priority to U.S. Provisional Application 61/922,597 filed on Dec. 31, 2013, the disclosure of which is incorporated herein by reference in its entirety.

BACKGROUND

Many people today use multiple devices and media in their daily activities. For example, a typical person may use laptops, smart phones, tablets, home and work desktops, external hard drives and memory cards, media centers, smart TVs, cameras, DVRs, cloud storage, as well as occasional use of the devices of family, friends, coworkers, or roommates. Across these various devices, people store large quantities of data of varying importance. Additionally, people receive and store files, programs, messages, and other media in external servers, such as e-mail or cloud computing systems.

SUMMARY

An illustrative method according to a set of instructions stored on a memory of a computing device includes receiving, by a processor of the computing device, a search input. The method further includes searching, by the processor, a plurality of electronic storage locations for electronic files related to the search input. The method further includes determining, by the processor, the presence of an electronic file on a first electronic storage location of the plurality of electronic storage locations that is related to the search input. The method further includes displaying, by the processor, on a graphical user interface (GUI), representative information of the electronic file. The representative information includes descriptive information relating to the electronic file.

An illustrative apparatus includes a memory, a processor coupled to the memory, and a first set of instructions stored on the memory and configured to be executed by the processor. The processor is configured to receive a search input. The processor is further configured to search a plurality of electronic storage locations for electronic files related to the search input. The processor is further configured to determine the presence of an electronic file on a first electronic storage location of the plurality of electronic storage locations that is related to the search input. The processor is further configured to display on a graphical user interface (GUI), representative information of the electronic file. The representative information includes descriptive information relating to the electronic file.

A non-transitory computer readable medium has instructions stored thereon that, upon execution by a computing device, cause the computing device to perform the operations including instructions to receive a search input. The instructions also include instructions to search a plurality of electronic storage locations for electronic files related to the search input. The instructions further include instructions to determine the presence of an electronic file on a first electronic storage location of the plurality of electronic storage locations that is related to the search input. The instructions further include instructions to display on a graphical user interface (GUI), representative information of the electronic file. The representative information includes descriptive information relating to the electronic file.

BRIEF DESCRIPTION OF THE DRAWINGS

Illustrative embodiments will hereafter be described with reference to the accompanying drawings.

FIG. 18 is a block diagram illustrating various computing and electronic storage devices that may be used in accordance with an illustrative embodiment.

FIG. 19 is a flow diagram illustrating a method of displaying representative information of files and e-mails on a GUI utilizing a two tab display in accordance with an illustrative embodiment.

FIG. 20 is a flow diagram illustrating a method of determining files a user has access to and displaying representative information of the files on a GUI in accordance with an illustrative embodiment.

FIG. 21 is a flow diagram illustrating a method of determining the status of various electronic devices and displaying that status on a GUI in accordance with an illustrative embodiment.

FIG. 22 is a flow diagram illustrating a method of extracting data from an electronic file and displaying a preview of the file on a GUI in accordance with an illustrative embodiment.

FIG. 23 is a flow diagram illustrating a method of receiving an input from a user and displaying a context menu on a GUI in accordance with an illustrative embodiment.

FIG. 24 is a flow diagram illustrating a method of receiving an input from a user and opening an electronic file to be displayed on a GUI in accordance with an illustrative embodiment.

FIG. 26 is a flow diagram illustrating a method of performing a cross-platform search in accordance with an illustrative embodiment.

FIG. 27 is a flow diagram illustrating a method of grouping search results into clusters in accordance with an illustrative embodiment.

DETAILED DESCRIPTION

Figure 1:
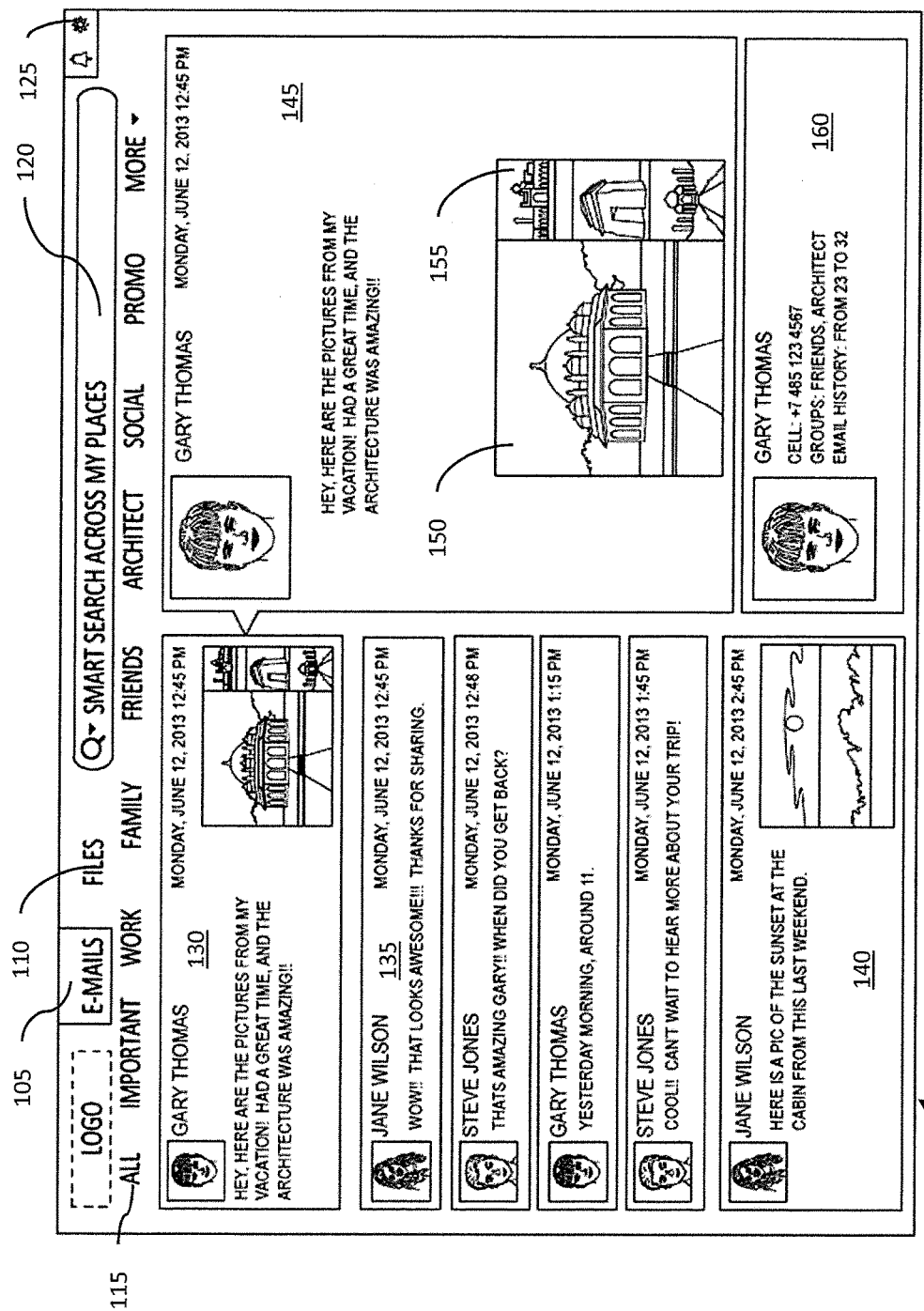
FIG. 1 is a representation of a graphical user interface (GUI) demonstrating an e-mail interface in accordance with an illustrative embodiment.

Described herein are illustrative embodiments for methods and systems for cross-platform searching of multiple information sources and devices. The methods and systems disclosed herein allow a user to perform a single search across multiple different devices to search for different types of data. Such data may include messages, e-mails, documents, presentations, photos, videos, attachments to e-mails, contact information or other data types. This different data may reside on several different electronic devices, such as a tablet, mobile smart phone, laptop computer, desktop computer, digital camera, cloud storage system, smart television device, portable digital media player, wearable electronic device, or other types of electronic devices that are capable of storing electronic files and data. Furthermore, the search may be performed across the various devices regardless of the platforms and operating systems that the electronic devices utilize. For example, various electronic devices may use various operating systems like Microsoft Windows™, iPhone™ Operating System (iOS™), Android™, Unix™, Linux™, Mac OS X™, OS X™, Symbian™ OS, Chrome™ OS, Chromium™ OS, Blackberry™ OS, or other operating systems.

A user may perform a search by entering text regarding the subject of their search. The system may receive the search input from the user and perform the search by looking for electronic files related to the search input throughout several electronic storage locations. As noted above, the electronic storage locations may several different electronic devices and/or types of electronic devices. Additionally, the devices may be in different locations or physically remote from each other. As long as the devices can be communicated with by the device doing the searching, the searched devices can be anywhere. For example, the devices may be connected to the internet and the searching device may perform the search by accessing the memory of the other devices through the internet. Through these communications, the system can determine whether electronic files matching the search inputs are located on any of the searched electronic devices.

In another illustrative embodiment, a user's social media networks may also be searched for electronic files relating to a search. For example, a social networking website may allow or utilize file sharing. Accordingly, the system may search the electronic files a user has access too on social networks when performing a search. The system may also be able to search for contacts from the relationships a user has on a social networking website. Additionally, the system may be able to locate information related to users on a social network that the user does not have a relationship with. For example, a user may be trying to locate the contact information of a person who has previously helped the user do landscaping and yard work. By entering the name of the individual, the system may be able to locate the individual and an e-mail address listed on a social media profile for the individual. Such searching and results may take place irrespective of a formal relationship between the user and the individual on the social media website. However, such searches may be limited by the amount of information that can be accessed and searched for by the user. So in this respect, if the user has an official relationship with someone over a social networking website, such a user may accordingly have more information accessible to the user based on the official relationship. As such, more information may be available to the system for searching and search results.

If the system does locate relevant electronic files, the system can display the results to a user on a graphical user interface (GUI). The results may be displayed using representative information of an electronic file. That is, the entire electronic file may not be displayed on the GUI, but rather certain information relating to a relevant file may be displayed. Representative information may also include a preview of the electronic file. Representative information could also include any sort of metadata about the electronic file, such as the physical location where the electronic file is stored, the size of the electronic file, a date and/or time the electronic file was created or last modified, a file type of the electronic file, a preview of the electronic file, or any other information relating to the electronic file.

The display of search results on a GUI is discussed at length herein. In short, the display of search results may be carried out in a variety of ways. For example, the search results may appear as a list of electronic files that the system has located. Representative information of the electronic files may be displayed in the list. In some embodiments, a preview of one or more of the electronic files may be automatically displayed on the GUI with the search results. In another embodiment, the user may position a mouse or pointer over representative information of an electronic file to get a preview to appear. In another embodiment, the user may have to click on the representative information or otherwise interact with it through the GUI (such as touching the representative information through a touchscreen) to get a preview of an electronic file to appear.

In another embodiment, the system may display on the GUI search results in a way that does not immediately display information directly related to individual electronic files. Instead, the system may display the information in representative groups (also referred to herein as clusters or an amalgamation). The system may display groups of search results based on the various characteristics or traits of the results. For example, electronic files that are found as part of the search results may be sorted according to data type. For example, the results may be sorted and grouped into clusters based on whether each result is a document, presentation, photo or other image, video, e-mail, contact information, message, or other sort of file or data type. The clusters could also contain more than one data type in the same cluster. A cluster could also represent all search results from a particular storage location. A cluster could also represent search results from a certain period of time (when the files were modified or created, for example). The clusters may be automatically determined by the system, or may be configured and defined by the user.

A group or cluster displayed on the GUI may also indicate how many electronic files of each type of files were found during the searching. In another illustrative embodiment, the system may display certain groups or clusters more prominently than others. For example, the system may automatically display a cluster representing documents that were saved on a hard drive more prominently than a cluster representing documents that were attached to e-mail messages. Although the system may automatically display certain groups and/or clusters with more prominence, the system may also be configured by the user to show certain groups or clusters more prominently than others.

A user may also expand a cluster to view representative information of the files that are represented in the cluster. The user may accomplish this through an interaction on the GUI with a particular cluster or group. Representative information of individual files within a cluster or group may also be displayed more prominently than others depending on system defaults or preferences established by the user.

In one illustrative embodiment, the clusters or groups displayed by the system may be displayed as a hierarchical tree structure. In a hierarchical tree structure, results may be shown in groups that are expandable and collapsible to demonstrate more detail regarding the search results. The system may also indicate in a hierarchical tree structure, how many results regarding each level of the hierarchical tree structure there are. For example, a search results may be displayed in clusters as a hierarchical tree structure. The levels initially displayed in the hierarchical tree structure may sort the search results according to a first criteria. For example, the search results may be sorted into clusters depending on a data type. In other words, the search results are sorted based on what type of electronic file each file is. Each level may also display how many relevant files are represented by the cluster or group.

Upon interacting with one of the levels with, for example, a touch screen selection or pointer point and click operation, a cluster or group is expanded on the GUI. In one embodiment, the expanded level may display representative information of each electronic file represented by the cluster or group. In one embodiment, the system may determine to do this where the number of files represented by a cluster are relatively low (for example, five electronic files or fewer). In other embodiments, further sub-levels of the hierarchical tree structure that represent sub-groups of the clusters or groups may be displayed. For example, if a cluster representing e-mail messages is interacted with, further sub-groups sorted by a second data type may be displayed on the GUI. For example, the sub-groups may be sorted by date, such as month and year the e-mail messages were received.

In this way, other sub-groups may also exist, so that a set of search results is organized viewable based on several different categorizations based on data type, metadata, file location, and the like.

In order to determine relevant search results, various types of searching may be performed by the system. For example, morphological searching, metadata searching, tag searching, full text searching, fuzzy searching, or ontology-based semantic searching may all be used, alone or in different combinations, in various illustrative embodiments. For example, morphological searching may automatically utilize searching for words or forms of words that are similar to the words entered as a search term by the user. In another example, the system may utilize metadata and tag searching. In this embodiment, the system can search information that is associated with an electronic file as metadata or tags for information relevant to the search terms entered by the user. In full text searching, the system may search the entire contents of an electronic file for relevance to the search terms entered by the user.

Fuzzy searching, also known as approximate string matching, may also be utilized by the system. Fuzzy searching takes a string of characters entered by the user as a search term and searches for a similar string of characters that approximately match the string of characters entered. In this way, if a search term that is entered has been misspelled, the system may be able to automatically search for the correctly spelled word rather than the misspelled word.

In ontology-based semantic searching, the system may utilize context and interrelated information from electronic files to perform searches. For example, system may examine the content of electronic files on the system and utilize the examination to determine certain relationships or contexts. For example, an e-mail may contain a signature line with the name of a company that the sender works for. As a result, the system could return results for the company broadly during a search where the search terms entered was the name of the sender himself.

In another illustrative embodiment, a user may attempt to perform a search when one or more electronic devices of the user is not online. That is, the electronic device performing the searching may not be in communication with certain of the user's electronic devices when a search is performed. In such an embodiment, the search may only locate electronic files that are located on the available and online electronic devices and cloud storage systems. In an alternative embodiment, however, the system may still be able to search for documents that are stored on an offline electronic device.

For example, the system may maintain an index of electronic files on the various devices of the user that includes information such as metadata and tags about files. The system may search this index when a user performs a search rather than search the memory of each electronic device of the user's in the system. This is particularly advantageous where one or more of the electronic devices is offline while the user is attempting to run a search. Where a device is offline during a search, the system may search the physical memory of online devices while searching the index regarding the offline devices. In another embodiment, the system may only search the index, regardless of whether a device is online or not. In yet another embodiment, the system may start with a search of the index, and may use the results of the index search to determine specific electronic files to further search that are located on the various user devices.

In an alternative embodiment, the index may be a full text index. In this embodiment, the full texts of electronic files are stored on the index. In this way, the system may perform searches on all of the electronic files and their content, even if the electronic files themselves are not currently stored on devices that are online. In another alternative embodiment, only some of the total electronic files on a user's electronic devices may be full text indexed. For example, the system may automatically full text index electronic files from electronic devices that are more likely to be offline than others. For example, the system may full text index electronic files from external hard drives and digital cameras, while not full text indexing a desktop computer. In another embodiment, the user may be able to specify which devices' electronic files should be full text indexed or not. In another embodiment, the system may selectively full text index files based on other criteria. For example, the system may not full text index certain electronic files that are over a certain size. In another example, the system may not full text index certain types of electronic files, such as images and videos. The system may be configured to automatically make such determinations, or the user may configure what types of electronic files to full text index and which electronic files not to.

The user may also be able to set up rules regarding full text indexing. This may be advantageous where the user recognizes the importance of the electronic files selected for full text indexing, particularly where the user knows he or she will have a future desire to fully search said electronic files. For example, the user may set a rule that any e-mail messages and files attached therewith from contact John Smith should be full text indexed. The user may set up a rule based on an important relationship. For example, John Smith may be the user's financial advisor. Accordingly, the user wants to ensure that any correspondence or documentation sent to the user from Mr. Smith is well documented and accessible utilizing the system. In another embodiment, the system may determine these types of rules automatically. For example, the system may determine a user's most important and/or frequent contacts. Any correspondence between an important and/or frequent contact may be automatically fully indexed by the system so that the correspondence is easily searchable and locatable.

In an illustrative embodiment, the system can determine the presence of electronic files of a user among multiple devices and assemble data relating to the files into an index. For example, the user may utilize a tablet, smart phone, laptop, universal serial bus (USB) drive, cloud storage, set top boxes (smart TVs), and many other electronic storage and computing devices and methods. Further, software applications may include files that relate to a user or the user has access to. Such files may include e-mails, messages, chats, documents, pictures, videos, contacts, or other electronic data. The system can determine all of these types of data from a plurality of devices and index the data. Even if a user was not the creator or owner of the document, the system can index the data as long as the user has access to it. The index may be stored on a particular device of the user's, for example, a laptop. The user may also designate which device will store the index. In another embodiment, the index will be stored on a cloud storage system. Advantageously, when the index is stored on a cloud storage system (e.g., a remote server), the index may be updated regarding changes to data or files on any device whenever the device is connected to the internet.

Described herein are illustrative embodiments for methods and systems that provide for a displaying files indicating file location. Also described herein are systems and methods which allow users to disclose, access, distribute, synchronize, manage, and search different types of content and electronic files, including but not limited to file content, communication content, contact content, and other personal information across multiple devices and cloud servers. Also described herein is a graphical user interface (GUI) that displays representative information of different electronic files. The electronic files may be physically stored on multiple devices, but the representative information relating to the electronic files may be displayed on a single GUI. The representative information of an electronic file may include the physical location where the electronic file is stored, the size of the electronic file, a date and/or time the electronic file was created or last modified, a file type of the electronic file, a preview of the electronic file, or any other representative information relating to the electronic file. Furthermore, a user can interact with the GUI to view, open, access, organize, backup, synchronize, distribute, or locate different electronic files stored on various electronic devices. Representative information as defined herein may include, but is not limited to, various types of metadata.

After electronic files such as documents, pictures, e-mails, contact information, and the like have been indexed, representative information of the electronic files can be displayed on a graphical user interface (GUI) to a user. In one embodiment, the representative information may be displayed in a single window format. Representative information may include a file name, a file preview, date last modified, version number, date created, number of related files, number of files in a folder, and any other information relating to an electronic file. In some embodiments, the representative information may include information regarding the location of the electronic file. The location information can be indicated utilizing a symbol or icon. For example, if a file is on the user's smartphone, a smartphone icon may be used to indicate the location of the file. Different icons or symbols may have different shapes, colors, sizes, or text content. For example, the device where a file is stored may be part of the representative information. The system may also index a so-called virtual location of a file. For example, regardless of where an e-mail might be physically stored, it might be virtually located in a user's e-mail inbox within the system and displayed as such whenever the inbox is displayed on the GUI. In this case, the system may indicate either or both of the virtual and physical locations. In some embodiments, the representative information may be displayed in a single window, but may be divided within a multiple tab configuration. For example, a GUI may include tabs for files, photos, e-mails, and contacts. In another embodiment, the GUI may have tabs for files and e-mails, where photos are categorized under files and contacts are categorized under e-mails. The user may be able to switch between tabs by interacting with the GUI. For example, a user may utilize a motion translation device and input, such as a touchscreen in which the user may touch the location on the screen where one of the tabs appears, activating and displaying that tab. To switch to a different tab, the user may touch the different tab. In another example, the user may use a mouse or touchpad to locate a pointer over the desired tab on the GUI. The user may then make another input, such as a single mouse click, to activate and display the desired tab the pointer is located over.

Whether or not tabs are used, the representative information of electronic files displayed by the system may include information relating to where and how the electronic files are stored. For example, the representative information may include an indication that the file is stored on a particular device or in a cloud storage system. The representative information may also include an indication of whether the file has been backed-up or not. The representative information may also include the location of a backed-up copy of the file. The representative information may also include an indication of whether the device where the file is stored is online or offline. In the case where a file is stored on two different devices, the system may indicate the status of both devices. In another embodiment, the system may only indicate enough about the status of the devices to indicate whether the file is available for opening and/or editing. For example, if a file is on two different devices, and one is online and one is not, the system may indicate on a GUI that the device where the file is stored is online, because the user's actual access to the file is not hindered by one of the devices being offline. Other status's than online and offline may also be indicated by the system. For example, the connections speed or status of a device may be indicated. In another example, a passive or active status may be indicated. Such a status may be relevant if a computing device has a standby, sleep, hibernate, or screen saver mode that restricts remote access to the memory of the device. In another example, instead of online or offline which indicates communication between two devices over a network, a device status may be connected or unconnected. This may be useful for a secure digital (SD) card, portable hard drive, or USB storage device, where the devices are connected directly to a computing device rather than communicating with devices over a network. Other potential statuses that may be indicated by the system about a computing device may include a currently operational status, a currently non-operational status, or a set in a lower functional mode status. Despite the status of a device however, if a file has been previously indexed, the representative information relating to the file can be displayed.

In an illustrative embodiment, the representative information for a file may be manipulated or changed by the user. For example, if the user receives a file through a file sharing website or attached to an e-mail, the file may have a computer generated name or a name that is otherwise undesirable by the user. Accordingly, the user may then change the name of the file that is used in the representative information. Any other of the representative information may also be changed by the user.

The system may also display a preview of electronic files on the GUI. This may occur automatically, or may occur based on some sort of interaction by the user with the GUI. For example, the system may display the preview only if the user clicks or taps on the file once. In another example, a preview may be displayed when the user moves a pointer over a file. In another embodiment, a preview may be automatically displayed, but a further preview may be displayed when a file is interacted with. For example, the first page of a document may be shown, and when a pointer is moved over the document, the second page of the document is shown. In another example, a thumbnail of a picture may be shown. When the user moves a pointer over the thumbnail, a larger and/or more high resolution version of the photo may be displayed by the system. In order to generate the preview of electronic files, the system may extract all or a portion of content from an electronic file to generate the preview. For example, where a first page of a document is used as a preview image, the first page of the document is extracted. Various types of previews may be displayed by the system. For example, a preview may include a first group of words from a document or message (such as an e-mail). Another preview may be a thumbnail image of a larger image, or a screen shot of a video. The preview image could also include some or all of the contact information relating to an e-mail or other type of message. A preview image could also include a task information relating to an electronic file. For example, where the electronic file is a task list, reminder list, or calendar, such a task list, reminder list, or calendar may include information that can be used in the preview. For example, a reminder list may include an item reminding the user to pay their rent. Accordingly, a preview of the reminder list or of the item on the reminder list itself may include the text "Rent is Due!" In another embodiment, such a task or preview may be derived from an e-mail, such as an e-mail requesting information from the user. The preview of such an e-mail may include text indicating the request.

In another illustrative embodiment, context menus may be used. Context menus are menus that pop-up on the GUI relating to a particular part of the GUI. For example, a context menu may pop-up if a user moves their mouse over the representative information of an electronic file. In another embodiment, the user can move a pointer over the representative information and make another input, such as a mouse click, to get the context menu to display. In other embodiments, such as when a touch screen is in use, the user may only input with regard to the representative information, and a pointer may not be utilized. A context menu may include information related to a particular electronic file or actions that may be taken related to the electronic file. For example, a context menu may indicate that an electronic file is classified as read only. In another example, a context menu may present a user with options relating to the electronic file, such as download the file, delete the file, rename the file, move the file, back-up or copy the file, etc.

In another illustrative embodiment, various user inputs and interactions may be made to effectuate opening an electronic file by clicking on or otherwise interacting with the representative information of a file on the GUI. For example, if the user wishes to open a document stored on a laptop, even though the user is currently using a tablet, the user may activate the system disclosed herein. The user can then navigate to or search for the representative information of the document desired, and tap on it through the touch screen of the tablet. The system receives the input from the user, and the system then uses an application that matches the file type of the document to open the document and display it to the user on the tablet. The application may be located on the tablet or located elsewhere. As long as the system has access to the application, the document can be opened. In an alternative embodiment, the system may select an application to utilize when opening a document based on a number of factors. For example, the system may consider whether the user made any choices regarding what application to use (e.g., an open-with option) or how the file should be displayed (e.g., read-only). The system may also choose an application that is appropriate for the device the user is currently using. The system may also select an alternative application to use where a preferred application is not available. In an alternative embodiment, electronic files that have been opened may be displayed directly by the system and even edited within the GUI. If a document is not available (for example, the device where the document is stored is offline), the system may automatically find another copy or replica of the document on another device and open that one. In this way, the user may never have to worry about how the document is actually opened. For example, there may be a copy or replica of the document on an external hard drive, a cloud storage server, or the user's home personal computer (PC). In another embodiment, the system may be able to locate a copy or a replica of the document on an e-mail server or otherwise find it among other message types that the user has sent or received.

In another illustrative embodiment, the GUI may display some representative information more prominently than other representative information. For example, if the representative information includes an icon such as a piece of paper type icon for a document. The piece of paper type icon for certain files may be displayed larger and/or further toward the top of the GUI than the icons for other files. Such a difference in prominence may be random, so as to make the display less monotonous and more pleasing to the eye. If groups of files are displayed together in a solitary representative information, different groups of files represented by an icon or symbol may also be displayed more prominently than other groups or individual files. In another embodiment, such differences in prominence may result from a decision made by the system to display the representative information of the files accordingly. For example, the system may determine to display more recently opened or edited files more prominently. In another example, the system may display messages that have been received but not read or responded to more prominently. In another example, the system may display photos or videos posted to the user's social networks that have a relatively greater number of social interactions with others on the social networks more prominently. If the system is displaying search results, the system may display results with more relevance to the search more prominently. Other criteria, such as number of times modified, date created, size of the file, or tag or metadata associated with the file, may also be used by the system to determine how to determine representative information to display more prominently on the GUI.

In another illustrative embodiment, the GUI may also display a representation of a current storage utilization of a device in which the GUI is being displayed. For example, the representation may include a graphical representation indicating a percentage or fixed amount of free storage space and used storage space. In another embodiment, such a representation may be used to indicate an amount of free and used storage space on a different device. In another embodiment, such a representation may be used to indicate an amount of free and used storage space on all of the user's devices combined. In another embodiment, such a representation may be used to indicate an amount of free and used storage space in a portion of a cloud storage space allotted to the user. In yet another embodiment, such a representation may be used to indicate an amount of free and used storage space in all of the user's devices and the portion of the cloud storage space allotted to the user.

In another illustrative embodiment, the representative information displayed on the GUI may include a hierarchical tree structure. Such a tree structure may indicate the various physical devices of the user and the files and folders stored thereon. The hierarchical tree structure may also indicate the files and folders stored on a user's allotted cloud storage space. In addition to showing where files are physically stored on various devices and/or cloud storage space, a hierarchical tree structure may alternatively or additionally display files in their designated virtual locations. A virtual file location is defined herein as a location the system visualizes a file being in, even if the file is not physically stored there. For example, a virtual location of "My Music" may contain all of a user's audio files, regardless of what device or folder the audio files are in. Thus, each audio file has a virtual location of the My Music folder. Other files and contacts may similarly have other virtual locations as determined by the system or the user. A virtual file is defined herein as a file that is a merged version of several files. The virtual file may physically exist on a storage device, or may exist locally when opened by the user and incorporates data from multiple physical files. A virtual file may be displayed as representative information on the GUI. The representative information may indicate that it is a virtual file, or the representative information may appear similar to the representative information for any other file, not indicating to the user that the file is a virtual file.

In an alternative embodiment, the representative information displayed on the GUI may be an amalgamation of representative information of multiple files. For example, the amalgamation may be represented by a circle. The circle may be sized according to the number of files represented by the amalgamation, a relative importance of the grouping of files, or other criteria. The amalgamation may also include text, such as the device or devices where the files in the amalgamation are stored, a file type or types of the files in the amalgamation, a total size of the amalgamation, or a preview of at least one of the files in the amalgamation.

Electronic files indexed, displayed, used, etc. by the system can include many things. For example, files as defined herein may include things such as documents, presentations, spreadsheets, e-mails, messages, audio files, video files, contact information, web pages, information from webpages, tasks, calendars, and the like. Such files may be gleaned by the system from various sources such as local file storages powered with operating systems (e.g., laptops, phones, tablets, media centers, etc.), external passive file storages (e.g., external hard drives, memory sticks, CD/DVD's, etc.), cloud storages (e.g., Dropbox™, Google Drive™, Evernote™, Flickr™' Facebook™ galleries, etc.), e-mail accounts (e.g., Gmail™, Hotmail™, Yahoo™ mail, exchange servers, etc.), messenger services (e.g., Twitter™, Skype™, SMS, Snapchat™, Viber™, Google Hangouts™, etc.), social media feeds (e.g., Facebook™' Google+™ LinkedIN™, etc.), contact lists (from e.g., e-mail accounts, messengers, telephone, personal address books, Outlook™ contacts, etc.), tasks, calendars, dictionaries, encyclopedias, internet sites, and any other services like FineReader™ online.

Advantageously, the systems and methods disclosed herein provide benefits over an exclusive utilization of cloud storage. Some people store information in a cloud storage in order to synchronize information on different personal devices. However, for other people, cloud storage is not necessary because personal devices have become very productive, and often have sufficient capabilities to handle the needs of many users without resorting to cloud storage strategies. In other cases, the amount of data produced by some people is so massive that transferring that data to cloud servers may be cumbersome and time consuming. For example, a digital camera owner may return from a vacation with hundreds, if not thousands, of photos or videos in high resolution. If these photos and videos were moved to cloud storage, the photos and videos could occupy multiple gigabytes of memory in the cloud storage servers, and may additionally severely tax data transfer resources to move all the photos and videos to a cloud server. Further, many devices have become wirelessly connected to each other (e.g., smart TVs, media centers, cameras, fitness bracelets, Google™-glasses, other wearable computers, etc.) so that it may be preferable to keep some data on local devices rather than remote servers. Additionally, much of the data that could be stored on a cloud storage may never be used again, thus unnecessarily taking up space on the cloud storage servers.

Accordingly, there may not be sufficient resources and/or desire to move vast quantities of generated data from multiple devices to cloud storage and organize all of the data. Additionally, cloud storage systems or leaving data on multiple devices may not be satisfactorily searchable to make such methods for file storage useful.

The systems and methods discussed herein provide for a multiple device storage system where files can be organized across all personal devices, cloud locations, and applications (e.g., e-mail, word processing, videos, pictures, etc.). Further, people share computer files sending them as e-mail attachments or attaching them to instant messages, social media feeds, blogs, or publishing them in their galleries or cloud storages. Accordingly, the systems and methods herein provide for organization and searching not only across all personal devices and cloud locations but also through a user's e-mails, instant messages, social media feeds, blogs, media galleries, and other communication content.

In one illustrative embodiment, a system can display, access, distribute, synchronize, manage, and search different types of content, including but not limited to file content, communication content, contact content and other personal information across multiple devices and cloud servers. The system may also include a server system that communicatively couples to an agent-type application on one or more client devices.

In one illustrative embodiment, a user may be able to perform a customizable search. For example, a user may wish to only search for a certain type of electronic files or content, such as contact information files. In this example, the user is able to specify that contact information files should be searched. In another example, the user may wish to only search among spreadsheet type electronic files. In another embodiment, the user may specify that he or she would only like to search among electronic files that are stored on particular electronic devices. For example, a user may specify that he or she would only like to search for electronic files on the user's mobile phone and cloud storage system. In other examples, these functionalities may be combined and mixed by the user. For example, the user may specify in the system that only videos from the desktop computer are the subject of a search.

In another illustrative embodiment, a method provides multi-platform content access, distribution, and synchronization of files on different devices including using a client-side application to manage transfer and presentation of files on a device and across server systems.

In another illustrative embodiment, a method provides multi-platform content access including full-text indexing of the content, files, and metadata of files located on a device and searching of files using full text index located on a server system.

In another embodiment, a method is disclosed for displaying data from local, external, offline, and other sources in a single interface presented to a user. The display can also include information on where the data and/or files are actually stored.

In another embodiment, a computer-readable medium may include instructions executable by a processor to cause the processor to perform functions enabling multi-platform content access, distribution, and synchronization on different devices. Such instructions may be embodied in a client-side computer organization application. In addition to the foregoing embodiments, other systems and computer program product embodiments are provided and supply related advantages.

The number of devices that a user may implement in her day-to-day life has proliferated. While these individual devices are often-times interconnected via, for example, wireless networking, cellular networking, and other infrastructures, systems and methods as disclosed herein can effectively manage data shared between such devices. For example, the systems and methods disclosed herein address platform content access, distribution, and synchronization of data and files, while managing the data and files as well.

The systems and methods disclosed herein better effectuate such platform content access, distribution, and synchronization, while at the same time managing the data itself so as to make more effective use of available cloud-based solutions. Finally, the systems and methods disclosed herein provide for utilizing multiple, yet interconnected, devices while making file organization over such devices and systems easy for a user.

The embodiments disclosed herein provide a convenient one-stop (unified) access to multiple forms of personal data. The embodiments facilitate a unified catalog of personal files across all devices, as well as an ability to view or play files locally or remotely.

In addition, the embodiments disclosed herein provide file and/or data management functionality, such as opening, copying, moving, deleting, archiving, sharing, and editing. The disclosed embodiments promote technology to automatically smart move files in a user's family cloud, so that there is always space on the user's phone and laptop, and the most necessary files are always at hand.

The embodiments disclosed herein also provide search functionality. Advantageously, the search functionalities disclosed herein expand searching beyond file name searching. This may be helpful where, for example, files arrive in e-mail or are shared online or by other means and have a computer generated file name. Accordingly, the embodiments disclosed herein can examine the metadata for full-text content utilizing a fuzzy search, within the meaning according to different ontologies, etc.

In an illustrative embodiment, the system searches not only electronic files on the user's electronic devices and cloud storage systems, but also any electronic files that are shared with the user through file sharing websites and other mediums. For example, some cloud storage systems facilitate the sharing of electronic files amongst its user base. The system in this embodiment can seamlessly search such shared documents, whether or not they were authored by the user, as part of other searches for electronic files. That is, the user may not even notice that his or her searches are including shared documents. Of course, in an alternative embodiment, the system may indicate in the search results that certain results are shared documents. In another additional embodiment, the user may be able to specify that a shared document search be performed. In another embodiment, someone may share a contact list with the user. This may be through an e-mail exchange or other application. In this case, the shared contact list may also be searchable by the system. Other types of shared electronic files may also be searchable like the other examples given here.

The embodiments disclosed herein also provide privacy/security functionality. In some embodiments, a repository of data will not be stored in the cloud for users concerned about privacy and security issues. There may be temporary or compartmentalized storage for proxy caching, data manipulation, or convenience, but significant duplication or long-term storage in the cloud can be avoided. Additionally, some embodiments may include no indexing or cataloguing of data in the cloud to ensure data protection, theft protection, corruption, integrity of data, and related issues with cloud based repositories. Further, some embodiments may keep no file catalogue or full theft index in the cloud. Further still, the architecture envisioned can either utilize or not utilize a mirrored or master copy of the index/catalogue data in the cloud. In some embodiments, a mirrored or master copy of the index/catalogue data in the cloud may be stored and indexed locally on the client side to facilitate local control of the index. In some cases, such an arrangement may be considered a peer-to-peer index and data synchronization process.

As will be further described, the embodiments disclosed herein provide search and data management functionality over an entire available range of data storage mediums and systems of exchange between devices. For example, various embodiments disclosed herein promote (a) disclosure, (b) manage, and (c) search information functionality for (1) locally stored files, (2) offline files, (3) cloud-based files, (4) e-mail information (whether stored locally, offline, or remotely), (5) instant message/short message format information (again stored in a variety of locations), (6) social media feeds, (7) contact information, (8) other type of content including but not limited to dictionaries and encyclopedias, tasks, calendars, etc.

An illustrative embodiment includes a distributed platform and a client application that allows users to have very easy access to their files and e-mail. The embodiment brings together all user information sources available in the user's network, including local and cloud sources, external devices, social networks, e-mail, and telephone communications. Furthermore, the embodiment allows for data management, which may be configured to be seamless and automatic. For example, one of the user's devices may be running out of available storage space on a particular data medium. The system may make the decision to migrate data in order to free space, or perform backup operations.

Another illustrative embodiment includes a platform based on a back-end and a front-end, native client and external device architecture. Any product/service that generates data and files (documents or messages) can integrate with this platform as a source of data and files. Accordingly, the user can see these data and files in a uniform interface with an ability to search, tag, preview, manage, share, etc. The platform may include built-in smart rules and notification functionality. For example, a particular device may be wearable, such as a fitness bracelet. This device, through the embodiments disclosed herein, may trigger a rule or notification based on the activity of the user to provide an alert. Moreover, embodiments as disclosed herein may include infrastructure through which data may be displayed. For example, a user may again be wearing a device, through which the infrastructure facilitates the viewing of a video message or otherwise displays data.

In an illustrative embodiment and from the point of view of architecture-agent software is installed under Operating System (OS) software. The agent extracts text and metadata from all local files and e-mail and passes on the data to a server or other local or remote processing device (herein referred to as cloud service) for indexing. The agent monitors changes in files. The agent collects the actual aggregate of all the devices of the user code and creates a local copy of the relevant index (cache).

In an illustrative embodiment and from the point of view of the user interface, the cloud service provides a combination of a simple, but very dynamic, attractive, and convenient e-mail client and a simple, but very comfortable file manager. Such a program may function in ways used in a traditional e-mail client (e.g., Microsoft™ Outlook™), but also may include the ability to view not only an e-mail message but also files included in correspondence. This program, a client tied to the cloud service, or cloud service client, may be implemented for desktop operating systems (OSX™ and Windows™), and for mobile operating systems, such as iOS™ and Android™.

In one illustrative embodiment, the cloud service client interface for desktop OS is very fresh and light in the spirit of interfaces for mobile OS. This program is not intended to replace traditional e-mail clients or file managers, but aims to make working with mail and files easier. For example, a first type of functionality may serve to review incoming mail. A system may provide a radically more convenient way of presenting the incoming mail than traditional systems, such as Outlook™ and Mac Mail. Such a presentation may be based on the fact that important messages are displayed in a different way than un-important messages. Another feature of such a system may relate to the formation of responses to messages directly within the cloud service client.

Furthermore, content management technology can be used with a mail client, which facilitates easy sharing of local files. In the system, a file may be shared as either a copy or a replica. For the purposes of this disclosure, a copy of a file is identical to the original file at the time of duplication, but is not automatically updated after changes in the original file on a separate machine. A replica of a file is identical to the original file at the time of duplication, and is automatically updated after changes are made to the original file, even if the original file exists on a separate machine than the replica file.

In one embodiment, efficient management of photos and/or video information on personal devices is possible. Such embodiments allow for the following objectives to be realized. The local storage associated with the camera can be emptied, or at least can always have some available memory. The data can be made accessible from and to the user's network of devices, from cameras, phones, tablets, wearable devices, and others. The data can be made accessible to the user's contacts. The data can be retained in one backup location, while freeing space on the user's other devices. Finally, the interface allows Original Equipment Manufacturers (OEMs) access to retain communication with the user to enhance consumer loyalty, address usage (i.e., provide instruction to the user), and maintain accessibility in the event of a recall, warranty, or other consumer support issue.

Illustrated embodiments incorporate innovative data management functionality, for example, an ability to automatically move the files between a user's devices and a public, private, or personal storage account, so that: (1) the cloud service client moves important and frequently used files to the user's local device, (2) the client always maintains a certain predetermined amount of free space (e.g., 25%, 30%, 35%, 40%, etc.) on the local device by gradually moving less-used files to remote devices, and (3), the client keeps copies of important files at 2 or 3 physical locations on different devices to avoid data loss caused by the loss of one of the devices or data unavailability due to no network access. In other words, an important file can still be accessed from one device even while a second device containing the file is offline.

An example can be the following usage scenario. A user inserts a secure digital (SD) card containing photos into a device. The system then copies newer photos on the SD card to a photo folder on the local device, while retaining free space on the device as will be further described. The system can then apply optional photo filters, smart tagging, object-facial recognition, audio tagging, and the like. Newer photos are then replicated from the photo folder to an external hard drive or default backup device. The newer photos can also be replicated from the photo folder to a replica at a remote storage location (e.g., cloud). The replica copies on the cloud storage may serve as the backup copies or may be separate from the backup copies. The user is then able to share the photos with contacts as indicated on the interface. For example, certain icons may be displayed to indicate that the photos are available in the system. The user may be able to click on an icon of the interface to start a slide show, share the photos, or perform another activity.

In an additional usage scenario, the user may turn on a scanner, and receive scans to a scan folder on his laptop. The mechanisms retain enough free space on the laptop by moving older images and retaining newer ones. The system may also apply photo filters, de-skew, perspective correction, optical character recognition (OCR), smart tagging, object-facial recognition, audio-tagging and the like. Newer scans can be replicated from the scan folder on the laptop to an external hard drive or default backup device. Newer scans can also be replicated from the scan folder to the remote storage location, again while retaining a certain amount of designated free space on the laptop and external and remote storage locations. The user is therefore able to share the scan with contacts as indicated by the interface.

In another embodiment, the system may implement an external communications link with a device that is accessible via the Internet, for example. The link may be provided to a user, whom after a short registration process then has the ability to connect a device through the external communications link, which then provides the user with OEM vendor content and accessibility through the interface. For example, the user may be asked to register an SD card, or verify a camera connection, during which the camera version is determined or confirmed. The mechanisms then will allow bi-directional communication between the user and the OEM via, for example, a designated tab, which may display OEM vendor content therein.

Software incorporating such embodiments may be installed via sharing (link shared via e-mail or other social networking contact), file sharing requiring installation of the software itself, or download from the appropriate website. Upon first use, the software may prompt for login information. If the user has used the software before, the user may be prompted to enter a login ID (such as an e-mail address) and a personal password. If the user has not used the software before, the user may be prompted to enter their e-mail address. A confirmation message can then be sent to the user's e-mail address that includes a temporary password in the message.

After confirming the user's e-mail address by using the temporary password to log in, a software window is displayed. In one illustrative embodiment, the left-hand side of the software window is empty initially. This side may be referred to as the workspace. On the right-hand side of the software window, available icons for sources such as my hard drive, external drives, if currently connected, cloud drives, Exchange, mail servers (Gmail etc.), other locations: camera, media centers etc., and other computers may be displayed. A user may be able to interact with the icons that represent the various sources. For example, a user may be able to drag an icon representing a source into the left-hand side workspace. By doing so, the software will recognize that the user has assigned that service or device to their personal cloud. The dragging may be accomplished using a mouse in a point and click fashion, or may be accomplished using a touch screen of some kind.

For example, the user may drag their hard drive icon to the left (the workspace). The software can further query the user for specific folders from the device that are to be indexed. By default, it suggests to index all folders on the user's local disk except for applications. The user can also connect their traditional e-mail clients (e.g., Outlook™, Exchange™ etc.). As soon as devices are assigned to the user's personal cloud, the workspace on the left is filled with a list of folders and files that have been assigned to the cloud storage.

At the top of the graphical user interface (GUI) window, the user views two large tabs: one for files and one for e-mail. In an alternative embodiment, a third tab may also be presented on the GUI for contacts. In other embodiments, other tabs may exist as well. For example, other tabs may include calendar and tasks tabs. A search field may also be presented on the GUI. As the sources are indexed, the system may display on the GUI a progress of the indexing. In the indexing, the system can detect duplicate files or very similar files in the user's personal cloud or other devices. For example, such matched files categorized as duplicates or other matched files may be categorized based on how well they match each other. For example, 100% duplicate files may have the exact same content and metadata, including the date and time the files were created and/or modified. In another example, 99.9% duplicate files may have the same content and metadata, save for being created at and/or modified at a different date and time. In another example, 99.8% duplicates may have the same content but may have different other metadata, such as a different file name. In another example, 99% similar files may have small differences in content.

The system may offer to consider files that are not 100% duplicate files as different versions. In an alternative embodiment, the system may utilize a different threshold. For example, the system may only offer to consider files that are 99% similar as different versions. The system may also consider the date and author of a last modification of a file, which of the files originates in an e-mail, by whom a possible e-mail was sent, when a possible e-mail was sent, etc. The system may utilize that information to make automatic decisions for indexing files. For example, if files meet a certain threshold of similarity or are duplicates, the system may only save the most recently modified version. In another example, the system may save all versions of the file but designate one version as an official version using one of the aforementioned criteria. In another embodiment, the system may offer to merge duplicates into one file. In such a case, the system may treat these physical files as a single logical file and synchronize the changes of this file across all its physical copies. If the duplicate is located within the same physical medium, the software will remove the physical duplicate (keeping an official copy).

The system may also analyze a user's e-mails and clear up the user's disorganization in contacts. Namely, the system may assign heuristically photos (or avatars) to any contacts of the user. The system may also obtain the photos or other information about the contacts from the user's social networks. For example, the system may obtain the 50 most active contacts with whom the user had communications in the last six months and may search for their e-mail addresses in a first social network. The system may also use other criteria to search for the contacts in the first social network, such as name or other data relating to a contact that the system may be able to glean from e-mails from the contacts or information manually entered by the user relating to the contacts. If the system fails to find such persons in the first social network, the system may move to a second social network and search for the contacts there using similar methods. The system may also locate contacts on social networks by searching for similar names to the contacts among friends of the user (such methods may include transliteration and fuzzy search functionality).

In one embodiment, for each contact that a user has, a kind of dossier can be assembled for each contact. That is, the system can associate documents, files, e-mails, photos, etc. with each of the user's contacts. The system may also identify among all of the user's e-mail addresses, e-mail addresses that are preferred for e-mailing a contact, e-mail addresses that are not preferred for e-mailing a contact, and any wrong e-mail addresses (either e-mail addresses that are not valid or e-mail addresses that are not properly associated with the correct contact). The system may also add comments to e-mail addresses. Similarly, the system may clean up phone numbers on a contact list by analyzing the history of the user's SMS correspondence and phone calls. The system may also associate phone numbers with e-mail addresses that belong to the same contact.

Further, the system can analyze actual correspondence and make a brief summary of the user's relationship with a contact. For example, the system may determine the main theme of the correspondence, the degree of importance to the user of the contact or correspondence, or recommendations based on a particular correspondence. For example, a recommendation may be based on an e-mail from several months ago that asked the user for information, but has not yet been responded to. Such recommendations may be configurable by a user, or turned on and off by a user. In this case, the system may recommend that the user write a response, and the system may further prompt the user to include an answer to the specific inquiry in the original correspondence from several months ago. Any length of time used to determine a recommendation may also be configurable by the user. In another example, the system may note that a family member's birthday or anniversary is approaching, and the system may therefore alert the user to send them a message. The user may further be able to configure how long before such a birthday or anniversary the user should be alerted by the system. The user may further specify which family members or other contacts recommendations for special events like birthdays and/or anniversaries should generate alerts. In a similar example, the system may determine that a user has not sent an e-mail to a grandparent in two months. The system may send the user an alert that the grandparent should be e-mailed, which again can be fully configurable by the user. In another example, the system could generate a recommendation to correspondences that request a response (RSVP) for an event. Another example where a recommendation may be made is if correspondence indicates that the user owes someone money. The system may send such recommendations to the user in a variety of ways. The system may send the user a short message service (SMS) message, an e-mail message, a Facebook™ message, or other type of message that includes the recommendation. The recommendations could also be added to a calendar, task list, or reminder list for the user. In another embodiment, the recommendation could comprise an icon displayed along with the e-mail message.

In an illustrative embodiment, data to or from each contact can be automatically assigned a rank of importance.

The rank of importance could be represented by a number, such as a number from 1 to 100. The rank of importance could also be a high, medium, or low categorization. Other ways of ranking may also be used. The user may change the ranking system manually, and may also change the rank of particular data manually. The ranks of importance for data may be used to determine how to visualize the incoming messages and e-mails from different contacts. For example, messages from higher ranked contacts or related to higher ranked conversations may be displayed by the system more prominently than other messages. By analyzing the data in social networking channels, e-mail addresses, message structures, and/or signatures in messages, the system may extract a contact's possible past and current places of employment. In this way, the system may build an ontology of the people and companies with whom the user has been corresponding and contacting.

In another illustrative embodiment, the system may analyze a user's e-mails, the user's contacts' ratings, the user's telephone communications and the like to simplify and organize the user's tasks. For this purpose, the system may implement a series of alerts, follow-ups, reminders (as well as by means of SMS), and the like, some of which may be generated based on the preceding discussion. The system can also identify the promises that the user once gave to e-mail recipients and prioritize and categorize them by identifying certain tasks or e-mails that the user needs to do or write today. The system can also be configured to generate tasks or e-mails that the user needs to do or write within other time periods, such as three days, one week, two weeks, or one month as just some illustrative examples. The system can also identify the promises that someone once gave the user in the correspondence and prioritize and categorize them by identifying the most important cases or e-mails where someone promised to do something for the user. The system may also be configured to create a draft letter reminding these contacts on the user's behalf that something is owed to the user as previously promised. Such a draft letter may include a copy or a quotation from the original correspondence where something was promised.

In another illustrative embodiment, the system may generate messages or recommendations to the user based on the user's usage and interaction with the system. For example, by analyzing content and user behavior with respect to folders and information sources, the system may jokingly inform the user in a natural language form about the user's activities with respect to the source. For example, when user hovers over a folder the system may gently and jokingly informs him, "You haven't opened this folder for ages."

In another embodiment, a user may wish to find a presentation, but does not recall the name of the file and does not remember the name of the file's location. The file may be located on the user's personal laptop or their work laptop. The user does remember that the file was prepared for John Smith, and that the presentation contained a red pie chart diagram. The user may selects a files tab. The system may then display to the user a complete file tree hierarchy of files on all of the user's devices. The user may browse the file tree hierarchy or may utilize a search field.

In the search field, the user can type any text, and view the results in a linear form with a preview of the text. A small thumbnail preview of each file that is returned in the search results can be viewed on a GUI. Adjacent to the thumbnail is displayed a larger preview of the file. The user may type "presentation prepared for John Smith and it had a red pie diagram," for example. The software moves to an index of electronic files stored across user's devices and attempts to find the words "red pie diagram." The system may also look to metadata that has been extracted from electronic files. If the system finds "chart" or "diagram" in the metadata of certain electronic files, those electronic files are displayed to the user more prominently in the GUI. In a similar example, the system may also track if a particular document was sent to persons with the name of "john" and/or "smith." Those documents may also be displayed more prominently than other documents merely containing the words "chart" or "diagram." Advantageously, the systems and methods disclosed herein also can find such files and documents when a significant number of files are stored directly as attachments to emails, rather than downloaded onto a particular device. The embodiments disclosed herein, through the metadata search and other functionality, are able to identify such files easily.

For example, the file may be located on the user's remote work computer. The user may wish to edit the document and send it to his manager. If the user attempts to open this remote file, the system can make a local physical copy of the file, and the user can work safely without worry about being disconnected from the network and losing the user's edits. However, the system retains the document as one logical file, and when the user is finished editing, the system will update the original copy. The system also attempts to make use of available local applications to execute the file, though where that is not possible, remotely located applications may be utilized.

The system also allows any files to be moved, deleted, renamed, and copied in any personal cloud. In some embodiments, the actions may be immediately executed if the device the user is using and the device where the file of interest is stored are both online. In some embodiments, being online means being connected to the internet. However, more generally, being online as disclosed herein means that the two devices are able to communicate with each other, either through the internet or otherwise. If the devices are not online, some operations can be ordered with deferred execution. Such a process may prevent the need for people to constantly think about backing up files. Utilizing various mechanisms of the illustrated embodiments, the user can forget the problem of back-ups. In one embodiment, the system simply communicates the system folders and files that are important to the user, and asks the system to always store three physical copies in different locations. The system keeps track of the fact that these folders have at least three replicas. In the event that the user damages a device, for example, they can buy a new device, log into the cloud-based server using their e-mail address, and simply ask to restore the data to the new device. For security purposes, the user may designate those files and folders that he does not wish to be indexed.

As will be appreciated by one skilled in the art, aspects of the embodiments disclosed herein may be embodied as a system, method or computer program product. Accordingly, aspects of the embodiments disclosed herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments disclosed herein may take the form of a computer program product embodied in one or more computer readable medium(s) having computer readable program code embodied thereon.

Any combination of one or more computer readable medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the embodiments disclosed herein may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments disclosed herein are described with reference to flowchart illustrations and/or block diagrams of methods, apparatus (systems) and computer program products according to embodiments disclosed herein. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments disclosed herein. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

FIG. 1 is a representation of a graphical user interface (GUI) 100 demonstrating an e-mail interface in accordance with an illustrative embodiment. In alternative embodiments, fewer, additional, and/or different components may be displayed on the GUI. The GUI 100 includes two tabs toward the top, an e-mails tab 105 and a files tab 110. The e-mails tab 105 and the files tab 110 may, in an alternative embodiment, include a number indicating the number of e-mails or files indexed on each respective tab. In another alternative embodiment, a number in the e-mails tab 105 or the files tab 110 may also indicate a number of unread or new e-mails or newly indexed files. The GUI 100 further includes secondary tabs 115. These secondary tabs 115 can help further sort the e-mails displayed when the e-mail tab 105 is selected. In GUI 100, the e-mail tab 105 is selected, and thus the secondary tabs 115 are displayed. The secondary tabs 115 include options for sorting e-mails such as all, important, work, family, friends, architect, social, promo, and more. Some of the secondary tabs 115 are default and some are user defined. If a user selects one of the secondary tabs 115, e-mails relating to that tab are displayed. In one embodiment, multiple secondary tabs 115 may be selected. Accordingly, e-mails may be sorted based on multiple criteria. In one embodiment, if two secondary tabs 115 are selected, any e-mails that relate to either of the subjects of the tabs are displayed. In an alternative embodiment, selecting two tabs displays only e-mails that relate to both tabs. More than two tabs may also be selected in various embodiments.

The GUI 100 also includes a search space 120. If a user enters text into the search space 120, the terms entered may be searched for among e-mails. The searching may search for the exact characters entered into the search space 120 or may include fuzzy searching or any other searching embodiment disclosed herein. In an alternative embodiment, a search may be performed in areas other than just the e-mail folder. The GUI 100 also includes a settings and alerts icon 125. If the user selects the settings and alerts icon 125, the user is directed to displays that allow the user to change settings or alerts related to the system and methods disclosed herein. For example, wherever throughout this disclosure a feature is described as configurable by the user, the user may be able to navigate to a GUI that allows them to configure such a feature through the settings and alerts icon 125.

The GUI 100 also includes e-mail previews, that preview individual e-mails. For example, e-mail previews 130, 135, and 140 are all shown on GUI 100. E-mails 130 and 140 include an attached picture that is displayed in the preview. E-mail 130 includes multiple photos in the preview. One is displayed more prominently than the others. Each of e-mails 130, 135, and 140 include text that is displayed in the preview. E-mails 130, 135, and 140 also include a photo or avatar of the sender of the e-mail, the sender's name, and the date and time the e-mails 130, 135, and 140 were sent.

In this embodiment, e-mail 130 has been selected for full viewing by the user. Such selection may occur by the user tapping or clicking on the e-mail 130. The full view 145 shows much of the same information as in the preview, except larger and more easily viewable. The full view includes much better views of photos 150 and 155. Further, the user may interact with the photos 150 and 155 to cause a photo that is not displayed prominently by default, such as photo 155, to be displayed more prominently. Also, if the e-mail 130 had more text then it currently does, the full text may be visible in the full-view 145 but not the preview. The GUI 100 also includes a contact info 160. The system automatically displays the contact info 160 of the sender of the e-mail that is selected for the full-view 145, in this case e-mail 130. The contact info 160 includes the sender's photo or avatar, name, telephone number, groups, and e-mail history. In this case, Gary Thomas is part of the friends and architects groups. Thus, if the user selects secondary tabs 115 such as friends or architect, e-mails from Gary Thomas may be displayed on the GUI 100. The groups that Gary Thomas is a part of may be automatically selected based on the interactions between the user and Gary, the content of the correspondence between the user and Gary, or information from the user's social networks. For example, if Gary Thomas was listed as a family member of the user on the user's Facebook™ profile, the system may automatically put Gary in the Family group. In an alternative embodiment, the user may configure and determine the groups that a contact belongs in. The e-mail history displayed in the contact info 160 indicates the magnitude of correspondence between Gary and the user. In this case, the user has received 23 e-mails from Gary and sent 32 e-mails to Gary.

In an illustrative embodiment, the GUI 100 in FIG. 1 may be similar to a GUI used to display search results for an e-mail message specific search. In an e-mail specific search, the user may have indicated a desire to only search for e-mails. This desire may be indicated by the fact that the user has navigated to the e-mails tab 105 and subsequently performed a search in the search space 120. In this embodiment, e-mails that are relevant to any search criteria may be displayed on the left of the GUI 100. For example, e-mails 130, 135, and 140 may be examples of e-mail search results. In this embodiment, the e-mail 130 is selected and the user can see further information relating to the e-mail 130 in the full-view 145. In this way, the user may be able to verify and locate the information they seek through the search without having to open different e-mails in a separate application. Another advantage of the current system is that a search of e-mails performed using the GUI 100 may search for e-mails across multiple e-mail and messaging platforms. For example, the system could search across multiple e-mail exchanges and inboxes for each of a user's e-mail addresses. Furthermore, the system may search across any messaging services the user utilizes, such as instant messaging apps for a smart phone, chat services online, and the like.

Figure 2:
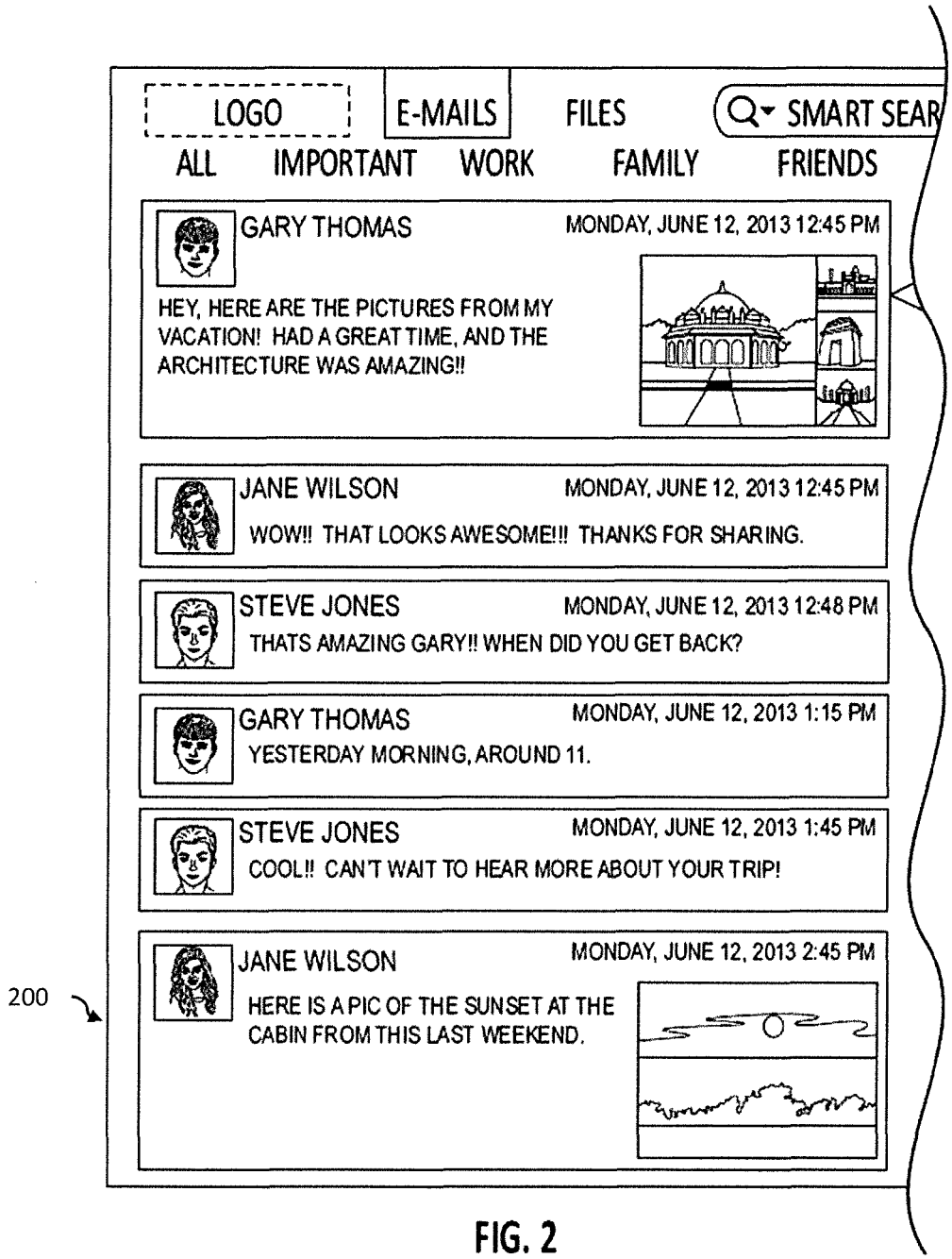
FIG. 2 is a blown-up representation of a GUI demonstrating an e-mail interface in accordance with an illustrative embodiment.

FIG. 2 is a blown-up representation of a GUI 200 demonstrating an e-mail interface in accordance with an illustrative embodiment. In alternative embodiments, fewer, additional, and/or different components may be displayed on the GUI. Note that both in FIG. 1 and FIG. 2, the e-mails displayed are all related to one another. That is, the several e-mails form a sort of conversation among the senders. In this instance, the e-mail messages are displayed from oldest to newest. In this way, the e-mails can be read along the normal flow of conversation when the e-mails are read from top to bottom.

Figure 3:
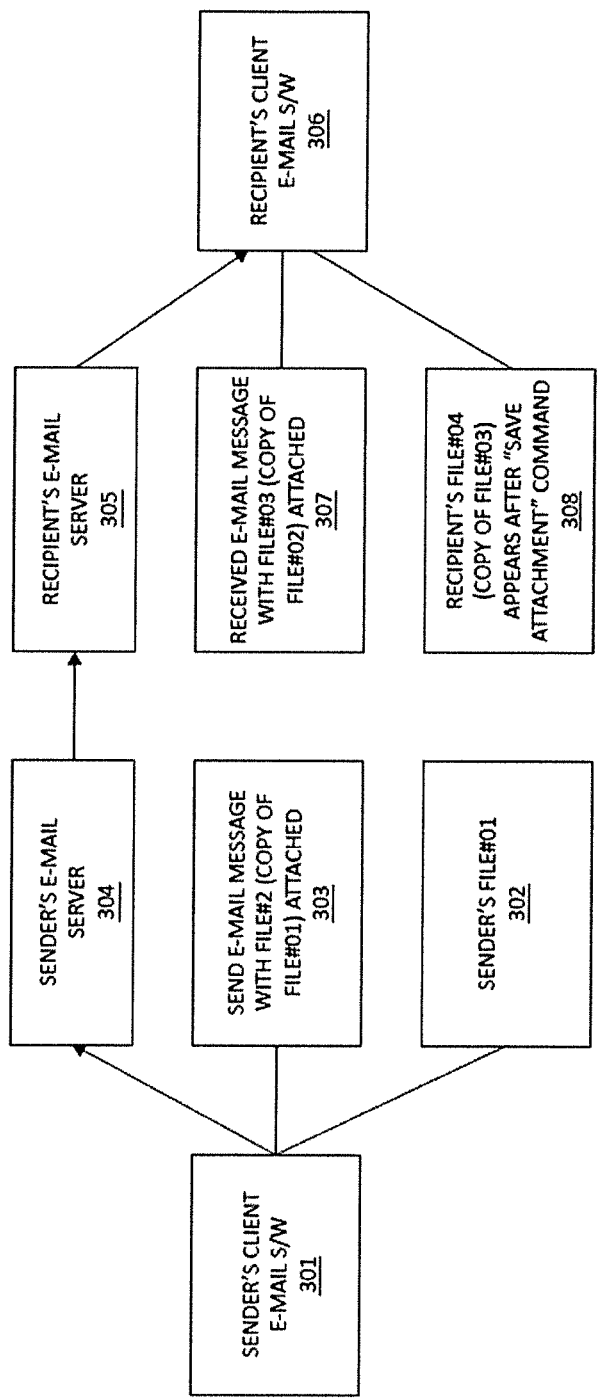
FIG. 3 is a block diagram illustrating a file transfer system in accordance with an illustrative embodiment.

FIG. 3 is a block diagram illustrating a file transfer system in accordance with an illustrative embodiment. In alternative embodiments, fewer, additional, and/or different components may be included in the system.

As shown in FIG. 3, an e-mail file sharing architecture may include e-mail software 301 on a sending computer, an exchange server on the sender side 304, a server on the recipient side 305, and e-mail software 306 on the recipient computer. Also as shown, sender's e-mail software 301 is able to access a file#01 302 in sender's digital storage (the file to be sent) and generate an e-mail message 303 with a copy (file#02) of file#01 attached. E-mail message 303 is sent through servers 304 and 305 to the recipient's software 306 as shown by the arrows on FIG. 3. Recipient's software 306 receives e-mail message 307 (a copy of message 303), which contains a file#03 (a copy of attached file#02). The recipient machine may save a copy of file#03 locally to a recipient computer as file#04 308. In one exemplary embodiment, the software 301 may be Outlook™, the server 304 may be an Exchange™ server, the server 305 may be a Gmail™ server, and the software 306 is Mac-OS Mail. This embodiment is merely for illustration. Any other server and software types may be used in different embodiments of such a system.

Figure 4:
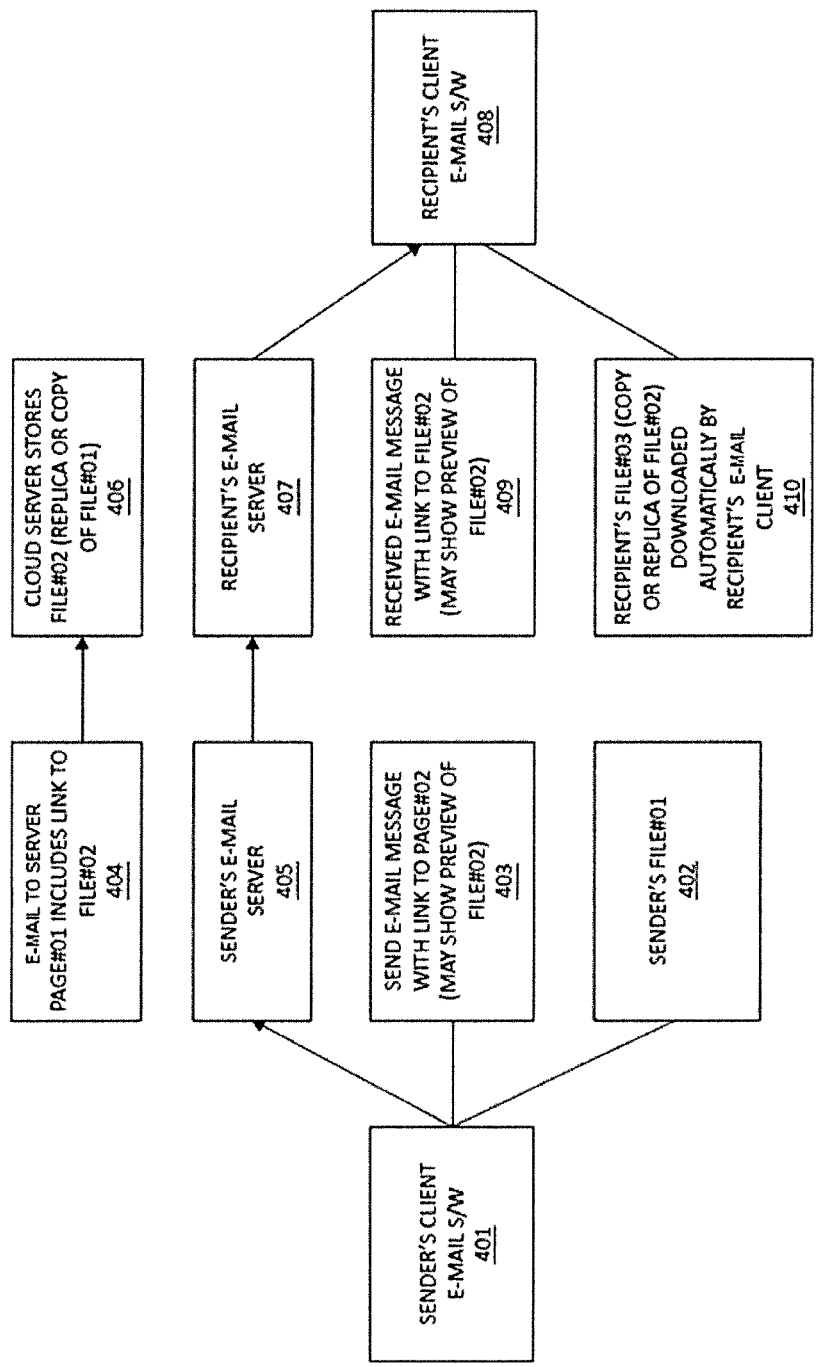
FIG. 4 is a block diagram illustrating a second file transfer system in accordance with an illustrative embodiment.

FIG. 4 is a block diagram illustrating a second file transfer system in accordance with an illustrative embodiment. In alternative embodiments, fewer, additional, and/or different components may be included in the system.

As shown in FIG. 4, an integrated e-mail file sharing architecture may include e-mail software 401 on a sending computer, an e-mail server on the sender side 405, an e-mail server on the recipient side 407, and e-mail software 408 on the recipient computer. In an example procedure, an e-mail message 403 is composed using client software 401 and software 401 receives an indication that file#01 402 should be made accessible through the message 403. Responsively, software 401 may access file#01 402 and upload a replica or copy of file#01 to a cloud server 406. The replica or copy is stored as file#02 on cloud server 406 and software 401 receives access information for accessing file#02. Responsively, software 401 sends the access information to a cloud-based server and the server generates a document (page#01) 404 containing the access information. In other cases, the access information may be stored in the form in which the cloud-based server receives it. An indication of page#01 (such as a network address, Internet address, linked file, or connection executable) is received or generated by software 401 and, in response to the indication being received or generated by software 401, software 401 inserts or attaches the indication (or page#01 itself) to message 403. Message 403 is sent through servers 405 and 407 to software 408.

If the recipient software 408 is a standard e-mail client, then the recipient receives e-mail message 409 (which is a copy of message 403) from server 407 and accesses the link to the cloud-based server. The recipient computer accesses page#01 404 from the cloud-based server. In some cases, the recipient computer may receive a message encouraging the recipient to use the cloud-based e-mail client, along with a download link. By accessing page#01, the recipient is furnished with the link with access information to file#02 on the cloud storage 406. Recipient computer may use the link to access cloud storage 406 and download file#02, forming file#03—local copy or replica of the file#02.

If the recipient software 408 is a client implementing embodiments disclosed herein, then the process may be repeated in the same way, except all the process of receiving file#03 may be automated and file#03 may be either a copy or a replica of file#02. If file#03 is a replica, then file#01 or file#03 may be updated when the other is edited. The updating may be accomplished through cloud-based server 404 so that file#02 need not be stored on cloud server 406 to maintain the connection between file#01 and file#03. In other implementations, file#02 may continue to be stored and may serve as a link between the replica files.

If sender software 401 is also not a cloud-based client, then an agent process may be included as an add-on to software 401. The agent may accomplish the uploading and attachment/insertion of the link that would have been performed by the cloud-based client. Then, message 403 may be sent and received in the same way as described above. Sender composes Outlook™ e-mail message, then runs the "attach file" command.

Figure 5:
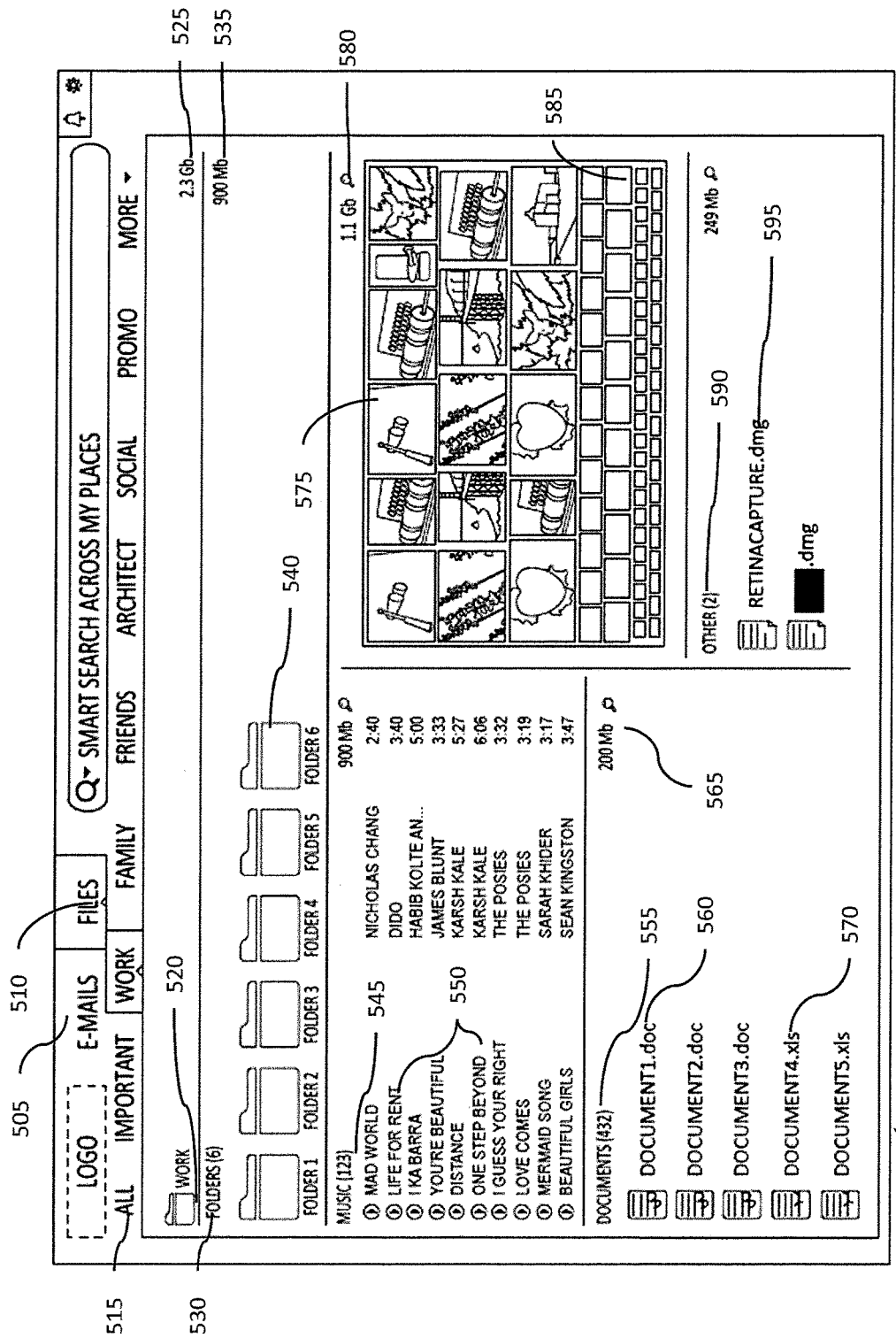
FIG. 5 is a representation of a GUI demonstrating a multi-file type view in accordance with an illustrative embodiment.

FIG. 5 is a representation of a GUI 500 demonstrating a multi-file type view in accordance with an illustrative embodiment. In alternative embodiments, fewer, additional, and/or different components may be displayed on the GUI. The GUI 500 includes e-mails tab 505 and files tab 510. These two tabs may function similarly to the e-mails and files tabs described above with respect to FIG. 1. In this embodiment, the files tab 510 is selected, and therefore files, instead of e-mails, are displayed in the GUI 500. The GUI 500 also includes secondary tabs 515, which are similar to the secondary tabs of FIG. 1, except that here the secondary tabs 515 can be used to sort and view files instead of e-mails. In this embodiment, the work secondary tab 515 is selected, so that files relating to the user's work are displayed. The GUI 500 indicates with icon 520 which secondary tab is selected. In this scenario, the icon 520 is a folder because there is an actual virtual folder for work related files. The displayed files in the GUI 500 may be stored on different devices, but can still be located in the same work virtual folder. The space size indicator 525 indicates that the work virtual folder contains 2.3 gigabytes of data. In an alternative embodiment, the space size indicator 525 may also indicate a space remaining that is allotted to the user or the user's virtual work folder.

The folders display 530 of the GUI 500 shows that there are six folders associated with work. The folders display 530 also shows the six individual folders 540. A folders size indicator 535 indicates that the folders contain 900 megabytes of data. The folders 540 may be opened to display the contents. The folders 540 may be physical or virtual folders, in that they may indicate actual physical storage locations or organizational storage locations.

The music display 545 of the GUI 500 shows several audio files 550. While the music display 545 shows that 123 audio files exist, only a few are actually shown on GUI 500. The system may display audio files that are most often played by the user, or the system may use some other criteria to determine which audio files are displayed. In an alternative embodiment, the system may display random audio files. If the user wishes to view other audio files, the user may select the music display 545 title in order to navigate to a GUI that displays more or all of the audio files. In an alternative embodiment, the user may be able to scroll through the list of the audio files 550 to view additional audio files.

The documents display 555 of the GUI 500 shows several different documents of different types. The documents size indicator 565 indicates that the documents take up 200 megabytes of memory. Example documents displayed in the documents display 555 include document 560 and document 570. Similar to the audio files above, these documents may be displayed randomly from the 432 total documents, or the documents may be displayed based on a particular criteria, such as most recently modified or opened documents.

Photos are also displayed on the GUI 500. For example, photo 575 and photo 585. For simplicity, photo 585 does not show an image. However, photo 585 is meant to represent a lower resolution image than that of photo 575. There are still further lower resolution images displayed than photo 585. Further, a magnifying glass icon 580 is shown. In this embodiment, the magnifying glass icon 580 represents a search function that allows a user to search only the photos in the work virtual folder. Note that similar icons are present for the music, documents, and other portions of the GUI 500. In this way, particularly if the photo the user desires is not currently displayed, the user may locate a particular photo or photos. Photos may be searched based on the photos' metadata, for example.

In such an embodiment, the user may search for music, documents, photos, or other files specifically. Other search options are also contemplated. For example, the GUI 500 could, in an alternative embodiment, have a section for presentation documents. The user may also be able to perform a presentation specific search. In another alternative embodiment, GUI 500 could represent how search results may be displayed. For example, GUI 500 could be displaying relevant search results across a variety of file types. Advantageously, the results on the GUI 500 are displayed in a convenient manner that makes it easy for a user to access results of different types, as opposed to having results of different data and file types all mixed together.

Another advantage of showing search results in a configuration like the GUI 500 is the multi-stage searching functionality. A broad search can be performed, yielding the results shown in the GUI 500. Next, a further narrowing search can be performed using any of the magnifying glass icons, such as the magnifying glass icon 580. In this way, the user can search among the results of the first search in a more pointed way to attempt to locate the exact file the user is looking for. For example, the initial search may have been "vacation." The GUI 500 may then subsequently display vacation photos, songs listened to and downloaded while on vacation, documents regarding the vacation, and any other files related to a vacation.

Upon seeing the results of the search, the user may then further narrow the results by selecting the magnifying glass icon 580. By doing so, the user may be presented with a dialog that allows for further searching of the photos displayed on the GUI 500 (and any photos relevant to the original "vacation" search that did not fit into the GUI 500). For example, the user may further limit the search with the search term "bridge," to attempt to find a favorite picture taken on a bridge while the user was on vacation. If there are any relevant search results to the second search term, the results can be displayed on a display similar to the GUI 500, or on a different display altogether, such as the displays shown in FIG. 6 or 10.

The other display 590 is also displayed on the GUI 500. There are only two files in the other display 590. For example, the file 595 is shown here. Files that may commonly be placed in the other display 590 are files that may not easily fit into the other categories displayed on the GUI 500, such as folders, music, documents, and photos.

Figure 6:
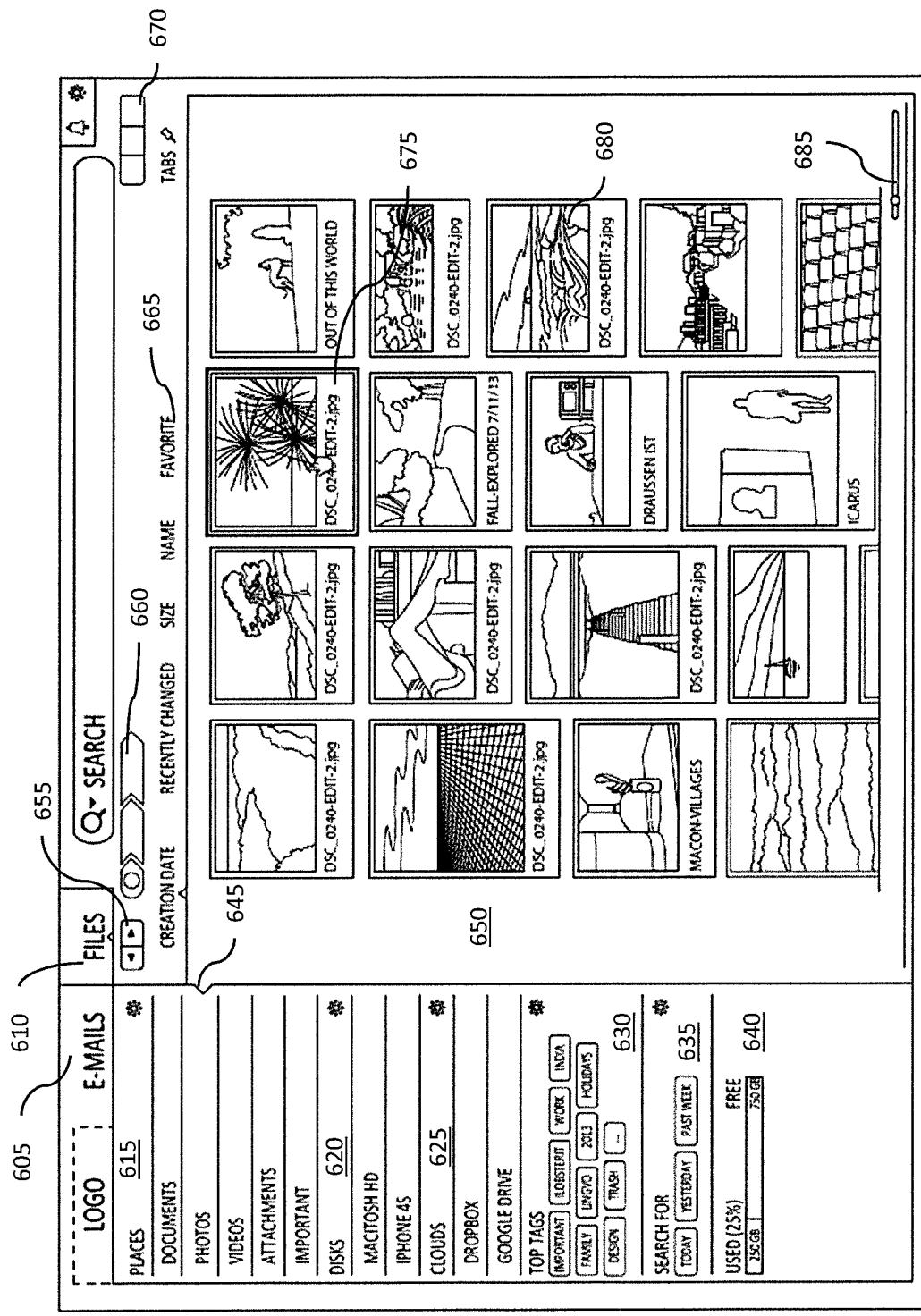
FIG. 6 is a representation of a GUI demonstrating a photo view in accordance with an illustrative embodiment.

FIG. 6 is a representation of a GUI 600 demonstrating a photo view in accordance with an illustrative embodiment. In alternative embodiments, fewer, additional, and/or different components may be displayed on the GUI. The GUI 600 includes e-mails tab 605 and files tab 610. These tabs may be similar to tabs 105 and 110 of FIG. 1. Here, the files tab 610 is selected, so the GUI 600 displays files. On the left-hand side of the screen, also referred to as a workspace, various storage mediums and types of files are listed. All of these represent locations of storage mediums and files that have previously been indexed by the system.

The workspace includes a places 615 section, a disks 620 section, a clouds 625 section, a top tags section 630, a search for 635 section, and a representation of current storage utilization 640. The places 615 section includes documents, photos, videos, attachments, etc. Each of the places 615 are considered virtual locations. For example, if a user clicked on or otherwise selected videos, all of the videos that can be accessed by the user would be displayed regardless of their actual physical location. However, the videos may still be displayed in the GUI 600 with an indicator of each video's actual physical location. Here, the photos are selected, as indicated by the arrow 645. Accordingly, photos are being displayed on the GUI 600.

The disks 620 section includes hard disk drives, solid state drives, or other physical memory of the user that has been indexed by the system. Here the disks 620 includes a Macitosh HD and an Iphone™ 4S, as examples. Unlike the places 615 section, the selections available in the disks 620 section are not considered to be a virtual location, but rather a physical location, since the selections are associated with actual memory on actual physical devices. Upon selecting one of the disks 620, the system would display every file located on that memory. In an alternative embodiment, the system may not display software applications that are stored on a memory. In this embodiment, the actual file location of the displayed files is inherently displayed, since a physical memory has been selected and the arrow 645 would then point to one of the disks 620. In a further embodiment, the system could also show, along with individual files displayed from the memory, where the files are actually located in a file tree hierarchy within the respective memory.

The clouds 625 section includes cloud storage locations where the user may have files stored. Additionally, the user may have access to files stored on cloud storage locations that have been placed there by others. The system may index and display those files as well.

The workspace also includes a top tags 630 section. The top tags show tags, which are a type of metadata, that are associated with files in the various virtual and physical locations. The top tags 630 section displays tags that are most commonly found among the various files indexed by the workspace. In an alternative embodiment, the top tags 630 section may only display the top tags for the selected location that is selected to be displayed. For GUI 600, the currently selected location is the photos, so in this embodiment, the top tags for all photos may be displayed. In another embodiment, the top tags 630 section may not show the most used tags, but may rather use a different metric for determining which tags to display. For example, the system could display the most popular tags among all users of the system, the most popular tags of all users over a certain time period, the most popular tags of a similar demographic to the user, the most popular tags among those who the user has a relationship with such as the user's e-mail contacts, social network contacts, cloud storage contacts, etc. The system can also display tags that were most recently used by the user. If a user clicks on or otherwise selects one of the tags, whatever files are being displayed are sorted according to the selected tab. That is, only files that have the particular tag as metadata are shown. In alternative embodiments, multiple tags may be selected to sort displayed files in various ways. Furthermore, the tags that are displayed and how they are used can be configured by the user.

The workspace also includes the search for 635 section. The search for 635 section includes tags today, yesterday, and past week. If the user selects one of these tags, files that have been created or added to the system index in that time frame are displayed. In another embodiment, files that have been modified within the time frame are displayed. Other time ranges may also be used in alternative embodiments. In still other embodiments, the search for 635 section may include other types of tags, such as names of users who may have authored, edited, sent, commented on, or opened a file. By providing other types of tags here, the user could sort and filter documents in even further ways. The tags in the search for 635 section are all configurable by the user.

In an illustrative embodiment, a user may select a tag in the search for 635 section, and a search may be automatically performed. In this embodiment, the search would be performed on whatever electronic files are already being displayed in the GUI 600. Here, the photos place is selected as indicated by the arrow 645. Accordingly, if the user were to select the tag "yesterday" in the search for section 635, the photos already displayed in the GUI 600 would essentially be filtered down to photos that have a date from yesterday. Also note that the photos in the GUI 600 are sorted by creation date. Even after the photos are searched and sorted by a tag from the search for section 635, the search results photos are still displayed according to the current filters, namely that the photos belong to the photos place and that they are sorted by creation date.

In an additional embodiment, the GUI 600 may be used to display photo search results generally. That is, if a user searched just for photos or images, the GUI 600 may be utilized to show the search results for such a search.

The workspace also includes the representation of current storage utilization 640. The representation of current storage utilization 640 demonstrates how much available and how much full memory the user has. Here, the representation of current storage utilization 640 demonstrates a total storage usage across all of the user's available storage mediums listed in the workspace. In an alternative embodiment, the representation of current storage utilization 640 may be configured to display usage of only certain storages, such as cloud storages or the user's iPhone™ 4S.

The photos as selected in the workplace are displayed in display area 650. The photos displayed include, for example, photos 675 and 680. Each photo in the present embodiment is displayed with a file title as well. The file title may indicate the name of the file. In other embodiments, the file title may also indicate other information, such as the actual physical location where the file is stored, the status of the device where the file is stored, and virtual locations the document is a part of, characteristics of the file, user input information about the file, tags regarding the file, and/or any other metadata relating to the file. Here, the user has positioned a pointer from a motion translation device over the photo 675. As a result, the system has highlighted the photo 675 by placing an additional box around it. In this way, the user knows which photo will be selected if the user makes an input to select a photo, such as with a mouse click.

The GUI 600 also includes a scroll bar 685. The scroll bar 685 allows the user to change the resolution of the photos he or she is viewing. In other words, if the user adjusts the scroll bar 685, the photos displayed in the display area 650 are enlarged or reduced depending on which direction the scroll bar 685 is scrolled. Consequently, if the photos are enlarged, some photos may be removed from the display area 650 because they can no longer all fit in the display area 650. Similarly, if the size of the pictures is reduced, more photos may be displayed in the display area 650. In an alternative embodiment, the scroll bar 685 may instead be used to cycle through photos that are displayed in the display area 650. In other words, if the user adjusts the scroll bar 685, the photos in the display area 650 will change.

Navigation arrows 655 are also shown on the GUI 600. The navigation can be used by the user to navigate to different displays. For example, if the user interacts with the left facing arrow, the system will display whatever was displayed previous to the GUI 600. If the user then wishes to return to the GUI 600, the user can interact with the right facing arrow. If instead the user wishes to navigate to a GUI that was displayed two pages before the GUI 600, the user may interact with the left facing arrow twice.

A folder hierarchy 660 is also shown on the GUI 600. The folder hierarchy 660 indicates the current folder location that is being displayed, and allows the user to navigate to related parent folders of the currently displayed folder. Here, the folder hierarchy 660 has three sections, a left, middle, and right section. Each section may, in other embodiments, have text and/or an icon within the section indicating the location or function described herein. The left section may represent an original or home display. If the user clicks or otherwise interacts with the left section, the display will be returned to such an original or home display. The middle section represents a first hierarchical layer of what is currently being displayed. In this case, the first layer is places. As such, if the user interacts with the middle section, the GUI may display documents from all of the places as shown in the workspace on the left of the GUI 600. The right section indicates the current display on the GUI 600. If the user interacts with the right section, nothing will change on the current display. In this case, the right section merely serves to remind the user of the current location that is being displayed. In another embodiment, interacting with the right section may reset any filters, searches, or modifications that have adjusted what is displayed in the display area 650. Such adjustments may be from the user's use of the scroll bar 685, the search for 635 section, the top tags 630 section, or others. In other words, in this embodiment, interacting with the right section of the folder hierarchy 660 leads to resetting the display of the currently displayed location.

Sorting sub-tabs 665 are also displayed on the GUI 600. The sorting sub-tabs 665 include creation date, recently changed, size, name, and favorite. Additionally, a tabs sub-tab is displayed. The tabs sub-tab may be used to configure which tabs are displayed in the sorting sub-tabs 665. Next to the tabs sub-tab is a pin icon. The user may interact with the pin icon to hide or show the sub-tabs 665. The sub-tabs 665 can be interacted with by the user to sort and filter what is shown in the display area 650. In this embodiment, the creation date sub-tab is selected. Accordingly, the photos displayed in the display area 650 are photos that have been created most recently. In another embodiment, the photos displayed in the display area may be those that have been created the longest ago.

Figure 7:
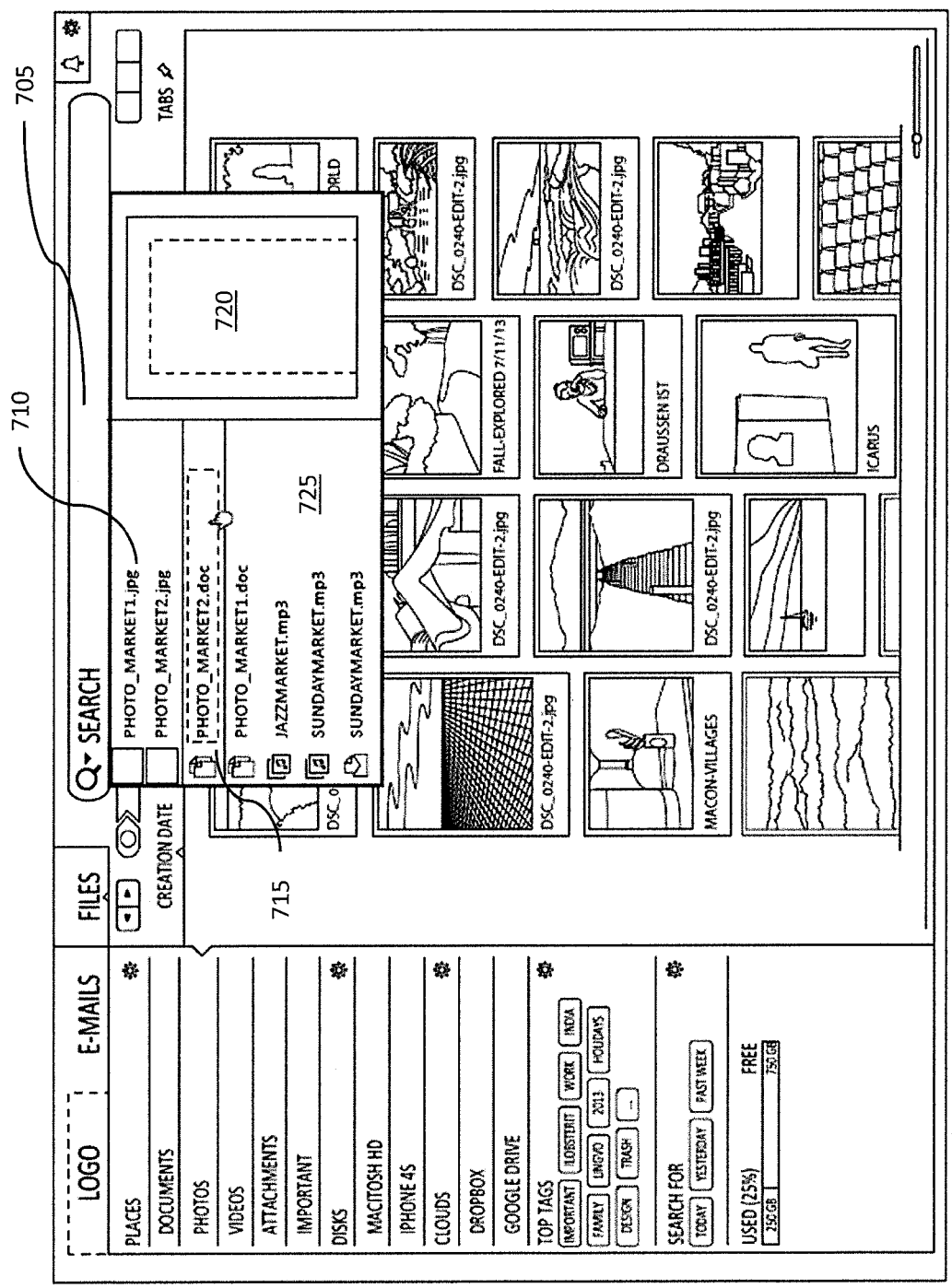
FIG. 7 is a representation of a GUI demonstrating a photo view with a search menu displayed in accordance with an illustrative embodiment.

FIG. 7 is a representation of a GUI 700 demonstrating a photo view with a search menu displayed in accordance with an illustrative embodiment. In alternative embodiments, fewer, additional, and/or different components may be displayed on the GUI. The GUI 700 is similar to the GUI 600 in FIG. 6, except that a search field 705 is being interacted with by a user. The GUI 700 includes the search field 705. Here, no text has been entered by the user into the search field 705 yet, so a default text of "SEARCH" is still displayed in the search field 705. However, the user has activated a cursor in the search field 705. This causes an auto fill menu 725 to be displayed. The auto fill menu 725 displays suggestions for potential search results that the user may desire. In this embodiment, results such as result 710 and 715 are displayed. Here the user has positioned a pointer over the result 715. As a result, the system displays a preview 720 of the file represented by the result 715. The preview 720 may include extracted content of the file and/or metadata of the file.

The user can type search terms into the search field 705. As the user types into the search field 705, the auto fill menu 725 will begin to automatically populate with words, terms, and/or names of electronic files that match or partially match the search terms being entered into the search field 705. If the user likes some of the automatically populated search results, the user may select one to view a preview, like the preview 720, or the user may select one of the populated search results to open the electronic file. If the user is not particularly fond of any of the automatically populated search results, the user may input something else to indicate a full search is requested and that the user wishes to see more search results than just those that were automatically populated. Entering such a search may direct the user to a search results GUI. For example, the search results GUI might resemble the interfaces of FIG. 5 or 6 discussed above.

Figure 8:
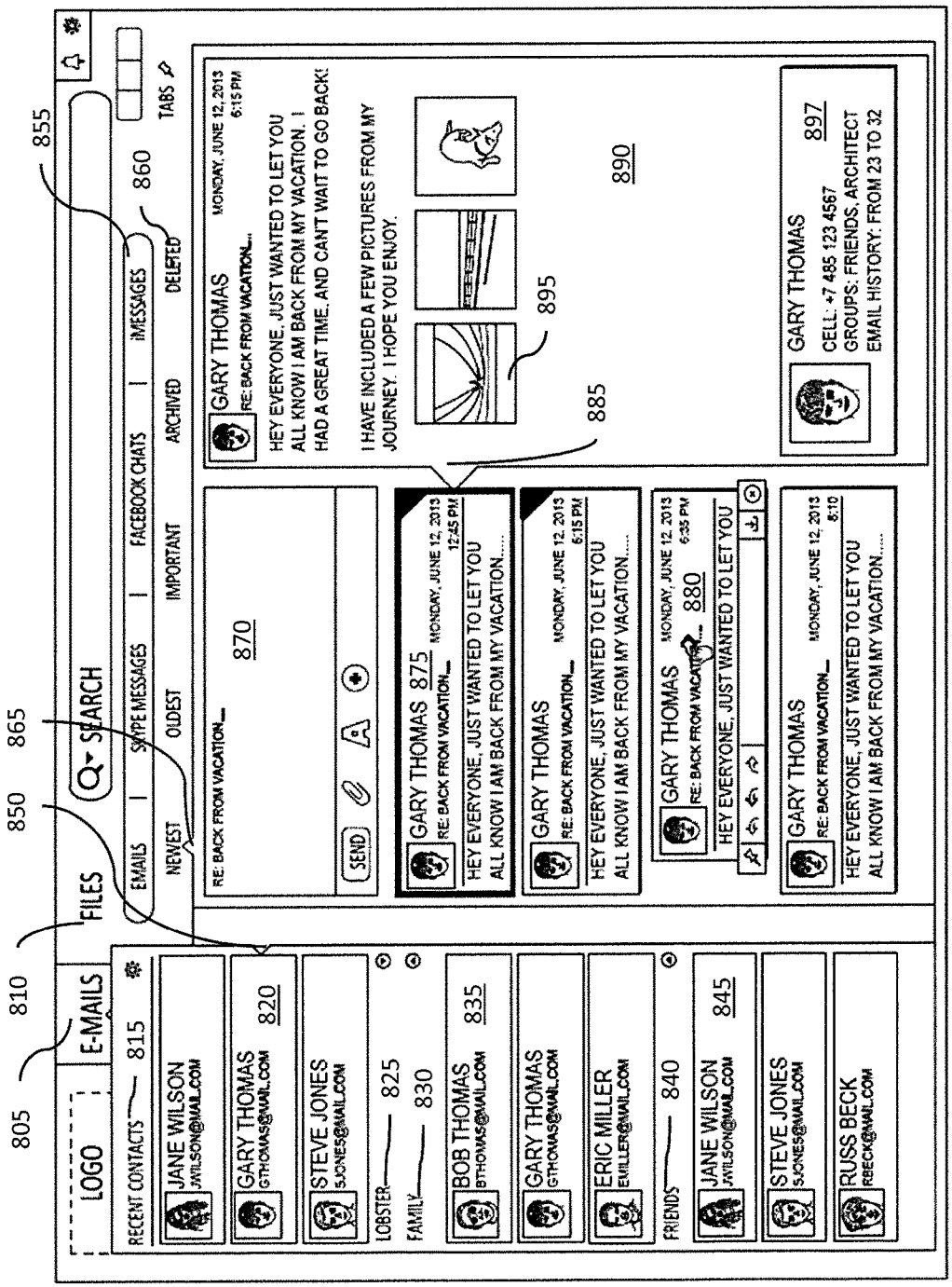
FIG. 8 is a representation of a GUI demonstrating an e-mail interface with a sorted contact list in accordance with an illustrative embodiment.

FIG. 8 is a representation of a GUI 800 demonstrating an e-mail interface with a sorted contact list in accordance with an illustrative embodiment. In alternative embodiments, fewer, additional, and/or different components may be displayed on the GUI. The GUI 800 further displays an embodiment for viewing and writing e-mails in accordance with an illustrative embodiment. The GUI 800 includes an e-mails tab 805 and a files tab 810. Here, the e-mails tab 805 is selected.

The GUI 800 also includes various sections of contacts, such as the recent contacts 820 section, the lobster 825 section, the family 830 section, and the friends 840 section. Here, the recent contacts 815 are displayed, and for example include contact 820. Here, only a name, e-mail address, and photo or avatar is shown. However, alternative embodiments may show more or less information relating to a contact. The lobster 825 contacts are not displayed on the GUI 800. A downward facing arrow to the left of the lobster 825 indicates that the contacts are hidden. If the user interacts with the downward facing arrow, the contacts will be displayed and the downward facing arrow will be displayed as an upward facing arrow, similar to those of family 830 and friends 840. If the upward facing arrow of family 830 or friends 840 is interacted with, those groups of contacts will not be displayed on the GUI 800. In this embodiment, recent contacts 815 cannot be hidden. However, in other embodiments recent contacts 815 may be hidden. Additionally, the groups of contacts displayed may be configured automatically by the system or manually by the user. Contact 835 is an example contact in the family 830 contacts section. Contact 845 is an example contact in the friends section.

In the GUI 800, the contact 820 is selected as evidenced by an arrow 850, and therefore only messages from contact 820 are shown in the GUI 800. For example, previews 875 and 880 of messages from contact 820 are shown, as well as full e-mail 890. The messages can be sorted or organized on the GUI 800 in several ways. For example, the messages may be sorted or organized with message type buttons 855. The user can select to display only one or more message types. Here, the message types the user may select include e-mails, Skype™ messages, Facebook™ chats, and iMessages. Other options may be provided. The e-mails may also be sorted utilizing sub-tabs 860, which include newest, oldest, important, archived, and deleted. Here, the newest sub-tab is selected as evidenced by an arrow 865.

Draft e-mail section 870 provides the user an opportunity to respond to a selected e-mail. Draft e-mail section 870 allows the user to enter text for an e-mail, add attachments, to an e-mail, format the text of the e-mail, and add recipients to the e-mail.

Here, preview 875 has been selected as evidenced by an arrow 885 by the user and is shown as the full e-mail 890. The preview 875 includes only contact information for the sender and some of the text of the e-mail. The full e-mail 890 shows the contact information, a more complete contact information 897, photos such as photo 895, and the full text of the e-mail.

Additionally, the user for the GUI 800 has positioned a pointer over preview 880. As a result, the system has displayed a context menu over a portion of the preview 880. Further, it is worth noting that the preview 880 is offset in the GUI 800 from the other preview e-mails. This may indicate that the preview 880 is a part of an e-mail conversation relating to the preview directly above it.

The context menu includes six icons. Starting from the left, a pin icon can be interacted with to determine whether or not the e-mail remains on the GUI 800 display. The first left facing arrow may be interacted with by the user to direct the display to the first e-mail in an e-mail conversation. The second left facing arrow may be interacted with to direct the display to the previous e-mail in an e-mail conversation. Interacting with the right facing arrow may direct the display to the next e-mail in an e-mail conversation. In an alternative embodiment, the right facing arrow may be interacted with to direct the display to the final or most recent e-mail in an e-mail conversation. The icon second from the right is a download icon. When interacted with by the user, the e-mail and/or any attachments in the e-mail will be downloaded. The last icon is an X icon. If interacted with, that e-mail will be closed or hidden from view. In an alternative embodiment, interacting with the X icon will delete the e-mail.

Figure 9:
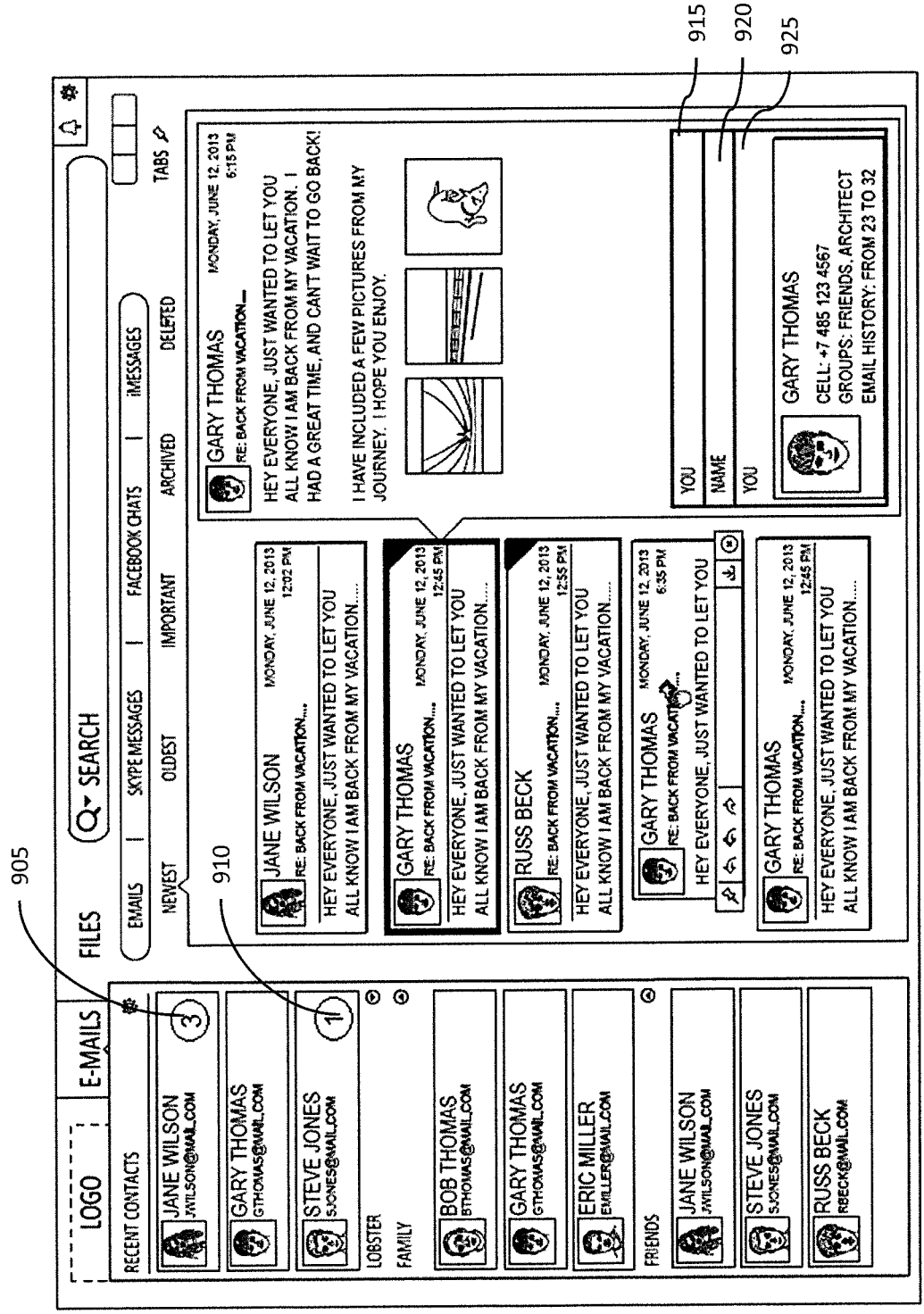
FIG. 9 is a representation of a GUI demonstrating an e-mail interface with a sorted contact list and an e-mail correspondence chain in accordance with an illustrative embodiment.

FIG. 9 is a representation of a GUI 900 demonstrating an e-mail interface with a sorted contact list and an e-mail correspondence chain in accordance with an illustrative embodiment. In alternative embodiments, fewer, additional, and/or different components may be displayed on the GUI. The GUI 900 is similar to the GUI 800 shown in FIG. 8, with a few differences, one of which is that e-mails from multiple contacts are displayed in the GUI 900.

Further, the GUI 900 includes alert numbers 905 and 910. The alert number 905 indicates that the user has three unread or new messages from contact Jane Wilson. The alert number 910 indicates that the user has one unread or new message from contact Steve Jones.

The full view e-mail in the GUI 900 includes a conversation preview, made up of preview messages 915, 920, and 925. Each of the preview messages 915, 920, and 925 represent a different message that has been sent in a conversation relating to the full view e-mail that is displayed in the GUI 900. Here preview messages 915 and 925 are messages sent by the user, thus designated with "YOU." The preview message 920 was sent by another contact, whose name would be displayed where "NAME" is shown on the GUI 900. If a user interacts with any of the preview messages 915, 920, and 925, that particular preview message will be displayed and can be reviewed by the user in detail.

In an alternative embodiment, the GUI 900 may represent search results from a user search. For example, the user may have searched his or her e-mails for messages regarding "vacation." The e-mails shown on the GUI 900 all pertain to vacation. The e-mails in the middle of GUI 900 represent the search results, and the e-mail on the right of the GUI 900 represents a full view of one of the search result e-mails.

Figure 10:
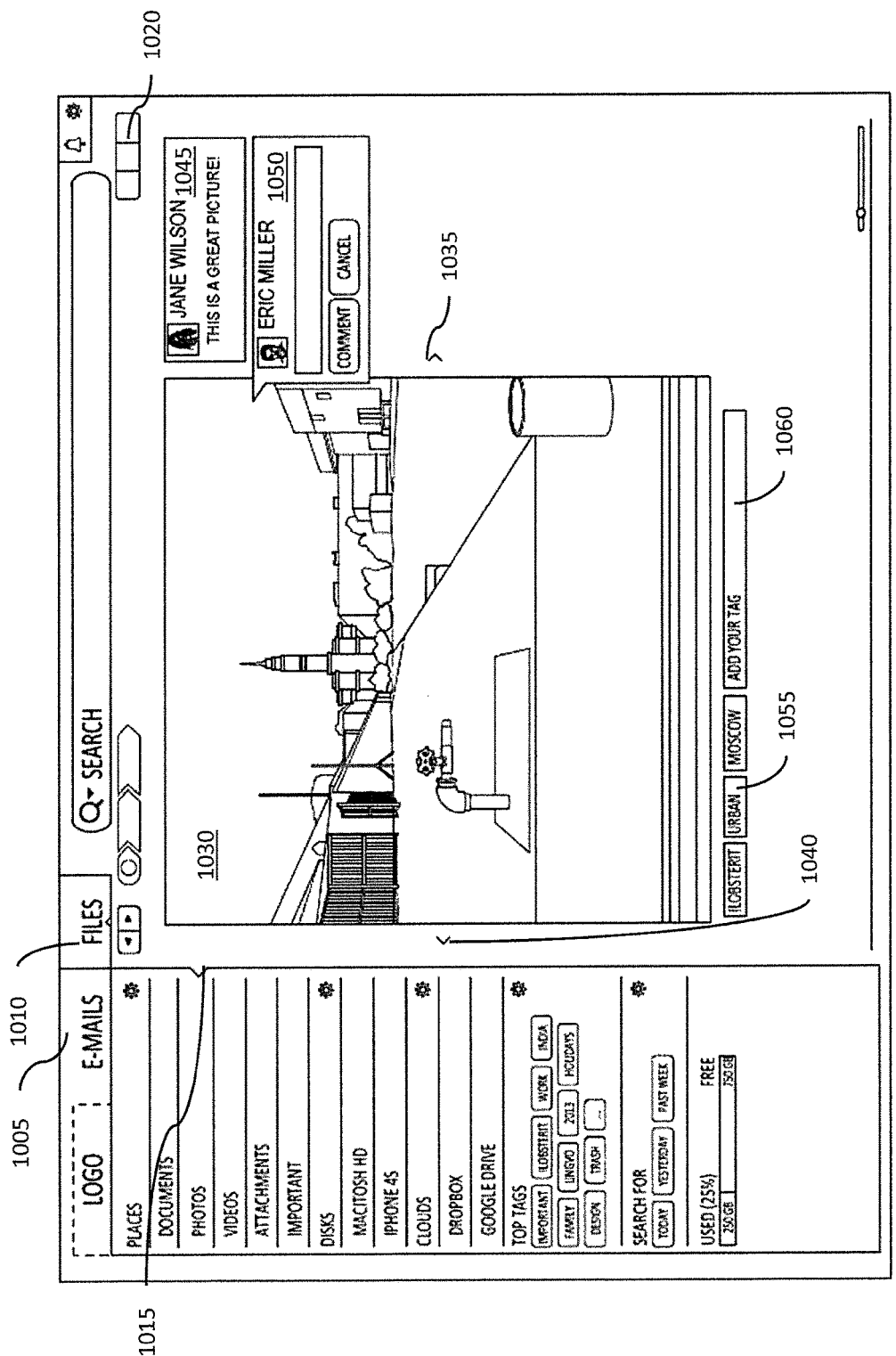
FIG. 10 is a representation of a GUI demonstrating a single photo view in accordance with an illustrative embodiment.

FIG. 10 is a representation of a GUI 1000 demonstrating a single photo view in accordance with an illustrative embodiment. In alternative embodiments, fewer, additional, and/or different components may be displayed on the GUI. The GUI 1000 includes an e-mails tab 1005 and a files tab 1010. On the GUI 1000, the files tab 1010 is selected. Further, the GUI 1000 here shows a large view of a photo 1030. The GUI 1000 may be a result of the selection of a photo from FIG. 6, which is why the photo's virtual folder is selected as evidenced by the arrow 1015. A view selector 1020 is also shown on the GUI 1000. The different sections of the view selector 1020 may be interacted with to change how the photos are viewed. For example, interacting with the view selector may return to a view like the one depicted in FIG. 6. Another section of the view selector 1020 may be interacted with to show a list of photo previews that displays significantly more metadata about the photos than is shown in FIG. 6.

The photo that is being displayed on the GUI 1000 may also be changed utilizing arrows 1035 and 1040. The user may move forward or backward in a sequence of photos using the arrows 1035 and 1040. The GUI 1000 also shows tags related to the photo 1030, such as tag 1055. Additionally, the user may add new tags to a photo with add your tag 1060.

The GUI 1000 also displays comments relating to the photo 1030, such as comment 1045. The user, who in this embodiment is named Eric Miller, may also comment on the photo 1030 using comment dialog 1050.

Figure 11:
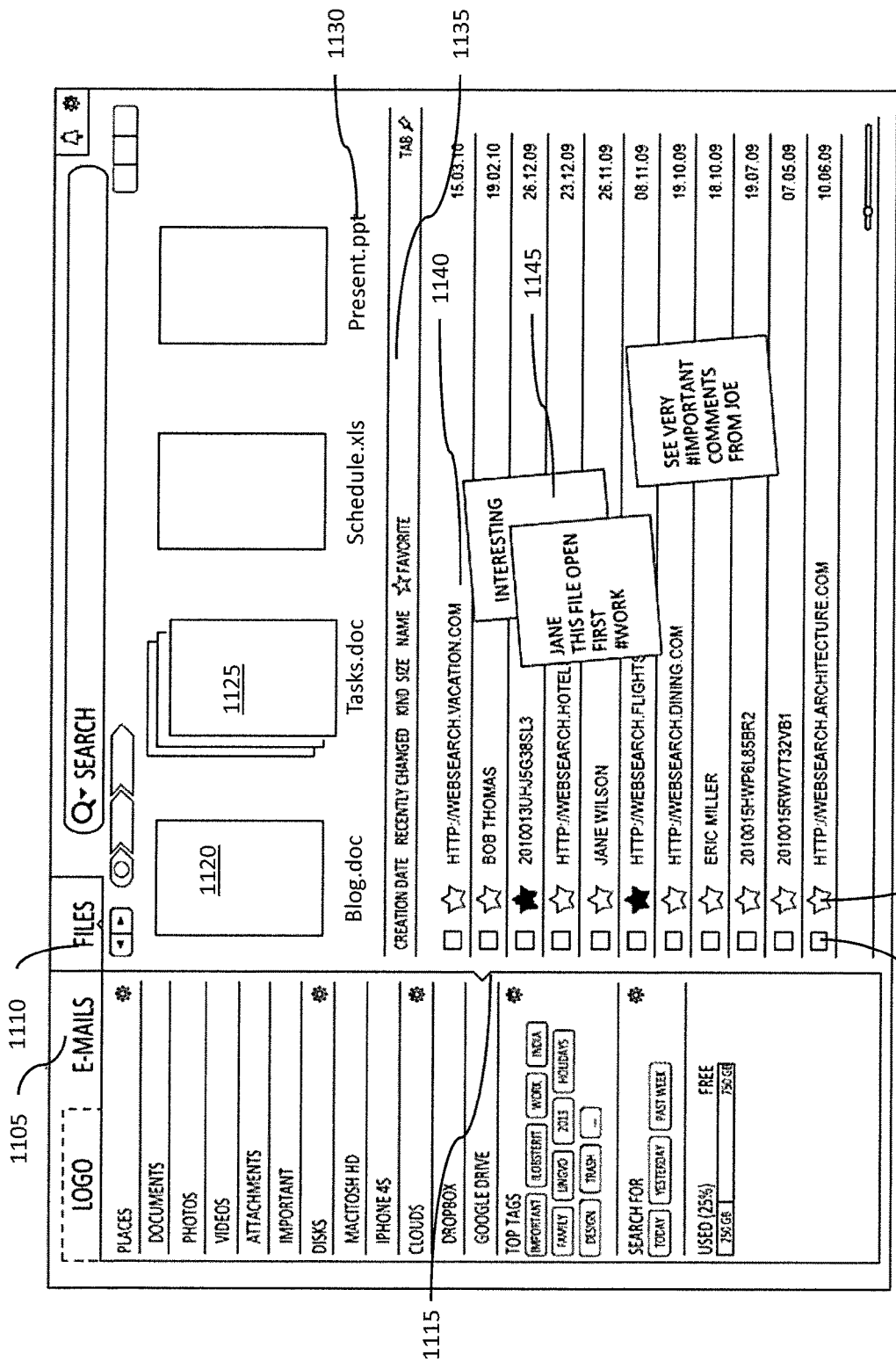
FIG. 11 a representation of a GUI demonstrating an electronic files view with reminders in accordance with an illustrative embodiment.

FIG. 11 is a representation of a GUI 1100 demonstrating an electronic files view with reminders in accordance with an illustrative embodiment. In alternative embodiments, fewer, additional, and/or different components may be displayed on the GUI. The GUI 1100 includes an e-mails tab 1105 and a files tab 1110. On the GUI 1100, the files tab 1110 is selected. Here, the Google™ Drive is selected in the workspace as evidenced by an arrow 1115. The GUI 1100 includes large file previews, such as previews 1120 and 1125, as well as listed documents, such as document 1140.

Preview 1120 is shown as a single page preview. Preview 1125 displays only the first page of the file as preview, but indicates that the file has multiple pages. In an alternative embodiment, this may indicate that there are several copies of the file throughout the user's devices, or that there are multiple versions of the file. Each preview is also displayed with a name, such as name 1130.

Above the listed documents are sorting tabs 1135. Sorting tabs 1135 include creation date, recently changed, kind, size, name and favorite. The user may interact with the sorting tabs 1135 to manipulate which files are displayed in the listed documents. If any of the listed documents are interacted with, they may be shown as a large file preview. The listed documents also includes reminder notes, such as reminder 1145. The user may make such reminder notes either for himself or for other users who have access to the files with the reminders through a cloud storage. Additionally, reminders may also have been created by someone other than the user here, and therefore the user may be viewing reminders created by others. The list of documents also includes a checkbox 1150 and a favorite star 1155. The favorite star 1155 can be toggled on and off so the user can designate or undesignated a file as a favorite. The checkbox 1150 may be utilized by the user when the user wishes to perform the same action on several files. To do this, multiple files may be checked, or selected, and the action can then be carried out on all the files that have been checked.

In an illustrative embodiment, the GUI 1100 shows how search results may be presented. For example, the user may have specified to run a search of his or her Google Drive™. As a result of the search, the GUI 1100 may be displayed. Here, previews 1120 and 1125 are displayed with more prominence than the files displayed below, such as the document 1140. Accordingly, based on the search terms, the system has determined that those files shown above (e.g., the previews 1120 and 1125) are more relevant than the other search results (e.g., the document 1140).

Figure 12:
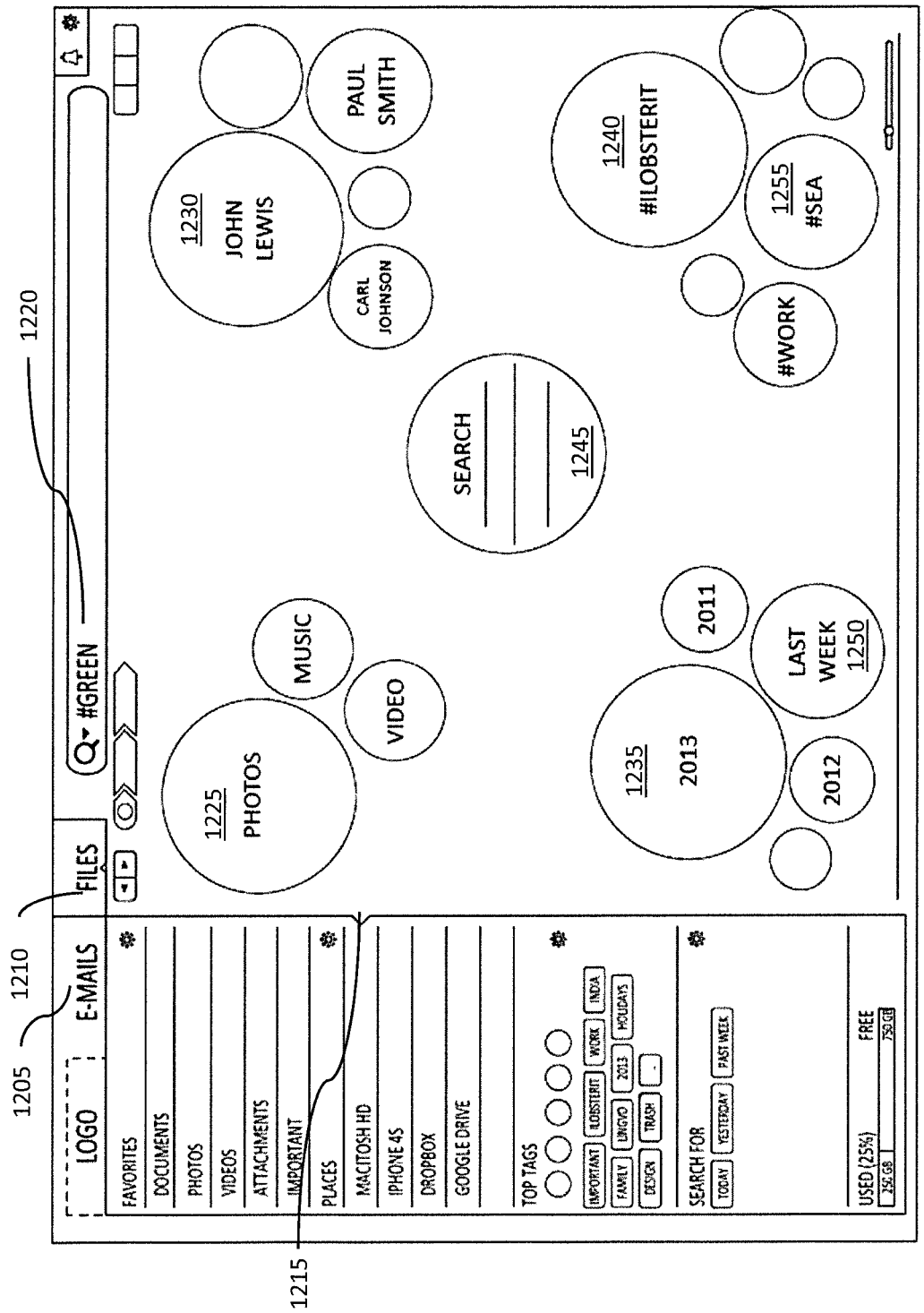
FIG. 12 a representation of a GUI demonstrating a dynamic birds-eye view of a user's data in accordance with an illustrative embodiment.

FIG. 12 is a representation of a GUI 1200 demonstrating a dynamic birds-eye view of a user's data in accordance with an illustrative embodiment. In alternative embodiments, fewer, additional, and/or different components may be displayed on the GUI.

The GUI 1200 demonstrates a state of a dynamic view of all of the user's data, which may be termed a birds-eye view. The birds-eye view assists the user to understand the structure of all of the data in his entire network. In addition, this dynamic view presents any history of file changes to the user.

The GUI 1200 includes an e-mails tab 1205 and a files tab 1210. Here the Macintosh HD is selected from the workspace as evidenced by an arrow 1215. Here, the search term "#GREEN" has been entered into the search field 1220. Hence, any of the documents represented in the birds-eye view are related to the search term. However, in other embodiments, a dynamic display like the one in FIG. 12 may be displayed without search terms being entered. For example, if there were no search term entered in GUI 1200 but all else was the same, the various displays in the GUI 1200 would represent all of the files on the user's Macintosh HD, and not just the files associated with a search term.

The groups of files, or amalgamations or clusters, shown in the GUI 1200 all represent different things. For example, group 1225 represents all photos on the user's Macintosh HD that relate to the search term. If the group 1225 is selected, the photos may be displayed and examined in greater detail. The relative size and prominence of the group 1225 conveys information to the user. Here, it may convey that the user has more pictures than music or video. In another embodiment, the relative prominence of group 1225 may be an indicator that the user accesses photos more often than music or video files. Similarly, groups 1230, 1240, and 1255 may also be relatively sized based on quantity of files or preference of the user. In another embodiment, the relative sizes of the groups may indicate a relevance to the search term or terms. The groups may also be displayed using different colors. This can make the display more pleasant to look at, or the colors may indicate certain properties or relevance of files. The groups 1240 and 1255 indicate groups of files that correspond to certain hashtags. Groups such as group 1230 represents groups of files that correspond to certain contacts of the user.

In another example, groups 1235 and 1250 are displayed. Here, all files relevant to the search term from the year 2013 are represented by group 1235. Group 1235 is displayed more prominently than the other year groups (here 2011 and 2012) because of a relevance factor. That is, the system considers the year 2013 to be more relevant than past years to the user, thus group 1235 is displayed more prominently. Group 1250 is displayed with a medium amount of prominence because it may also be considered relevant to the user, since it contains files from last week. However, group 1250 is still intentionally smaller than group 1235 to indicate the relatively smaller group of files that are from last week than are from the entire year 2013. Also displayed on the GUI 1200 is a search dialog 1245. The search dialog 1245 offers an alternative to the search field 1220. Any searches performed using the search dialog 1245 may be dynamically displayed. That is, if a user searches for something, the user may visibly see groups change shape, move, be added, disappear, or change color depending on the relevance of files in each group to the search performed. Furthermore, groups can be customized and configured by the user or can be automatically generated by the system.

The groups displayed on the GUI 1200 can be interacted with by the user in a unique way. Each of the groups is displayed as a physical object that can be moved and has mass, speed, inertia, acceleration, magnetic, gravity, and/or other physical forces. The groups will therefore move and interact according to physical laws. A user may interact with the groups by dragging, moving, etc. the groups around the GUI 1200. The groups themselves also interact with each other. For example, a very small group may be pulled toward a larger group through a gravity force. Groups can change behavior, trajectory, color, and shape while a user moves a pointer or finger, types a search query, gets search results, moves items, scrolls through lists, or does other actions. A search can be performed by dragging a group or groups to the search dialog 1245. A search term can be removed from the search by dragging it out of the search dialog 1245. In one embodiment, the system is constantly estimated each group's importance to the user, and the physical size of the group indicates the relative importance calculation of that group to the user. Other facets of a group may also be used to indicate importance, such as position, shape, content, and dynamic effects of a group.

For example, the groups may interact in ways similar to how physical objects might interact. For example, if a user drags a group by touching and swiping a group through a touchscreen, any groups that the dragged group comes into contact with may be bumped and moved on the display. In other words, no two groups may occupy the same coordinate space on the GUI 1200, so if one bumps into another one will have to yield. In this regard, when two groups collide, the relative inertia, mass, and velocity of the groups may be taken into account. In other words, if a smaller group bumps a larger group, the larger group may be considered to have a larger mass than the smaller group. Thus, the smaller group would be able to transfer inertia to the larger group that either causes the larger group to move only slowly, while causing the smaller group to bounce off the larger group with much more velocity. In an alternative embodiment, where the user is dragging a group as described above, the system may give the group so-called super powers. That is, the user dragging a group may give the group virtually unlimited mass, causing any group in its path to bounce off of it and out of the way. In this way, if a user wants to place a group in a particular place, they cannot be stopped from doing so.

In another example, certain groups may be subject to certain magnetic forces. For example, one group may be subjected to a force between itself and a first type of groups, but not a second type of groups. For example, a photos group may be pulled toward other groups that contain other audio and/or visual media, such as videos, podcasts, music, and the like. In this way, by programming in a magnetic force between similar group types, the similar groups can be displayed together because of the magnetic forces acting upon them, as shown in one example in FIG. 12. The system may also include negative magnetic forces. That, is some groups may also be programmed to repel each other. For example, a GUI may include groups related to personal photos and work photos. In order to prevent the two from mixing or being associated with each other, a repelling magnetic force may be programmed in.

Regarding mixing, the user may combine groups using the GUI 1200. For example, a user may specify that one group envelope another to create a larger group representing the files of both the original two groups.

In an embodiment where a user may drag different groups around the GUI 1200, a user may slow down and stop the movement of the group before releasing it. In this case, the group may not move after release, but for other forces acting on it, such as gravitational or magnetic forces. In another embodiment, the user may not slow down or stop the movement of a group being dragged before releasing the group. In this case, the moving group may maintain its inertia unless acted on by other forces. For example, the group may crash into other groups, cause the group to bounce and/or the other groups to move on the GUI 1200.

Regarding searching, a user may search by either typing into the search dialog 1245 or dragging other groups to the search dialog 1245. For example, if the user wishes to see group representations of files that only relate to the hashtag "sea," the group 1255 may be dragged by the user to the search dialog 1245. Once the group 1255 has been placed in the search dialog 1245, the group 1255 may no longer be subjected to the forces it would otherwise be subjected to. That is, the group 1255 is stuck in the search dialog 1245. The system will perform the search by changing the relative sizes of the other remaining groups displayed on the GUI 1200 to indicate files that are relevant to the hashtag "sea." The changing of the sizes may be demonstrated immediately, or may be animated as a transition over time. Regardless of how quickly the groups change size to indicate the search results, the forces present between groups may change, and the groups will react accordingly. For example, if a group gets bigger, it may push other groups out of the way, while exerting a larger gravitational force on the other groups. If a group gets smaller, the gravitational force exerted on other groups may be reduced. The changes in gravitational forces based on search results may cause the groups to actually move on the GUI 1200 after the search is performed.

Although circles are used to represent groups in FIG. 12, other shapes may be used in other embodiments. In such embodiments, the shape of a group may impact how the groups physically interact. For example, a circle bouncing off a circle in the GUI 1200 may not happen in the exact same way as a circle bouncing off of a triangle, the bounce angle may be different due to the different shape.

Figure 13:
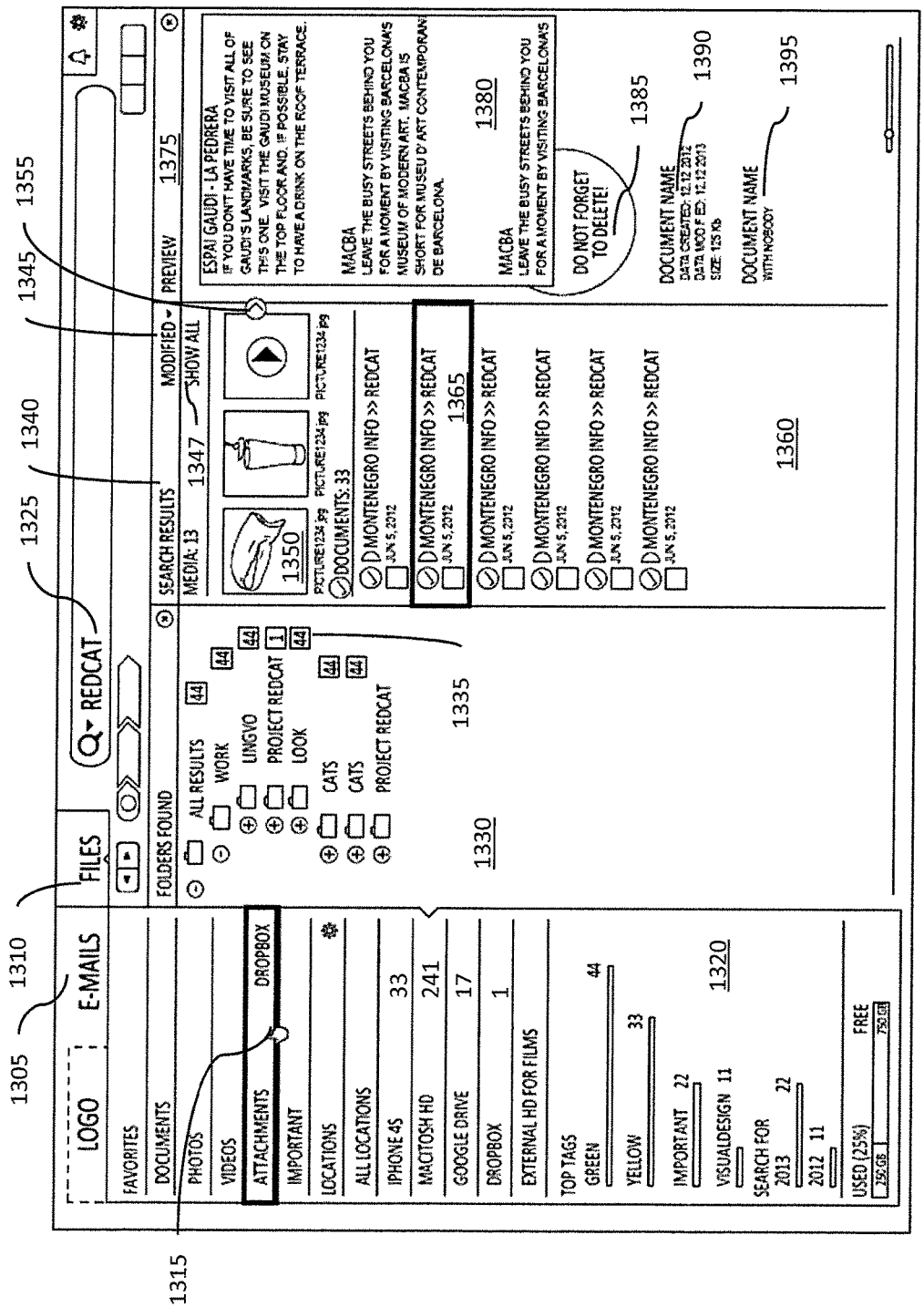
FIG. 13 is a representation of a GUI demonstrating a multi-level view including a hierarchical tree structure in accordance with an illustrative embodiment.

FIG. 13 is a representation of a GUI 1300 demonstrating a multi-level view including a hierarchical tree structure in accordance with an illustrative embodiment. In alternative embodiments, fewer, additional, and/or different components may be displayed on the GUI. The GUI 1300 includes an e-mails tab 1305 and a files tab 1310. Here the files tab 1310 is selected. Further, the Macintosh HD is selected from the workspace. In the workspace, a pointer has been directed by a user to the attachments/dropbox location 1315. As a result, the system has displayed a highlighted box around the attachments/dropbox location 1315. Further, in the workspace, certain locations also indicate how many files are physically stored at each location. For example, the Macintosh HD has 241 files stored on it's hard drive. In an alternative embodiment, such a number may indicate something different, such as files indexed from this location within the last week or month.

The GUI 1300 also includes a search analysis section 1320. This section indicates trends, data, and/or statistics regarding the search results. For example, 44 of the search results are associated with the tag "GREEN" and eleven of the search results are from files from the year 2012. In alternative embodiments, other statistics may also be displayed, such as size of files, author of files, sender of files, number of versions or changes from original, or importance.

A search term "REDCAT" has been entered into a search dialog 1325. Accordingly, each one of the files or file representations in the GUI 1300 are related to the search term. A file tree hierarchy 1330 is shown in the GUI 1300. The file tree hierarchy 1330 shows a navigable hierarchy that shows folders and sub-folders where relevant search results are located. Each level of the hierarchy also includes an indicator 1335 of how many relevant search results are in each folder. The folders displayed here can represent physical or virtual folders. A search results section 1340 may show the contents of a folder selected from the file tree hierarchy 1330. In another embodiment, the system may automatically populate the search results 1340 with various relevant search results 1360, such as photo 1350 and document 1365. The search results 1360 may also be modified or sorted using a drop down menu 1345. Here it is indicated that the results have been modified.

The file tree hierarchy 1330 in the GUI shows search results grouped or clustered together in a way that is convenient for the user. The file tree hierarchy starts out with a broad folder, "all results." If the user selects this, all of the results of the search can be viewed. However, the "all results" folder can be expanded to reveal further sorted and clustered search results. For example, in FIG. 13, a work sub-folder is selected and expanded out. Advantageously, each folder also shows how many search results are part of that cluster or group. The work folder shows 44 results. Any of the sub-folders, in addition to being expanded, can also be selected. Once selected, the search results are displayed in the search results section 1340. Advantageously, the file tree hierarchy 1330 gives the user of the GUI 1300 a convenient and simple way to manageably view and deal with large numbers of search results.

There are also subsections of the search results 1360. Here, the subsections include media and document type results, though other types may be included in other embodiments such as contacts and messages. The media results also include a show all button 1347. By interacting with the show all button 1347, all of the media results may be displayed. In the alternative, if the user would like to view more results, an arrow 1355 may be interacted with to scroll through the different media results that are not currently displayed.

Here, document 1365 has been selected from among the search results. Accordingly in preview section 1375, a preview 1380 of the document 1365 is displayed. Further information 1390 about the previewed file is also displayed. If a user has previously made a reminder regarding the file, the reminder is also displayed. Here, reminder 1385 is displayed along with the preview 1380. At collaborators 1395, the system may display who has collaborated on the file with the user. However, in this embodiment, nobody has collaborated on the file.

Figure 14:
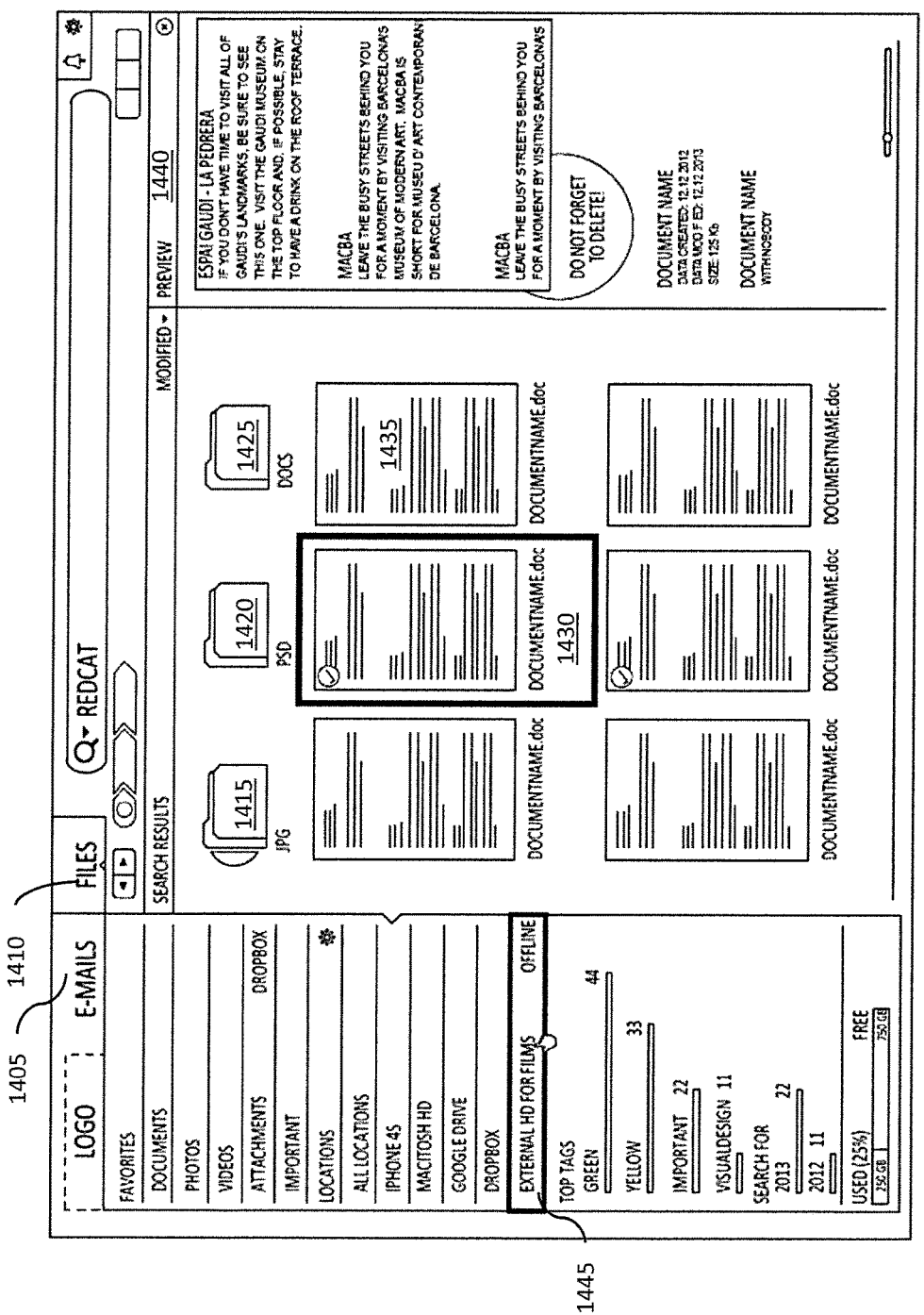
FIG. 14 is a representation of a GUI demonstrating a multi-level view including a document preview in accordance with an illustrative embodiment.

FIG. 14 is a representation of a GUI 1400 demonstrating a multi-level view including a document preview in accordance with an illustrative embodiment. In alternative embodiments, fewer, additional, and/or different components may be displayed on the GUI. The GUI 1400 shows an alternative display to the GUI 1300 of FIG. 13. The GUI 1400 includes an e-mails tab 1405 and a files tab 1410. Here the files tab 1410 is selected. The workspace of GUI 1400 also demonstrates how the status of a device or location might be indicated. At location 1445, external HD for films, there is an indication that the location is offline. Here search results are shown as folders, such as folders 1415, 1420, and 1425, and documents, such as documents 1430 and 1435. Here the documents in the search results including the documents 1430 and 1435 include an extracted first page preview. The selected document, document 1430, also has text from the document displayed as preview 1440, which may be easier to read than the first page preview.

Figure 15:
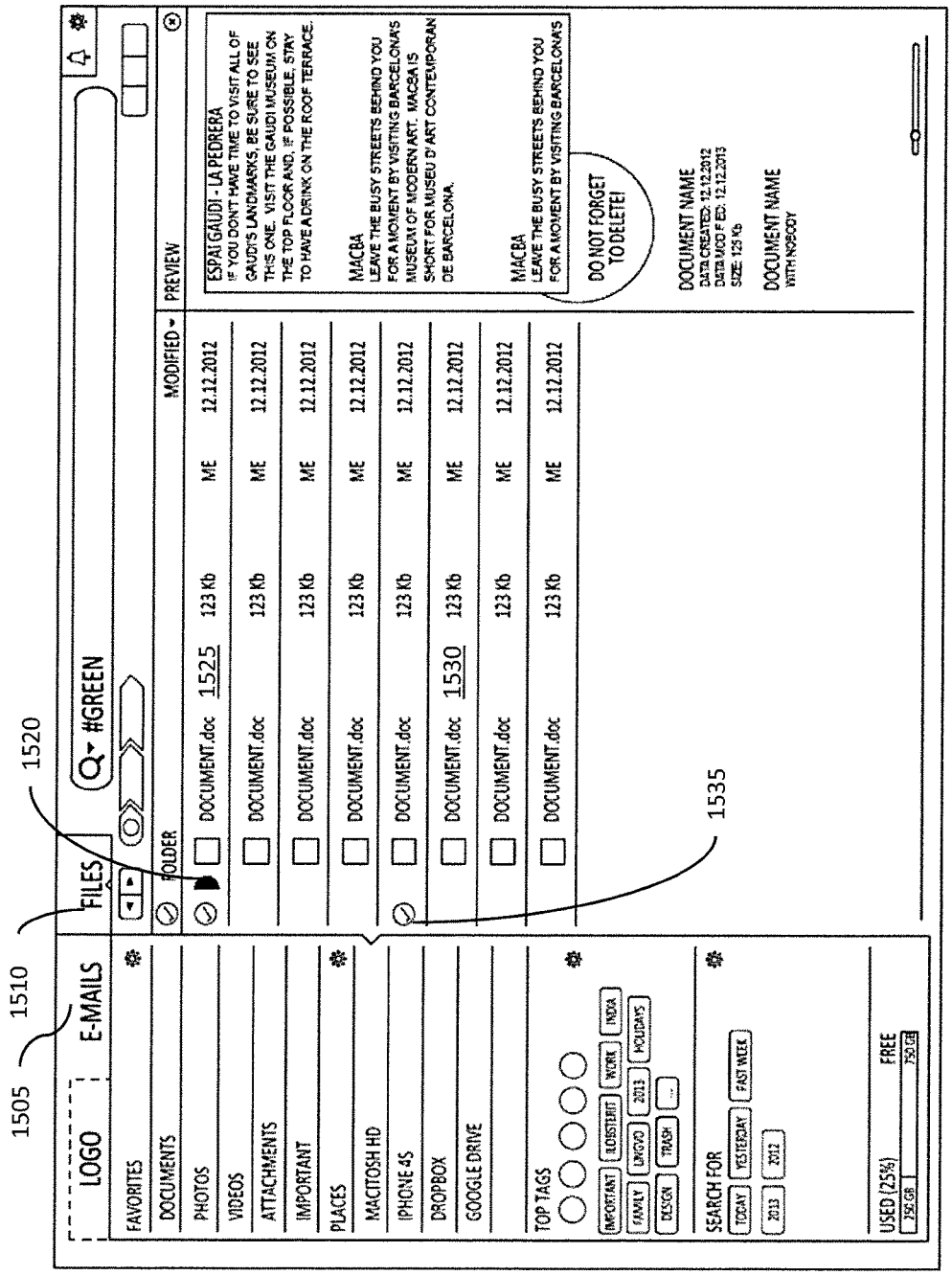
FIG. 15 a representation of a GUI demonstrating the contents of a specific device's storage in accordance with an illustrative embodiment.

FIG. 15 is a representation of a GUI 1500 demonstrating the contents of a specific device's storage in accordance with an illustrative embodiment. In alternative embodiments, fewer, additional, and/or different components may be displayed on the GUI. The GUI 1500 includes an e-mails tab 1505 and a files tab 1510. Here, the files tab 1510 is selected. The GUI 1500 shows another alternative embodiment to the GUIs 1300 and 1400 for displaying search results. Here the preview on the right side of the GUI 1500 is similar to previous embodiments. However, the results are displayed as a list of documents and including metadata regarding the documents. The search results include documents 1525 and 1530. Here, a priority icon 1520 is associated with the document 1525. This indicates that the user has noted that the document 1525 is a priority. Further, although not visible in FIG. 15, the priority icon 1520 and other priority icons may be color coded in order to determine relative priority for different documents. A check mark icon 1535 also appears next to certain documents in the search results. Such a check mark icon 1535 indicates that the document has been backed-up on the user's cloud storage. If the original file is on cloud storage, then a check mark may indicate that the document has been backed up in a second location.

Figure 16:
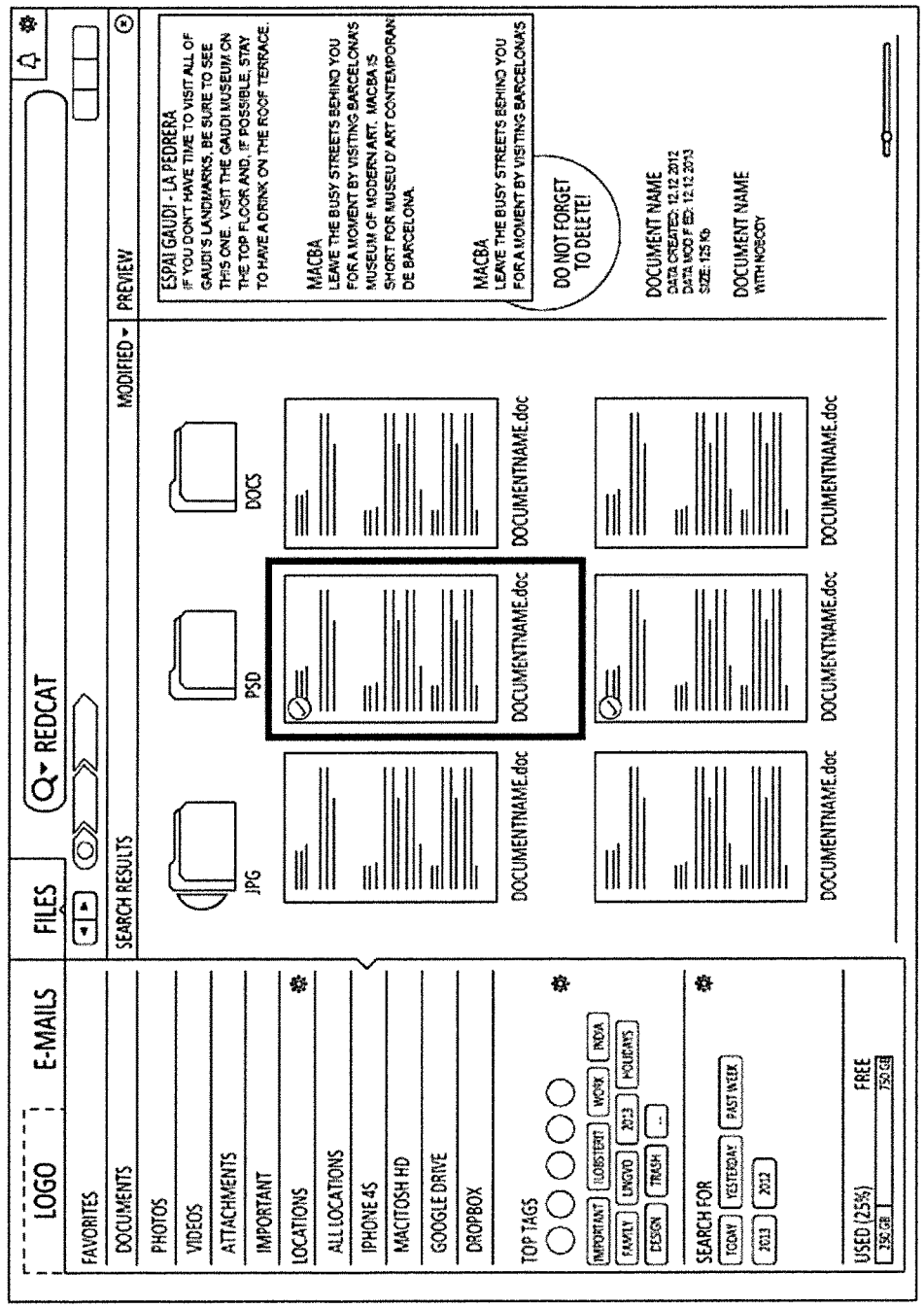
FIG. 16 is a representation of a GUI demonstrating a multi-level view including a document preview and an icon based tagging section in accordance with an illustrative embodiment.
Figure 17:
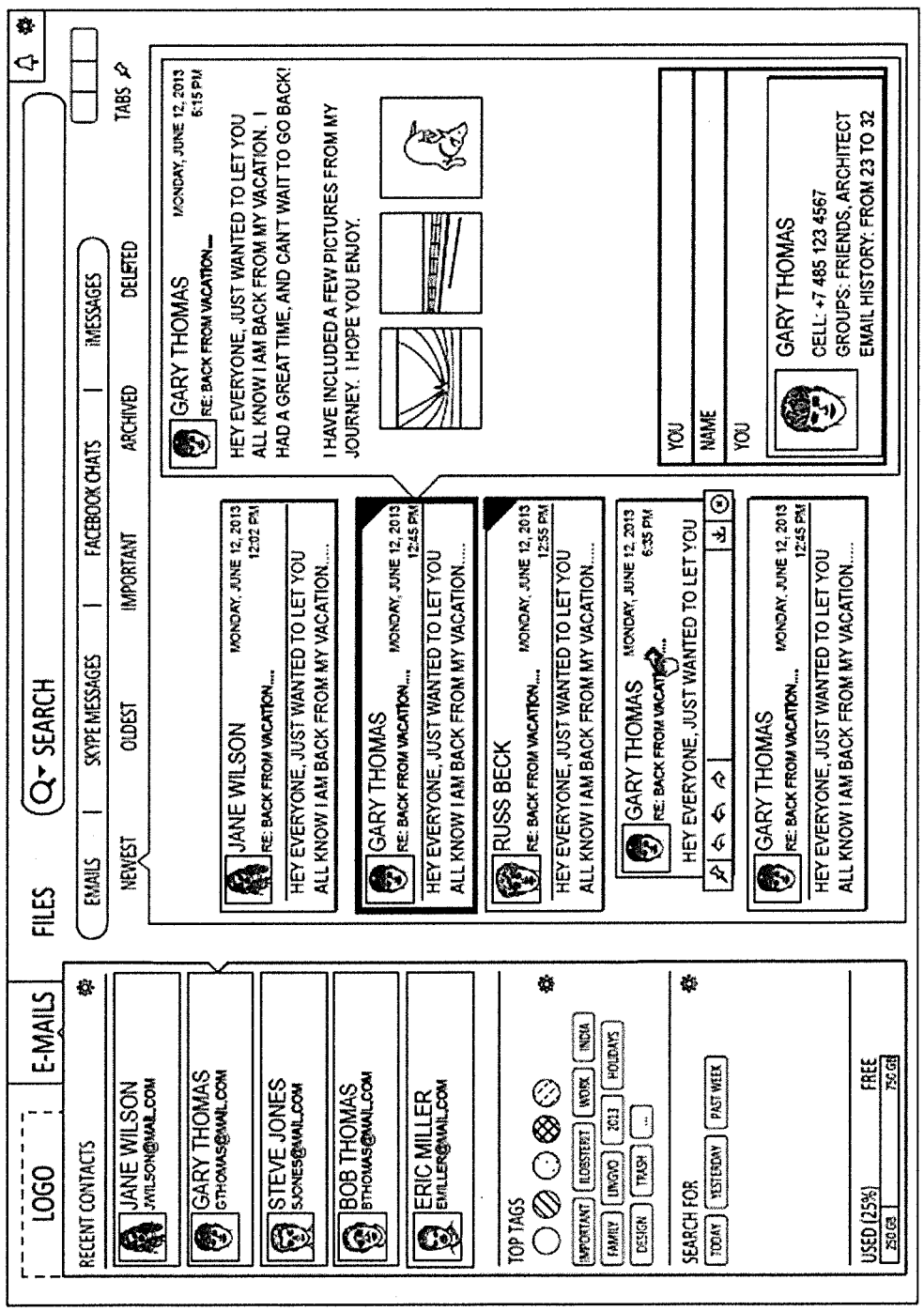
FIG. 17 is a representation of a GUI demonstrating an e-mail interface with a sorted contact list, an e-mail correspondence chain, and an icon based tagging section in accordance with an illustrative embodiment.

FIG. 16 is a representation of a GUI 1600 demonstrating a multi-level view including a document preview and an icon based tagging section in accordance with an illustrative embodiment. In alternative embodiments, fewer, additional, and/or different components may be displayed on the GUI. FIG. 17 is a representation of a GUI 1700 demonstrating an e-mail interface with a sorted contact list, an e-mail correspondence chain, and an icon based tagging section in accordance with an illustrative embodiment. In alternative embodiments, fewer, additional, and/or different components may be displayed on the GUI. Both the GUI 1600 and the GUI 1700 display combinations of elements and functionalities discussed previously with respect to other figures. The GUI 1600 and the GUI 1700 demonstrate alternative embodiments to the previously discussed figures.

FIG. 18 is a block diagram illustrating various computing and electronic storage devices that may be used in accordance with an illustrative embodiment. In alternative embodiments, fewer, additional, and/or different components may be included in the system. FIG. 18 includes a personal computing device 1800, a portable storage device 1897, a network 125, a cloud storage system 1830, a tablet device 1840, and a mobile electronic device 1865. The personal computing device 1800 includes a processor 1815 that is coupled to a memory 1805. The personal computing device 1800 can store and recall data and applications in the memory 1805. The processor 1815 may also display objects, applications, data, etc. on a display/interface 1810. The display/interface 1810 may be a touchscreen, a game system controller, a remote control, a keyboard, a mouse, a trackpad, a microphone, a camera, a set of buttons, a standard electronic display screen, a television, a computer monitor, or any combination of those or similar components. The processor 1815 may also receive inputs from a user through the display/interface 1810. The processor 1815 is also coupled to a transceiver 1820. With this configuration, the processor 1815, and subsequently the personal computing device 1800, can communicate with other devices, such as the cloud storage system 1830 through a connection 1887 and the network 1825. Although FIG. 18 shows one personal computing device 1800, an alternative embodiment may include multiple personal computing devices.

The tablet device 1840 includes a processor 1855 that is coupled to a memory 1845. The processor 1855 can store and recall data and applications in the memory 1845. The processor 1855 may also display objects, applications, data, etc. on a display/interface 1850. The display/interface 1850 may be a touchscreen as most tablets have, but may also include or incorporate a keyboard, a game system controller, a remote control, a mouse, a trackpad, a microphone, a camera, a set of buttons, a standard electronic display screen, a television, a computer monitor, or any combination of those or similar components. The processor 1855 may also receive inputs from a user through the display/interface 1850. The processor 1855 is also coupled to a transceiver 1860. With this configuration, the processor 1855, and subsequently the tablet device 1840, can communicate with other devices, such as the personal computing device 1800 through a connection 1895 and the network 1825.

The mobile electronic device 1865 includes a processor 1875 that is coupled to a memory 1885. The processor 1875 can store and recall data and applications in the memory 1885. The processor 1875 may also display objects, applications, data, etc. on a display/interface 1880. The display/interface 1880 may be a touchscreen, a game system controller, a keyboard, a remote control, a mouse, a trackpad, a microphone, a camera, a set of buttons, a standard electronic display screen, a television, a computer monitor, or any combination of those or similar components. The processor 1875 may also receive inputs from a user through the display/interface 1880. The processor 1875 is also coupled to a transceiver 1870. With this configuration, the processor 1875, and subsequently the viewer electronic device 1865, can communicate with other devices, such as the tablet device 1840 through a connection 1890 and the network 1825. Although FIG. 18 shows only one mobile electronic device 1865, an alternative embodiment may include multiple mobile electronic devices.

FIG. 18 also includes the cloud storage system 1830. The cloud storage system 1830 may include a number of servers that may have memory and processors. The cloud storage system 1830 is connected to the network through a connection 1835 and may communicate with other devices such as the mobile electronic device 1865.

FIG. 18 also includes the portable storage device 1897. This portable storage device 1897 may be a removable USB drive for example. Since such a portable memory does not have a processor, the portable storage device 1897 must be connected to a computing device for the information and files stored on the portable storage device 1897 can be read by such devices. Accordingly, in this embodiment, the portable storage device 1897 is plugged into the personal computing device 1800, which can read the data from the portable storage device 1897 and communicate its contents or data related to its contents to any of the other devices that have access to the network 1825.

The devices shown in the illustrative embodiment may be utilized in various ways. For example, any of the connections 1887, 1890, 1895, and 1835 may be varied. Any of the connections 187, 190, 195, and 135 may be a hard wired connection. A hard wired connection may involve connecting the devices through a USB (universal serial bus) port (like connection 1899), serial port, parallel port, or other type of wired connection that can facilitate the transfer of data and information between a processor of a device and a second processor of a second device. In another embodiment, any of the connections 1887, 1890, 1895, and 1835 may be a dock where one device may plug into another device. While plugged into a dock, the client-device may also have its batteries charged or otherwise be serviced. In other embodiments, any of the connections 1887, 1890, 1895, and 1835 may be a wireless connection. These connections may take the form of any sort of wireless connection, including but not limited to Bluetooth connectivity, Wi-Fi connectivity, or another wireless protocol. Other possible modes of wireless communication may include near-field communications, such as passive radio-frequency identification (RFID) and active (RFID) technologies. RFID and similar near-field communications may allow the various devices to communicate in short range when they are placed proximate to one another. In an embodiment using near field communication, two devices may have to physically (or very nearly) come into contact, and one or both of the devices may sense various data such as acceleration, position, orientation, velocity, change in velocity, IP address, and other sensor data. The system can then use the various sensor data to confirm a transmission of data over the internet between the two devices. In yet another embodiment, the devices may connect through an internet (or other network) connection. That is, any of the connections 1887, 1890, 1895, and 1835 may represent several different computing devices and network components that allow the various devices to communicate through the internet, either through a hard-wired or wireless connection. Any of the connections 1887, 1890, 1895, and 1835 may also be a combination of several modes of connection. The network 1825 may also include similar components described above with respect to the connections 1887, 1890, 1895, and 1835. In addition, the network 1825 may include intermediate servers, routing devices, processors, data traffic management services, and wired or un-wired connections.

To operate different embodiments of the system or programs disclosed herein, the various devices may communicate using the software systems and methods disclosed herein. Software applications may be manually installed on the devices or downloaded from the internet. Such software applications may allow the various devices in FIG. 18 to perform some or all of the processes and functions described herein. Additionally, the embodiments disclosed herein are not limited to being performed only on the disclosed devices in FIG. 18. It will be appreciated that many various combinations of computing devices may execute the methods and systems disclosed herein. Examples of such computing devices may include smart phones, personal computers, servers, laptop computers, tablets, blackberries, RFID enabled devices, video game console systems, smart TV devices, or any combinations of these or similar devices.

In one embodiment, a download of a program to the mobile electronic device 1865 involves the processor 1875 receiving data through the transceiver 1870 through connection 1890 and the network 1825. The network 1825 may be connected to the internet. The processor 1875 may store the data (like the program) in the memory 1885. The processor 1875 can execute the program at any time. In another embodiment, some aspects of a program may not be downloaded to the viewer electronic device 1865. For example, the program may be an application that accesses additional data or resources located in a server, or even the cloud storage system 1830 which may include one or more servers. In another example, the program may be an internet-based application, where the program is executed by a web browser and stored in a server that is part of the network 1825 or the cloud storage system 1830. In the latter example, temporary files and/or a web browser may be used on the mobile electronic device 1865 in order to execute the program, system, application, etc. In additional embodiments, the tablet device 1840 and the personal computing device 1800 may use, store, or download software applications and web based programs in a similar way.

The configuration of the personal computing device 1800, the portable storage device 1897, the tablet device 1840, the mobile electronic device 1865, the network 1825, and the cloud storage system 1830 is merely one physical system on which the disclosed embodiments may be executed. Other configurations of the devices shown exist to practice the disclosed embodiments. Further, configurations of additional or fewer devices than the ones shown in FIG. 18 may exist to practice the disclosed embodiments. Additionally, the devices shown in FIG. 18 may be combined to allow for fewer devices or separated where more than the five devices shown exist in a system.

FIG. 19 is a flow diagram illustrating a method 1900 of displaying representative information of files and e-mails on a GUI utilizing a two tab display in accordance with an illustrative embodiment. In alternative embodiments, fewer, additional, and/or different operations may be performed. Also, the use of a flow diagram is not meant to be limiting with respect to the order of operations performed. In an operation 1905, the system determines the presence of electronic files, such as documents, photos, videos, messages, and contacts, on a several electronic devices of a user. Such devices could include a laptop, desktop computer, external hard drive, tablet, smart phone, etc. The system may also determine the presence of electronic files that the user has control of in cloud storage mediums. The index of all these electronic files may be stored on one of the user's devices or a cloud storage medium that the user's devices can access.

In an operation 1910, representative information of the electronic files that has been indexed is displayed in a single window configuration. The electronic files are displayed on a first tab in the single window. In this embodiment, the electronic files displayed on the first tab do not include messages and contacts. However, in other embodiments, messages and contacts may be displayed.

In an operation 1915, a second tab is also displayed in the single window configuration. In an operation 1920, an input is received from the user to navigate to the second tab in the single window. The input may be through a touchscreen, traditional mouse, track pad, or other user input device. In an operation 1920, e-mail files that have been indexed in the operation 1905 are displayed in the second tab. Accordingly, the method 1900 allows for indexing of electronic files, and a two tab display of information representing those files. The two tabs each display information regarding different types of electronic files. The two tabs can be switched back and forth quite easily from a single interaction or input from the user.

FIG. 20 is a flow diagram illustrating a method 2000 of determining files a user has access to and displaying representative information of the files on a GUI in accordance with an illustrative embodiment. In alternative embodiments, fewer, additional, and/or different operations may be performed. Also, the use of a flow diagram is not meant to be limiting with respect to the order of operations performed. In an operation 2005, a presence of electronic files on user devices is determined and the files are indexed. This operation may be performed similarly to operation 1905 of FIG. 19, discussed above.

In an operation 2010, the system further determines and indexes any electronic files that have been shared with the user or that the user has access to. For example, if a document is shared with the user on a cloud storage medium, the system can determine a presence of the document and index the document. In another example, the system may determine photos that have been shared with the user through photo sharing websites such as Flickr™ or Facebook™. In an additional example, even if a file has not been shared with the user, its presence may still be determined by the system as relevant to the users. For example, if a photo has not been shared with the user, but the user has been tagged in the photo in an online social network, then the system may determine the photo relevant and index it. In an operation 2015, representative information of the indexed files is displayed. The representative information includes both location information and descriptive information. That is, information on where a file is located and what a file is are both displayed.

FIG. 21 is a flow diagram illustrating a method 2100 of determining the status of various electronic devices and displaying that status on a GUI in accordance with an illustrative embodiment. In alternative embodiments, fewer, additional, and/or different operations may be performed. Also, the use of a flow diagram is not meant to be limiting with respect to the order of operations performed. In an operation 2105, a status of various electronic devices is determined. For example, a status of an electronic device may be a connection status, an online status, an offline status, a passive status, an active status, a connected status, an unconnected status, a currently operational status, a currently non-operational status, or a set in a lower functional mode status. For example, a lower functional mode may be a sleep, hibernate, or screen saver type mode. In another example, a lower functional mode may indicate that a device is locked or not logged into. In another example, a lower functional mode may indicate that a mobile device is on, but that most of the inputs are currently disabled and a display is turned off (for example, when someone darkens their phone while it is in his or her pocket or handbag).

In an operation 2110, the status of each electronic device is displayed. The status of each device may be indicated on a GUI. In an operation 2115, the status of each device is displayed along with representative information of electronic files. In other words, for an electronic file stored on an electronic device, the system will display a status along with the file whether the device where that file is stored is online or offline.

FIG. 22 is a flow diagram illustrating a method 2200 of extracting data from an electronic file and displaying a preview of the file on a GUI in accordance with an illustrative embodiment. In alternative embodiments, fewer, additional, and/or different operations may be performed. Also, the use of a flow diagram is not meant to be limiting with respect to the order of operations performed. In an operation 2205, data is extracted from an electronic file. In an operation 2210, the extracted data is used to generate a visual preview of the electronic file. For example, if the file is a document, a smaller version of the first page of the document may be used as a preview. In another example, if the file is a photo, a thumbnail of the photo can be generated to use as a preview. In an operation 2215, the visual preview generated from the extracted data is actually displayed on a GUI.

FIG. 23 is a flow diagram illustrating a method 2300 of receiving an input from a user and displaying a context menu on a GUI in accordance with an illustrative embodiment. In alternative embodiments, fewer, additional, and/or different operations may be performed. Also, the use of a flow diagram is not meant to be limiting with respect to the order of operations performed. In an operation 2305, the system receives an input from a motion translation device. In an operation 2310, when a pointer is located over representative information of a file and a further input is received such as a mouse click, a context menu relating to the electronic file is displayed.

FIG. 24 is a flow diagram illustrating a method 2400 of receiving an input from a user an opening an electronic file to be displayed on a GUI in accordance with an illustrative embodiment. In alternative embodiments, fewer, additional, and/or different operations may be performed. Also, the use of a flow diagram is not meant to be limiting with respect to the order of operations performed. In an operation 2405, the system receives an input from a motion translation device. In an operation 2410, when a pointer is located over representative information of a file and a further input is received such as a mouse click, the electronic file is opened from an online device. In other words, a file is opened from a device that is currently accessible. The system may open the file with a predetermined primary application or a predetermined secondary application. For example, a Microsoft Word™ document may be opened and viewed in Word™ or Google™ Docs. The system may have a predefined preference for Microsoft Word™, but if that application is not available, the system can attempt to open the file with other applications.

Figure 25:
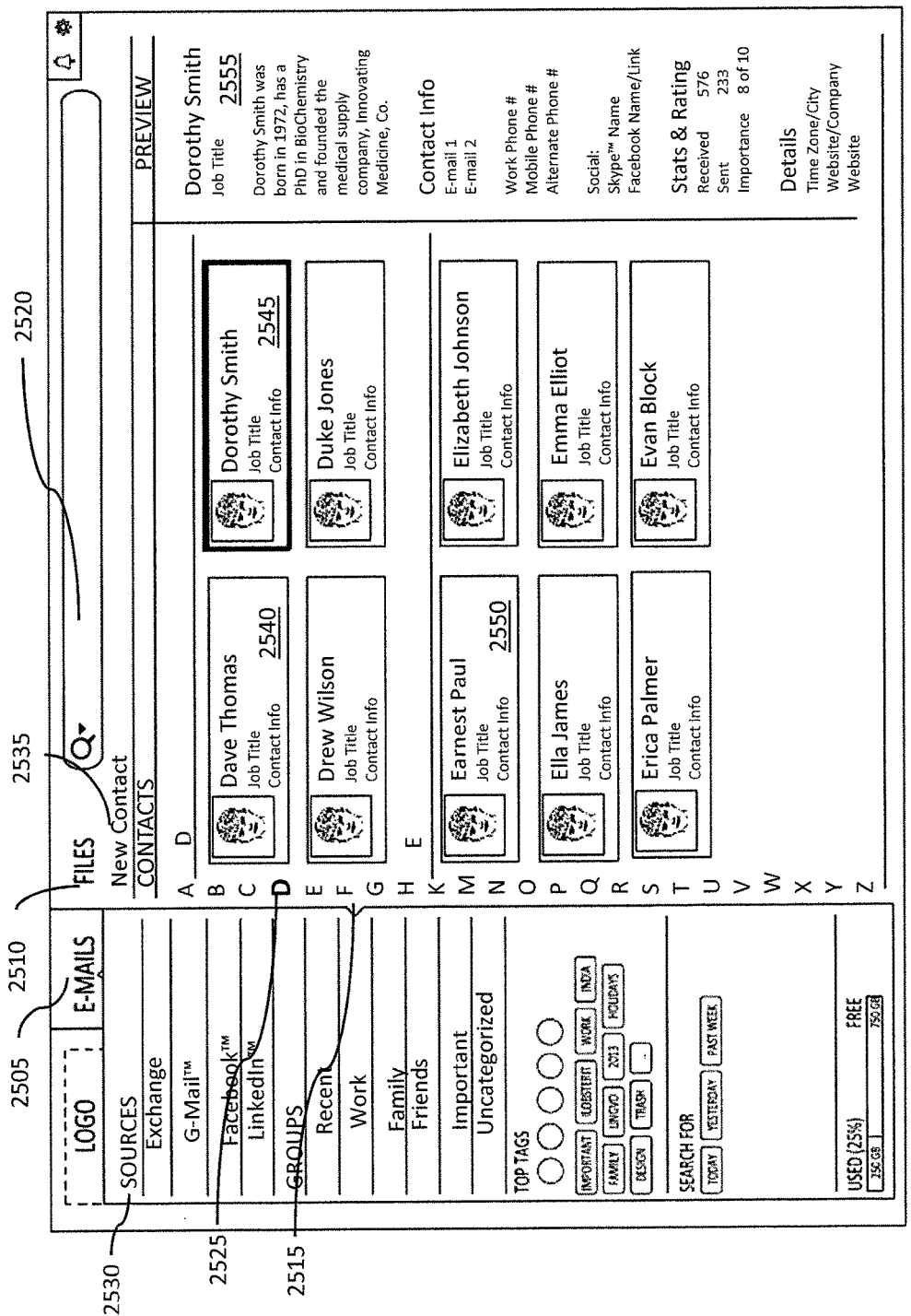
FIG. 25 is a representation of a GUI demonstrating a contact information directory in accordance with an illustrative embodiment.

FIG. 25 is a representation of a GUI 2500 demonstrating a contact information directory in accordance with an illustrative embodiment. In alternative embodiments, fewer, additional, and/or different components may be displayed on the GUI. The GUI 2500 includes an e-mails tab 2505 and a files tab 2510. Here, the e-mails tab 2505 is selected and the GUI 2500 is further directed to a display of a user's contact list.

The GUI 2500 further includes a search field 2520. Here, the user may be able to input search terms to find particular contacts and their contact information. Searching done utilizing the search field 2520 may occur across multiple platforms for e-mail and messaging including sources 2530 listed on the left-hand side of the GUI 2500 (including as illustrative examples an e-mail exchange server, G-Mail™, Facebook™, and LinkedIn™). Other platforms and sources are possible. If a search was done for a particular contact information, the GUI 2500 would look largely similar, but would show results related to the search inputs.

The GUI 2500 also includes a groups contacts list. This list separates the user's contacts into multiple groups, including recent, work, family, friends, important, and uncategorized. E-mails in other GUIs may be sorted accordingly to similar groupings, but here in the GUI 2500, these groups are groups of contacts. The groups can overlap, and need not have only exclusive members to each group.

In the GUI 2500, the work group is selected as indicated by an 2515. The GUI 2500 shows various contacts 2540, 2545, and 2550. Further, a new contact button 2535 is shown on the GUI 2500. The new contact button 2535 can allow and prompt a user to manually add a new contact to the user's contact list. The GUI 2500 also shows an alphabet selector 2525, which is currently showing the selected the letter "D." Accordingly, contacts whose first names start with the letter "D" are now being displayed at the top of the GUI 2500.

Contacts 2540, 2545, and 2550 include various information, including their name, job title, a photo or avatar, and the actual contact information for the person, including but not limited to a phone number and e-mail address. Here, the contact 2545 is selected, and therefore contact preview 2555 is displayed on the GUI 2500. The contact preview 2555 shows additional information regarding the selected contact 2545. Additional information includes biographic information, birthdate information, any known contact information, phone numbers, e-mail addresses, etc. The preview 2555 may also include any links to social networking websites or additional information such as Skype™, Facebook™, LinkedIn™, etc. Other details including stats and rating may be included regarding a contact, which indicates an e-mails received and sent count, and a proxy of importance based on these numbers. Other additional details include a time zone and city the contact is located in, a website link for the company the contact works for, and a link to the contact person's resume or personal website. Any of this information may be used by the system when searching for contact information about particular individuals. The stats and rating information may be utilized to determine which results in a search for contact information should be more prominently displayed to the user.

FIG. 26 is a flow diagram illustrating a method 2600 of performing a cross-platform search in accordance with an illustrative embodiment. In alternative embodiments, fewer, additional, and/or different operations may be performed. Also, the use of a flow diagram is not meant to be limiting with respect to the order of operations performed. In an operation 2605, the system receives search terms input. The search terms may be received from a keyboard, an on-screen keyboard, speech-to-text technology, or other input from a user. In another embodiment, the user may select a search term from a graphical user interface without having to enter particular characters and text with an input device. For example, the user may select a tag to initiate a search as discussed above with respect to FIG. 6.

In an operation 2610, the system searches various electronic devices and their electronic memory in order to find electronic files related to the search input. In an alternative embodiment, and as discussed above, the system may also search an index of electronic files rather than the actual electronic memories of various devices. In a third embodiment, the system may actually search a combination of an index and the physical memory of various user devices.

In an operation 2615, the system determines the presence of various electronic files relating to the input search terms. In this step, the system actually finds hits relating to the search terms.

In an operation 2620, the system displays the various electronic files relating to the input search terms on a graphical user interface (GUI). That is, the system displays the search results. The search results may be displayed in a variety of ways as disclosed herein.

FIG. 27 is a flow diagram illustrating a method 2700 of grouping search results into clusters in accordance with an illustrative embodiment. In alternative embodiments, fewer, additional, and/or different operations may be performed. Also, the use of a flow diagram is not meant to be limiting with respect to the order of operations performed. In an operation 2705, the system determines electronic files from multiple electronic devices that are related to search terms input from a user.

In an operation 2710, the system groups the electronic files that were determined based on the search terms into groups (or clusters or amalgamations) with common characteristics. For example and as disclosed herein, the groupings may involve electronic files of a similar type, date, relation to a contact or particular conversation, etc. In an operation 2715, the system displays on the GUI the various clusters and groups relating to the search results. The system may display the groups in many different ways as disclosed herein.

In an operation 2720, the system receives an input from the user regarding a particular group or cluster. The input may be a click from a mouse pointer, a touch through a touch screen, a voice command, or any other type of user input. In an operation 2725, the system displays additional information on the GUI regarding the group or cluster. For example, the system may display information about the cluster as a whole: total size, number of electronic files, etc. In another example, the system may display information about the electronic files that make up the cluster: names of electronic files in the group, sizes of the electronic files in the group, previews of the electronic files in the group, etc. Furthermore, the system may only display information regarding electronic files that are regarded as higher relevance to the search than other electronic files in the grouping. Accordingly, when the system displays additional information about the files, the more relevant files are displayed more prominently on the GUI.

Figure 28:
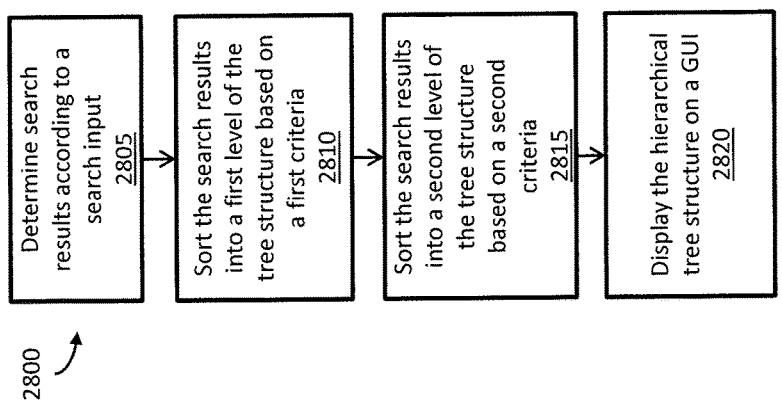
FIG. 28 is a flow diagram illustrating a method of displaying search results in a hierarchical tree structure in accordance with an illustrative embodiment.

FIG. 28 is a flow diagram illustrating a method 2800 of displaying search results in a hierarchical tree structure in accordance with an illustrative embodiment. In alternative embodiments, fewer, additional, and/or different operations may be performed. Also, the use of a flow diagram is not meant to be limiting with respect to the order of operations performed. In an operation 2805, the system determines search results according to a search input.

In an operation 2810, the system sorts the search results into a first level of the tree structure based on a first criteria. In this embodiment, the first criteria is a relatively broad criteria meant to capture many if not all of the search results. For example, the criteria may consist of all search results. In another example, the criteria may consist of all documents in the search results. In this way, the hierarchical tree structure can be organized from broader tree structure levels to narrower to facilitate a useful interface for the user.

In an operation 2815, the system sorts the search results into a second level of the tree structure based on a second criteria. The second criteria is relatively narrower as compared to the first criteria. For example, where the first criteria consists of all documents in the search results, the second criteria may be all documents received as e-mail attachments in the search results. As explained above, in this way, the hierarchical tree structure can offer an organization of search results that continually narrows the results for a user in a coherent manner that makes it easy to locate particular search results.

In an operation 2820, the system displays the hierarchical tree structure on the GUI. Here the user can actually interact with the hierarchical tree structure and view the search results.

Figure 29:
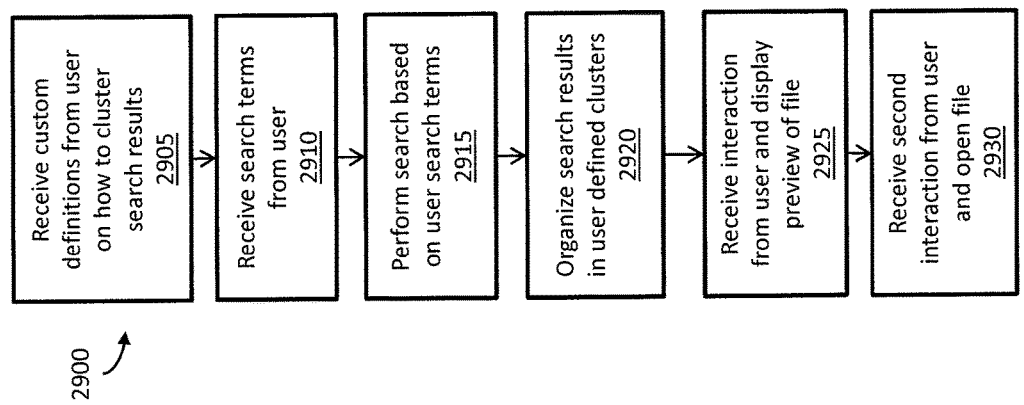
FIG. 29 is a flow diagram illustrating a method of customizing search result groupings according to user defined groups in accordance with an illustrative embodiment.

FIG. 29 is a flow diagram illustrating a method 2900 of customizing search result groupings according to user defined groups in accordance with an illustrative embodiment. In alternative embodiments, fewer, additional, and/or different operations may be performed. Also, the use of a flow diagram is not meant to be limiting with respect to the order of operations performed. In an operation 2905, the system receives custom definitions from the user on how to cluster search results. In other words, the user has determined here the criteria for how to determine clusters of search results.

In an operation 2910, the system receives search terms and input from the user. In an operation 2915, the system performs a search based on the search terms and input from the user.

In an operation 2920, the system organizes the search results in the user defined clusters. In an operation 2925, the system receives an interaction from the user. The interaction received is a selection one of the clusters generated in the operation 2920. As a result of the interaction, the system displays more information regarding the cluster, including a preview of at least one electronic file represented in the cluster that they system deems to be more relevant to the search terms than other electronic files in the cluster.

In an operation 2930, the system receives a second interaction from the user, and the system subsequently opens the electronic file. Here, the user presumably likes what he or she was seeing from the preview displayed in the operation 2925, so the user further interacted with the preview and the cluster to open the electronic file.

In an illustrative embodiment, any of the operations described herein can be implemented at least in part as computer-readable instructions stored on a computer-readable medium or memory. Upon execution of the computer-readable instructions by a processor, the computer-readable instructions can cause a computing device to perform the operations.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
indexing, by at least one processor, electronic data accessible by a user from a plurality of electronic storage platforms, wherein the electronic data comprises a plurality of data files, wherein the data files have a plurality of file types comprising at least two of a folder type, a document type, an audio type, a photo type, or a video type, and wherein the electronic storage platforms comprise one or more storage devices that are local to the user and one or more cloud storage services that are remote from the user;

receiving, by the processor, a first search input;

identifying, by the processor within the indexed data files, a plurality of first items that are related to the first search input;

providing, by the processor on a graphical user interface (GUI), first representative information of the first items, wherein the first representative information comprises descriptive information relating to the first items, wherein the first items are sorted into a plurality of groups within the GUI corresponding to each of the file types of the first items, and wherein the GUI comprises a plurality of search controls that each correspond to a different one of the groups for requesting a search within the corresponding one of the groups;

receiving, by the processor, a second search input corresponding to a search control among the search controls for a group among the groups, wherein the group corresponds to a file type among the file types, and wherein the first items comprise a subset of items that have the file type;

identifying, by the processor within the subset of items, one or more second items that are related to the second search input; and providing, by the processor on the GUI, second representative information of the second items, wherein the second representative information comprises descriptive information relating to the second items, wherein the second items are presented within the GUI in the group corresponding to the file type of the second items.

2. The method of claim 1, wherein the first representative information and the second representative information further comprise location information indicating actual physical locations of the first items and the second items.

3. The method of claim 1, wherein the storage devices comprise a tablet electronic device, a mobile smart phone device, a laptop computing device, a desktop computing device, a digital camera device, a smart television device, a portable digital media player device, or a wearable electronic device.

4. The method of claim 1, further comprising:

grouping, by the processor, a plurality of clusters of the electronic data by corresponding ones of a plurality of data types; and providing, by the processor on the GUI, cluster representative information regarding each of the clusters, wherein the cluster representative information comprises descriptive information relating to a data type among the data types for each of the clusters.

5. The method of claim 4, wherein the cluster representative information further comprises the first representative information of the first items.

6. The method of claim 4, further comprising:

receiving, by the processor, a user input associated with a first cluster among the clusters; and in response to receiving the user input, providing, by the processor on the GUI, the first representative information of individual ones of the first items in the first cluster.

7. The method of claim 4, wherein a first cluster among the clusters having a first data type among the data types is displayed on the GUI more prominently than a second cluster among the clusters having a second data type among the data types based on a relevance of the first data type to the first search input or the second search input.

8. The method claim 4, wherein providing, on the GUI, the cluster representative information comprises providing, on the GUI, the clusters as a hierarchical tree structure.

9. The method of claim 8, wherein providing, on the GUI, the cluster representative information comprises providing, on the GUI, a number indicator with each of the clusters, wherein the number indicator indicates the number of the first items or the second items associated with each of the clusters.

10. The method of claim 1, wherein the electronic data comprises a plurality of messages, wherein the messages have a plurality of message types, and wherein the electronic storage platforms comprise a plurality of message services.

11. The method of claim 10, wherein the data files further comprise a plurality of file attachments to the messages.

12. The method of claim 1, wherein the electronic data comprises a plurality of contact information corresponding to a plurality of contacts.

13. The method of claim 1, wherein identifying the first items and identifying the second items comprise morphological searching, metadata searching, tag searching, full text searching, fuzzy searching, or ontology-based semantic searching.

14. An apparatus comprising:

a memory that stores instructions; and at least one processor configured to execute the instructions to:

index electronic data accessible by a user from a plurality of electronic storage platforms, wherein the electronic data comprises a plurality of data files, wherein the data files have a plurality of file types comprising at least two of a folder type, a document type, an audio type, a photo type, or a video type, and wherein the electronic storage platforms comprise one or more storage devices that are local to the user and one or more cloud storage services that are remote from the user;

receive a first search input;

identify, within the indexed data files, a plurality of first items that are related to the first search input;

provide, on a graphical user interface (GUI), first representative information of the first items, wherein the first representative information comprises descriptive information relating to the first items, wherein the first items are sorted into a plurality of groups within the GUI corresponding to each of the file types of the first items, and wherein the GUI comprises a plurality of search controls that each correspond to a different one of the groups for requesting a search within the corresponding one of the groups;

receive a second search input corresponding to a search control among the search controls for a group among the groups, wherein the group corresponds to a file type among the file types, and wherein the first items comprise a subset of items that have the file type;

identify, within the subset of items, one or more second items that are related to the second search input; and provide, on the GUI, second representative information of the second items, wherein the second representative information comprises descriptive information relating to the second items, wherein the second items are presented within the GUI in the group corresponding to the file type of the second items.

15. A non-transitory computer readable medium having instructions stored thereon that, when executed by at least one processor, cause the processor to:

index, by the processor, electronic data accessible by a user from a plurality of electronic storage platforms, wherein the electronic data comprises a plurality of data files, wherein the data files have a plurality of file types comprising at least two of a folder type, a document type, an audio type, a photo type, or a video type, and wherein the electronic storage platforms comprise one or more storage devices that are local to the user and one or more cloud storage services that are remote from the user;

receive, by the processor, a first search input;

identify, by the processor within the indexed data files, a plurality of first items that are related to the first search input;

provide, by the processor on a graphical user interface (GUI), first representative information of the first items, wherein the first representative information comprises descriptive information relating to the first items, wherein the first items are sorted into a plurality of groups within the GUI corresponding to each of the file types of the first items, and wherein the GUI comprises a plurality of search controls that each correspond to a different one of the groups for requesting a search within the corresponding one of the groups;

receive, by the processor, a second search input corresponding to a search control among the search controls for a group among the groups, wherein the group corresponds to a file type among the file types, and wherein the first items comprise a subset of items that have the file type;

identify, by the processor within the subset of items, one or more second items that are related to the second search input; and provide, by the processor on the GUI, second representative information of the second items, wherein the second representative information comprises descriptive information relating to the second items, wherein the second items are presented within the GUI in the group corresponding to the file type of the second items.

16. The computer readable medium of claim 15, wherein the instructions are further to cause the processor to:
group, by the processor, a plurality of clusters of the electronic data by corresponding ones of a plurality of data types; and
provide, by the processor on the GUI, cluster representative information regarding each of the clusters, wherein the cluster representative information comprises descriptive information relating to a data type among the data types for each of the clusters.

17. The computer readable medium of claim 16, wherein the instructions are further to cause the processor to:
receive, by the processor, a user input associated with a first cluster among the clusters; and
in response to the receipt of the user input, provide, by the processor on the GUI, the first representative information of individual ones of the first items in the first cluster.

18. The computer readable medium of claim 16, wherein a first cluster among the clusters having a first data type among the data types is displayed on the GUI more prominently than a second cluster among the clusters having a second data type among the data types based on a relevance of the first data type to the first search input or the second search input.

19. The computer readable medium claim 16, wherein, to provide the cluster representative information, the instructions are further to cause the processor to provide, on the GUI, the clusters as a hierarchical tree structure.

20. The computer readable medium of claim 19, wherein, to provide the cluster representative information, the instructions are further to cause the processor to provide, on the GUI, a number indicator with each of the clusters, wherein the number indicator indicates the number of the first items or the second items associated with each of the clusters.

* * * * *